(12) United States Patent
Comb et al.

(10) Patent No.: US 11,241,824 B2
(45) Date of Patent: Feb. 8, 2022

(54) LAYER TRANSFUSION FOR HEAT CAPACITOR BELT FOR ADDITIVE MANUFACTURING

(71) Applicant: Evolve Additive Solutions, Inc., Minnetonka, MN (US)

(72) Inventors: James W. Comb, Hamel, MN (US); Steven A. Chillscyzn, Victoria, MN (US); William J. Hanson, Carlsbad, CA (US); J. Randolph Sanders, Rancho Santa Fe, CA (US); Michael W. Bacus, Temecula, CA (US)

(73) Assignee: Evolve Additive Solutions, Inc., Minnetonka, MN (US)

( * ) Notice: Subject to any disclaimer, the term of this patent is extended or adjusted under 35 U.S.C. 154(b) by 0 days.

(21) Appl. No.: 16/055,894

(22) Filed: Aug. 6, 2018

(65) Prior Publication Data

US 2018/0370214 A1  Dec. 27, 2018

Related U.S. Application Data

(63) Continuation of application No. 13/790,406, filed on Mar. 8, 2013, now abandoned, which is a
(Continued)

(51) Int. Cl.
*B29C 64/141* (2017.01)
*B29C 64/236* (2017.01)
(Continued)

(52) U.S. Cl.
CPC .......... *B29C 64/141* (2017.08); *B29C 64/147* (2017.08); *B29C 64/236* (2017.08);
(Continued)

(58) Field of Classification Search
CPC ..... B29C 64/10; B29C 64/141; B29C 64/153; B29C 64/20; B29C 64/205; B29C 64/218;
(Continued)

(56) References Cited

U.S. PATENT DOCUMENTS 2,297,691 A   10/1942   Carlson
4,988,602 A   1/1991   Jongewaard et al.
(Continued)

FOREIGN PATENT DOCUMENTS

CN   101310964 A   11/2008
EP   0712051 A2   5/1996
(Continued)

OTHER PUBLICATIONS

USPTO Scientific & Technical Information Center Full Translation of Yamada, JP 10-207194 A. Aug. 2016.
(Continued)

*Primary Examiner* — Michael A Tolin
(74) *Attorney, Agent, or Firm* — Pauly, DeVries Smith & Deffner LLC

(57) ABSTRACT

An additive manufacturing system comprising a transfer medium configured to receive the layers from a imaging engine, a heater configured to heat the layers on the transfer medium, and a layer transfusion assembly that includes a build platform, and is configured to transfuse the heated layers onto the build platform in a layer-by-layer manner to print a three-dimensional part.

19 Claims, 30 Drawing Sheets

Related U.S. Application Data continuation-in-part of application No. 13/624,507, filed on Sep. 21, 2012, now Pat. No. 9,904,223, and a continuation-in-part of application No. 13/624,495, filed on Sep. 21, 2012, now Pat. No. 9,885,987, and a continuation-in-part of application No. 13/624,519, filed on Sep. 21, 2012, now Pat. No. 9,720,363, and a continuation-in-part of application No. 13/624,513, filed on Sep. 21, 2012, now Pat. No. 8,718,522.

(60) Provisional application No. 61/538,491, filed on Sep. 23, 2011.

(51) Int. Cl.
*B33Y 10/00* (2015.01)
*G03G 15/16* (2006.01)
*G03G 15/20* (2006.01)
*B33Y 30/00* (2015.01)
*G03G 15/22* (2006.01)
*G03G 15/24* (2006.01)
*B29C 64/147* (2017.01)

(52) U.S. Cl.
CPC ............... *B33Y 10/00* (2014.12); *B33Y 30/00* (2014.12); *G03G 15/169* (2013.01); *G03G 15/1625* (2013.01); *G03G 15/2021* (2013.01); *G03G 15/224* (2013.01); *G03G 15/24* (2013.01); *G03G 2215/1695* (2013.01)

(58) Field of Classification Search
CPC ... B29C 64/227; B29C 64/232; B29C 64/236; B29C 64/295; B29C 64/364; B29C 64/40; B33Y 10/00; B33Y 30/00; G03G 13/08; G03G 13/16; G03G 13/20; G03G 15/1605; G03G 15/1615; G03G 15/162; G03G 15/1625; G03G 15/167; G03G 15/1685; G03G 15/169; G03G 15/20; G03G 15/2021; G03G 15/22; G03G 15/221; G03G 15/224; G03G 15/24; G03G 2215/1676; G03G 2215/1695
See application file for complete search history.

(56) References Cited

U.S. PATENT DOCUMENTS

| | | |
|---|---|---|
| 5,088,047 A | 2/1992 | Bynum |
| 5,099,288 A | 3/1992 | Britto et al. |
| 5,234,784 A | 8/1993 | Aslam et al. |
| 5,254,421 A | 10/1993 | Coppens et al. |
| 5,354,414 A | 10/1994 | Feygin |
| 5,514,232 A | 5/1996 | Burns |
| 5,593,531 A | 1/1997 | Penn |
| 5,594,652 A | 1/1997 | Penn et al. |
| 5,866,058 A | 2/1999 | Batchelder et al. |
| 5,981,616 A | 11/1999 | Yamamura et al. |
| 5,990,268 A | 11/1999 | Dickens, Jr. et al. |
| 6,052,551 A | 4/2000 | De Cock et al. |
| 6,066,285 A | 5/2000 | Kumar |
| 6,169,605 B1 | 1/2001 | Penn et al. |
| 6,206,672 B1 | 3/2001 | Grenda |
| 6,329,115 B1 | 12/2001 | Yamashita |
| 6,376,148 B1 | 4/2002 | Liu et al. |
| 6,509,128 B1 | 1/2003 | Everaerts et al. |
| 6,531,086 B1 | 3/2003 | Larsson |
| 6,780,368 B2 | 8/2004 | Liu et al. |
| 6,799,959 B1 | 10/2004 | Tochimoto et al. |
| 6,815,636 B2 | 11/2004 | Chung et al. |
| 6,887,640 B2 | 5/2005 | Zhang et al. |
| 7,011,783 B2 | 3/2006 | Fong |
| 7,077,638 B2 | 7/2006 | Leyden et al. |
| 7,208,257 B2 | 4/2007 | Cheng et al. |
| 7,261,541 B2 | 8/2007 | Fong |
| 7,261,542 B2 | 8/2007 | Hickerson et al. |
| 7,291,242 B2 | 11/2007 | Koshnevis |
| 7,435,763 B2 | 10/2008 | Farr et al. |
| 7,706,910 B2 | 4/2010 | Hull et al. |
| 7,815,826 B2 | 10/2010 | Serdy et al. |
| 7,988,906 B2 | 8/2011 | Monsheimer et al. |
| 8,047,251 B2 | 11/2011 | Khoshnevis |
| 8,119,053 B1 | 2/2012 | Bedal et al. |
| 8,124,192 B2 | 2/2012 | Paasche et al. |
| 8,147,910 B2 | 4/2012 | Kritchman |
| 8,173,258 B2 | 5/2012 | Monsheimer et al. |
| 8,216,757 B2 | 7/2012 | Mizutani et al. |
| 8,221,671 B2 | 7/2012 | Hull et al. |
| 8,249,480 B2 | 8/2012 | Aslam et al. |
| 2002/0093115 A1 | 7/2002 | Jang et al. |
| 2002/0145213 A1 | 10/2002 | Liu et al. |
| 2004/0232583 A1 | 11/2004 | Monsheimer et al. |
| 2005/0207801 A1 | 9/2005 | Kunii et al. |
| 2005/0218549 A1 | 10/2005 | Farr et al. |
| 2008/0032083 A1 | 2/2008 | Serdy et al. |
| 2008/0169589 A1 | 7/2008 | Sperry et al. |
| 2008/0171284 A1 | 7/2008 | Hull et al. |
| 2008/0226346 A1 | 9/2008 | Hull et al. |
| 2009/0236775 A1 | 9/2009 | Monsheimer et al. |
| 2009/0304952 A1 | 12/2009 | Kritchman |
| 2011/0117485 A1 | 5/2011 | Hermann et al. |
| 2012/0041132 A1 | 2/2012 | Monsheimer et al. |
| 2012/0139167 A1 | 6/2012 | Fruth et al. |
| 2012/0201960 A1 | 8/2012 | Hartmann et al. |
| 2012/0202012 A1 | 8/2012 | Grebe et al. |
| 2012/0237870 A1 | 9/2012 | Watanabe et al. |
| 2012/0263488 A1 | 10/2012 | Aslam et al. |
| 2012/0274002 A1 | 11/2012 | Uchida |
| 2013/0171434 A1 | 7/2013 | Hirth et al. |
| 2014/0004462 A1 | 1/2014 | Zaretsky |
| 2014/0167326 A1 | 6/2014 | Jones et al. |

FOREIGN PATENT DOCUMENTS

| | | |
|---|---|---|
| GB | 2446386 A | 8/2008 |
| JP | 5165350 A | 7/1993 |
| JP | 08-281808 A | 10/1996 |
| JP | 10-207194 A | 8/1998 |
| JP | 2001075376 A | 3/2001 |
| JP | 2002-347129 A | 12/2002 |
| JP | 2003053849 A | 2/2003 |
| JP | 2003071940 A | 3/2003 |
| JP | 2005062860 A | 3/2005 |
| JP | 2006182813 A | 7/2006 |
| WO | 98/51464 | 11/1998 |
| WO | 2004037469 A1 | 5/2004 |
| WO | 2007/114895 A2 | 10/2007 |
| WO | 2011/065920 A1 | 6/2011 |
| WO | 2012034666 A1 | 3/2012 |

OTHER PUBLICATIONS

USPTO Scientific & Technical Information Center Full Translation of Nishida, JP 2002-347129 A. Aug. 2016.
USPTO Scientific & Technical Information Center Full Translation of Koseko, JP 08-281808 A. Aug. 2016.
English Translation of Yamada et al. JP 10-207194, dated Aug. 7, 1998.
English Translation of Nishida et al. JP 2002-347129, dated Dec. 4, 2002.
Dupont Kapton Technical Information. http://www.dupont.com/content/dam/assets/products-and-services/membrances-films/assets/DEC-Kapton-summary-of-properties.pdf. Date of Publication Unknown.
Dupont Teflon Properties Handbook. http://rjchase.com/ptfe_handbook.pdf. Date of Publication Unknown.
International Search Report and Written Opinion dated Jan. 30, 2013 from International Patent Application No. PCT/US2012/056599, filed Sep. 21, 2012.
U.S. Appl. No. 12/675,098, filed Feb. 24, 2010, entitled "Toner Composition, Developer Comprising the Toner Composition, and Method in Connection with Production of a Volume Body".

(56) References Cited

OTHER PUBLICATIONS

"Xerography", Aug. 27, 2010, pp. 1-4, http:/en.wikipedia.org/wiki/Xerography.
Jones, Jason, "Selective Laser Printing", Published Prior to Jan. 14, 2013, 1 page.

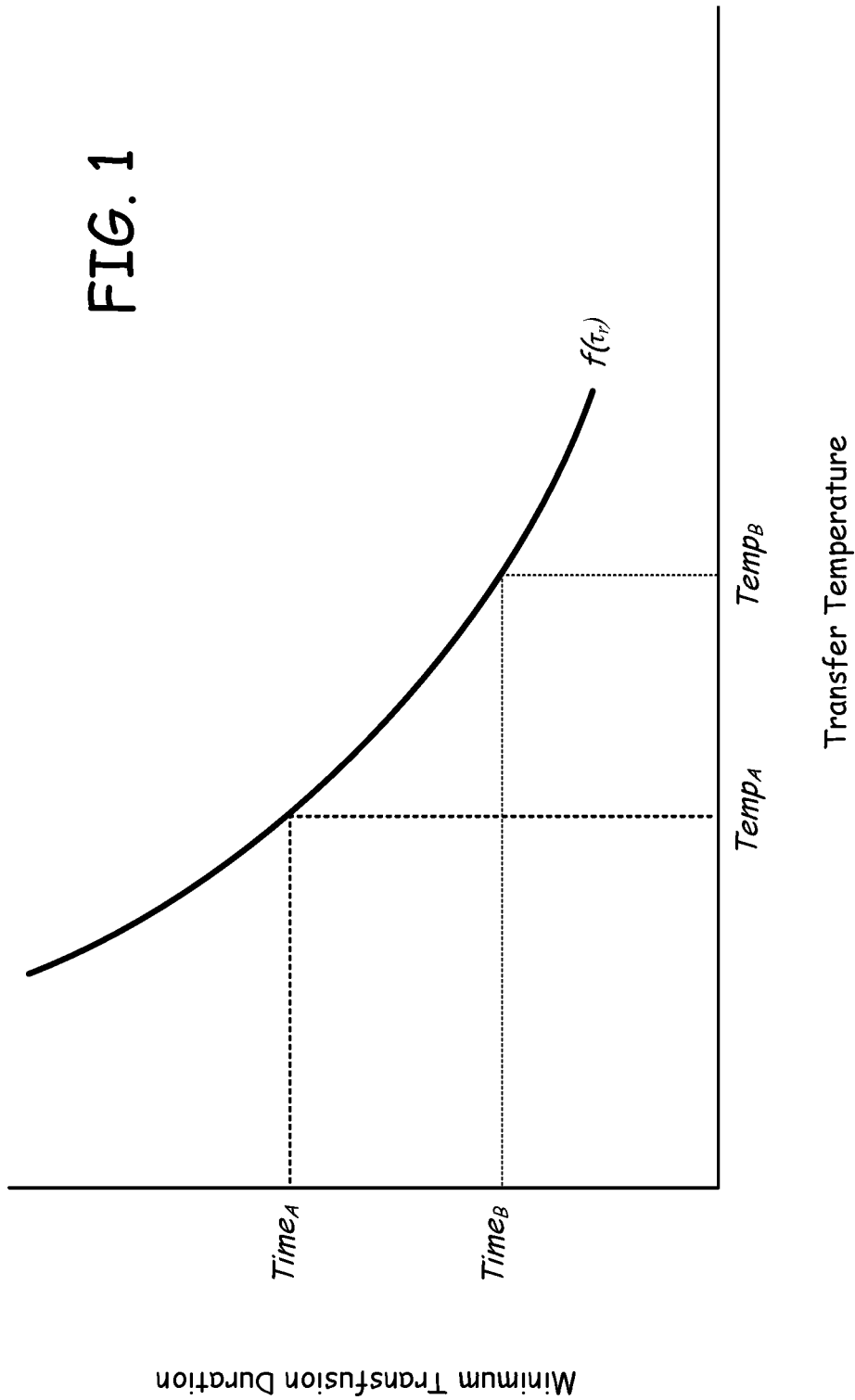

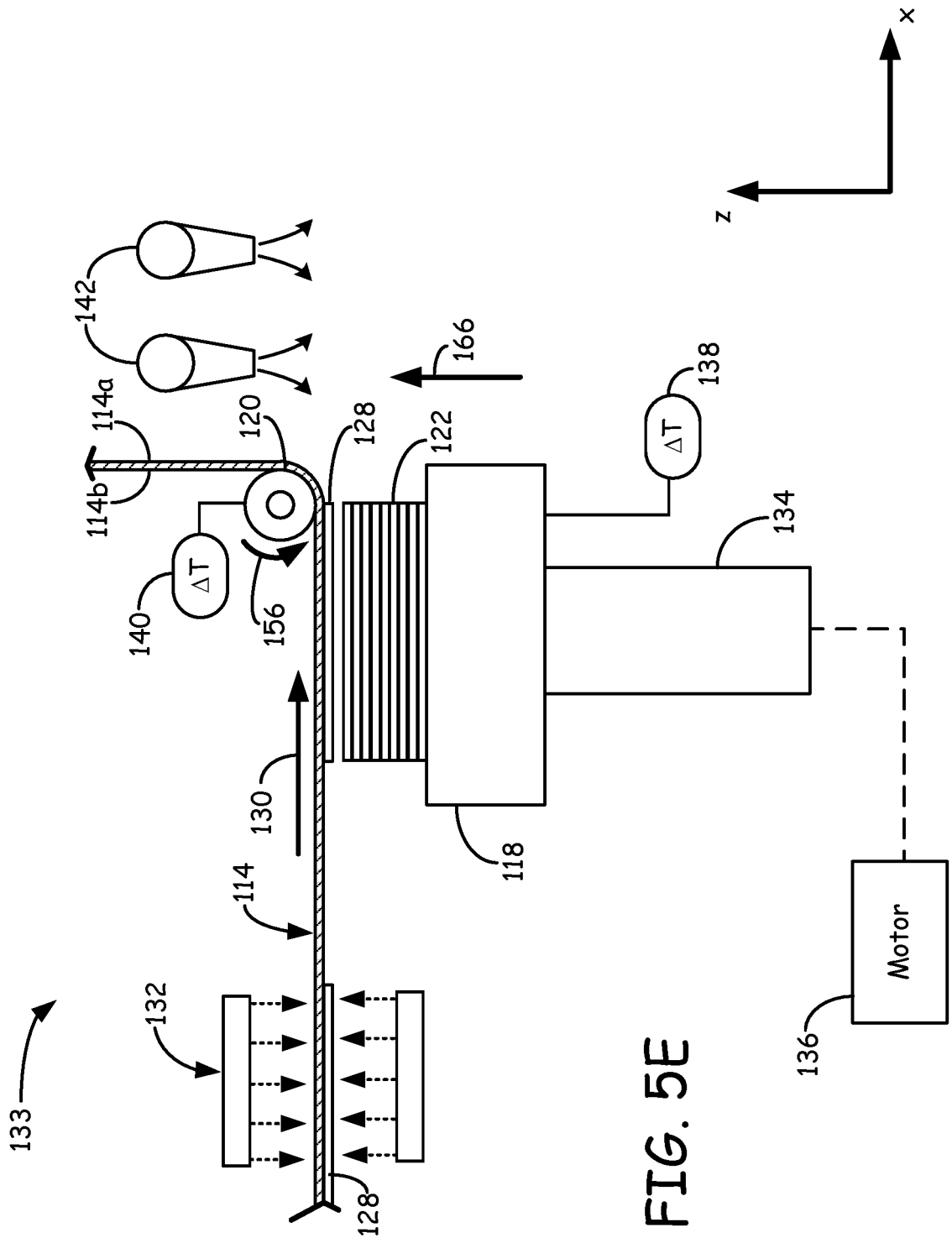

LAYER TRANSFUSION FOR HEAT CAPACITOR BELT FOR ADDITIVE MANUFACTURING

CROSS-REFERENCE TO RELATED APPLICATION(S)

The present application is a continuation of U.S. patent application Ser. No. 13/790,406, filed Mar. 8, 2013, now abandoned, which is a continuation-in-part of U.S. patent application Ser. No. 13/624,495, entitled "LAYER TRANSFUSION FOR ADDITIVE MANUFACTURING" filed Sep. 21, 2012, now U.S. Pat. No. 9,885,987; of U.S. patent application Ser. No. 13/624,507, entitled "LAYER TRANSFUSION WITH TRANSFIXING FOR ADDITIVE MANUFACTURING" filed Sep. 21, 2012, now U.S. Pat. No. 9,904,223; of U.S. patent application Ser. No. 13/624,513, entitled "LAYER TRANSFUSION WITH PART HEATING FOR ADDITIVE MANUFACTURING" filed Sep. 21, 2012, now U.S. Pat. No. 8,718,522; of U.S. patent application Ser. No. 13/624,519, entitled "LAYER TRANSFUSION WITH ROTATABLE BELT FOR ADDITIVE MANUFACTURING" filed Sep. 21, 2012, now U.S. Pat. No. 9,720,363; and each of which claims priority to U.S. Provisional Application No. 61/538,491, entitled "LAYER TRANSFUSION FOR ELECTROPHOTOGRAPHY-BASED ADDITIVE MANUFACTURING", filed on Sep. 23, 2011.

Reference is also made to co-filed U.S. patent application Ser. No. 13/790,382, entitled "LAYER TRANSFUSION FOR ADDITIVE MANUFACTURING", filed Mar. 8, 2013, now abandoned.

BACKGROUND

The present disclosure relates to additive manufacturing systems for building three-dimensional (3D) parts and support structures. In particular, the present disclosure relates to additive manufacturing systems and processes for building 3D parts and support structures using an imaging process, such as electrophotography.

Additive manufacturing systems are used to build 3D parts from digital representations of the 3D parts (e.g., STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, in an extrusion-based additive manufacturing system, a 3D part or model may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the modeling material during fabrication, and is removable from the completed 3D part when the printing process is complete.

In two-dimensional (2D) printing, electrophotography (i.e., xerography) is a popular technology for creating 2D images on planar substrates, such as printing paper. Electrophotography systems include a conductive support drum coated with a photoconductive material layer, where latent electrostatic images are formed by charging and then image-wise exposing the photoconductive layer by an optical source. The latent electrostatic images are then moved to a developing station where toner is applied to charged areas of the photoconductive insulator to form visible images. The formed toner images are then transferred to substrates (e.g., printing paper) and affixed to the substrates with heat or pressure.

SUMMARY

An aspect of the present disclosure is directed to an additive manufacturing system for printing a 3D part. The additive manufacturing system includes an imaging engine configured to develop an imaged layer, a movable build platform, and a rotatable belt configured to receive the imaged layer from the imaging engine, wherein the rotatable belt has a high average thermal inertia (e.g., of at least about 400 joules/(meter$^2$–Kelvin–second$^{0.5}$)). The system also includes a first heater configured to heat the rotatable belt and the imaged layer on the rotatable belt, and a nip roller configured to press the heated imaged layer conveyed by the rotatable belt onto a top layer of the 3D part retained by the movable build platform. The system further includes a release roller configured to separate the pressed imaged layer from the heated rotatable belt such that the pressed imaged layer remains adhered as a new top layer of the 3D part, wherein the rotatable belt is configured to thermally conduct heat into the three-dimensional part while the pressed imaged layer moves between the nip roller and the release roller.

Another aspect of the present disclosure is directed to a method for printing a 3D part with an additive manufacturing system. The method includes imaging a layer of the 3D part, transferring the imaged layer to a rotatable belt having a high average thermal inertia (e.g., of at least about 400 joules/(meter$^2$–Kelvin–second$^{0.5}$)), and heating the rotatable belt and the imaged layer while the imaged layer is retained on the rotating belt. The method also includes pressing the heated imaged layer between the heated rotatable belt and a top surface of the three-dimensional part so that the heated imaged layer fuses to the top surface of the 3D part, and maintaining contact between the rotatable belt and the fused imaged layer so as to conduct thermal energy from the heated rotatable belt to the 3D part. The method further includes releasing the pressed layer from the rotatable belt such that the pressed layer defines a new top surface of the three-dimensional part.

Another aspect of the present disclosure is directed to a method for printing a 3D part with an additive manufacturing system, which includes imaging a layer of the 3D part, rotating a belt having a high average thermal inertia (e.g., of at least about 400 joules/(meter$^2$–Kelvin–second$^{0.5}$)), and transferring the imaged layer to the rotating belt. The method also includes heating the rotating belt and the imaged layer while the imaged layer is retained on the rotating belt, and engaging the heated rotatable belt with a nip roller, which presses the heated layer to a top surface of the 3D part. The method further includes moving the 3D part in a direction and at a rate that is synchronized with a rotation of the belt, conducting thermal energy from the rotating belt to the 3D part while moving the 3D part in the synchronized direction and rate, and releasing the pressed layer from the rotatable belt such that the pressed layer defines a new top surface of the 3D part.

In some embodiments, the additive manufacturing system is configured to print or otherwise produce the layers at a rate that is faster than a passive thermal diffusion rate of the 3D part.

Definitions

Unless otherwise specified, the following terms as used herein have the meanings provided below:

The terms "transfusion", "transfuse", "transfusing", and the like refer to the adhesion of layers with the use of heat and pressure, where polymer molecules of the layers at least partially interdiffuse.

The term "transfusion pressure" refers to a pressure applied during a transfusion step, such as when transfusing layers of a 3D part together.

The term "deformation temperature" of a 3D part refers to a temperature at which the 3D part softens enough such that a subsequently-applied transfusion pressure, such as during a subsequent transfusion step, overcomes the structural integrity of the 3D part, thereby deforming the 3D part.

Unless otherwise specified, temperatures referred to herein are based on atmospheric pressure (i.e. one atmosphere).

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

BRIEF DESCRIPTION OF THE DRAWINGS

FIG. 1 is a graphical illustration of transfer temperature versus a minimum transfusion duration for a layer transfusion assembly of an additive manufacturing system of the present disclosure.

FIGS. 5A-5E are expanded views of a first alternative layer transfusion assembly of the electrophotography-based additive manufacturing system, having a nip roller, and which illustrate a layer transfer technique.

DETAILED DESCRIPTION

Figure 2A:
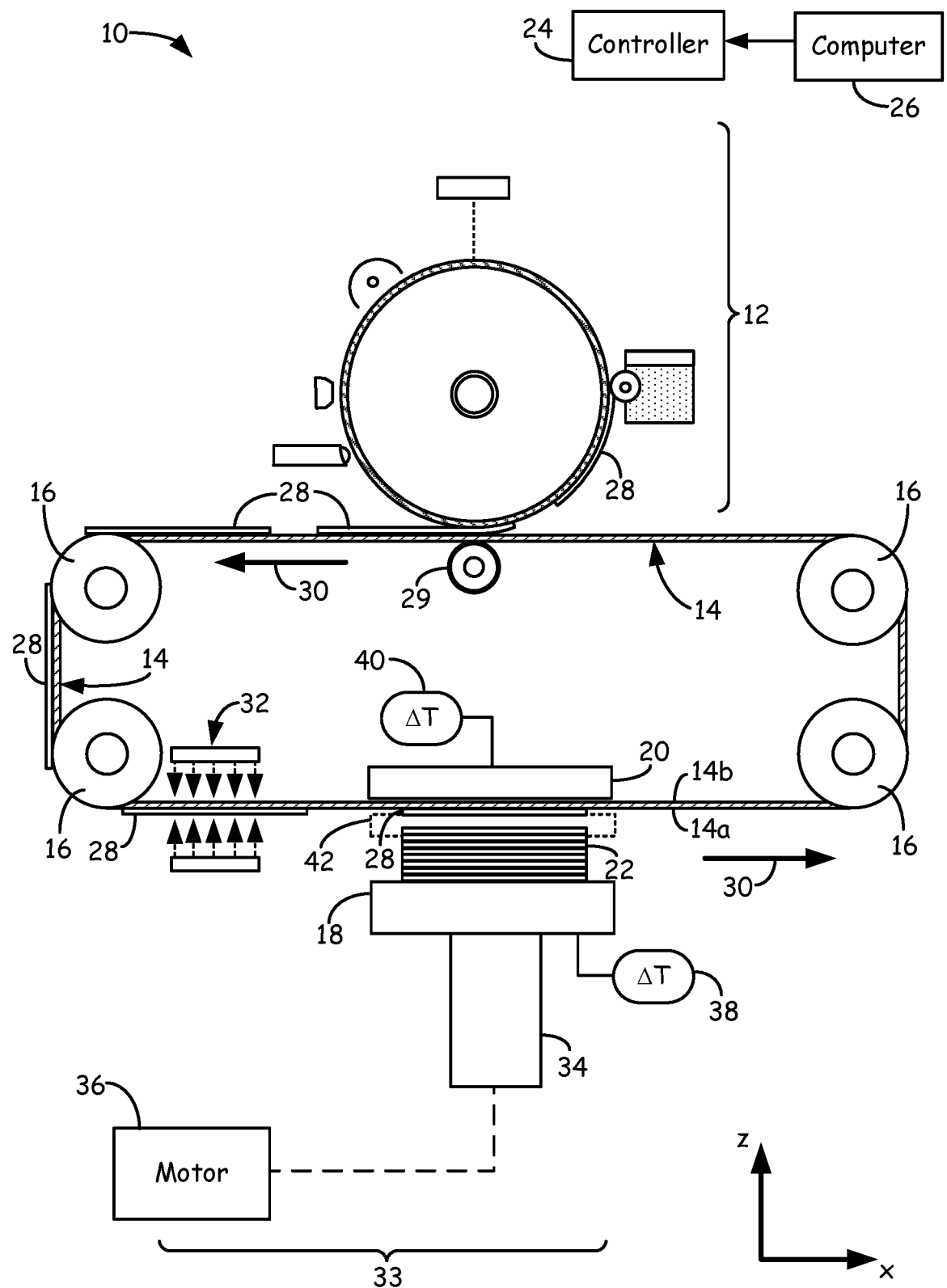
FIG. 2A is a schematic illustration of an electrophotography-based additive manufacturing system of the present disclosure having a layer transfusion assembly with a press plate.

The present disclosure is directed to a layer transfer technique for printing 3D parts and support structures in a layer-by-layer manner, where each layer is printed from a part or support material in a thermally-controlled manner. The layer transfer technique is performed with an imaging system, such as an electrophotography-based additive manufacturing system. For example, each layer may be developed or otherwise imaged using electrophotography and carried from an electrophotography (EP) engine by a transfer medium (e.g., a rotatable belt or drum). The layer is then transferred to a build platform to print the 3D part (or support structure) in a layer-by-layer manner, where the successive layers are transfused together to produce the 3D part (or support structure).

In comparison to 2D printing, in which developed toner particles can be electrostatically transferred to printing paper by placing an electrical potential through the printing paper, the multiple printed layers in a 3D environment effectively prevents the electrostatic transfer of part and support materials after a given number of layers are printed (e.g., about 15 layers). Instead, in the present disclosure, a layer retained by the transfer medium is heated to an elevated transfer temperature. The heated layer is then pressed against a previously-printed layer (or to a build platform) to transfuse the layers together (i.e., a transfusion step). This allows numerous layers of 3D parts and support structures to be built vertically, beyond what is otherwise achievable via electrostatic transfers.

For transfusion to occur, the interfaces between the heated layers need to be pressed for at least a minimum duration to allow molecular interdiffusion to occur between the layers. This minimum transfusion duration ($t_{transfusion}$) is believed to be a function of the average time for the polymer molecules to diffuse one molecular radius of gyration ($\tau_r$), which itself is proportional to the material viscosity ($\mu_{material}$) and is inversely proportional in an exponential manner to the transfer temperature ($T_{transfer}$), as shown in Equations 1-3:

$$t_{transfusion} = f(\tau_r) \quad \text{(Equation 1)}$$

$$\tau_r \sim f(\mu_{material}) \quad \text{(Equation 2)}$$

$$\mu_{material} \sim f\left(\frac{1}{T_{transfer}}\right) \quad \text{(Equation 3)}$$

In other words, as illustrated in FIG. 1, if the transfer temperature is increased, the minimum duration required for the polymer molecules to diffuse one molecular radius of gyration decreases exponentially, and vice versa.

The particular inverse exponential relationship between the transfer temperature and the minimum transfusion duration varies depending on the particular compositions of the layer materials. However, to obtain good part strengths, the minimum transfusion duration for a given transfer temperature is desirably set to be at least the average time for the polymer molecules to diffuse one molecular radius of gyration ($\geq \tau_r$), more desirably at least twice the average time for the polymer molecules to diffuse one molecular radius of gyration ($\geq 2\tau_r$), and even more desirably at least three times the average time for the polymer molecules to diffuse one molecular radius of gyration ($\geq 3\tau_r$).

For example, as shown in FIG. 1, when transfusing layers heated to a transfer temperature $Temp_A$, the minimum transfusion duration is $Time_A$, based on the plot line function of $f(\tau_r)$, such as $3\tau_r$. Alternatively, if the transfer temperature is increased to $Temp_B$, the minimum transfusion duration is $Time_B$, which can be exponentially shorter than the minimum transfusion duration for the transfer temperature of $Temp_A$. Thus, 3D parts may be printed at faster speeds with good layer transfusions by increasing the transfer temperature, such as to at least a "fusion temperature" of the layer material.

As discussed below, the fusion temperature is a temperature that sufficiently melts the layer material to a fusable state such that polymer molecules of the layer material readily interdiffuse during the subsequent transfusion steps to promote interlayer or interfacial entanglement. For example, for an acrylonitrile-butadiene-styrene (ABS) copolymer, the fusion temperature may range from about 180° C. to about 220° C. depending on the particular copolymer composition. At a transfer temperature of about 220° C. and a plot line function of $f(\tau_r)=3\tau_r$, the minimum transfusion duration for the ABS copolymer is about 0.03 seconds. In comparison, at a transfer temperature of about 160° C. and the same plot line function, the minimum transfusion duration for the ABS copolymer is about 6 seconds, which is substantially slower.

Equations 1-3 shown above provide a starting point for selecting a transfer temperature. However, it has been found that several additional factors balance the correlation between the transfer temperature and the minimum transfusion duration, such as (i) thin layer reheating, (ii) layer adhesion to the transfer medium, and (iii) part heat accumulation. First, the layers being printed are thin. As such, the interfaces between one or more of the previously printed layers are reheated with each successive transfusion step, during which further interdiffusion can occur. As such, the minimum transfusion duration is not limited to a single transfusion step. Rather, the duration may be divided into multiple successive transfusion steps. For example, the 6 seconds required to transfuse the ABS copolymer at a transfer temperature of 160° C. may be divided into 12 successive cycles of about 0.5 second each.

Additionally, while the fusion temperature is high enough to promote rapid layer transfusion, it can also be too hot for the transfused layer to cleanly release or otherwise delaminate from the transfer medium (e.g., a rotatable belt or drum). This can potentially result in portions of the transfused layer remaining adhered to the transfer medium, or smear upon release from the transfer medium, which negatively impacts feature detail, dimensional accuracy, and porosity of a printed 3D part.

Accordingly, in some embodiments, the layer transfer technique may also include a "transfixing step", in which the transfer medium and/or the transfused layer is cooled prior to releasing the transfused layer from the transfer medium. While not wishing to be bound by theory, it is believed that this transfixing step cools down the interface between the transfer medium and the transfused layer, thus increasing the adhesive force of the interdiffused polymers in adjacent layers relative to the adhesive force of the transfused layer to the surface of the transfer medium. This keeps the transfused layer adhered to the 3D part in a fixed spatial position, and allows the transfused layer to cleanly release from the transfer medium and remain adhered to the 3D part.

Alternatively, the layer retained by the transfer medium (and optionally, the top surface of the 3D part) may be heated to a lower transfer temperature (e.g., $Temp_A$), such as a temperature between a glass transition temperature and the fusion temperature of the layer material. In this embodiment, the heated layer is then pressed against a previously-printed layer (or to a build platform) to transfuse the layers together (i.e., a transfusion step), and then released from the transfer medium.

However, as discussed above, a lower transfer temperature increases the minimum transfusion duration, which can potentially slow down printing speeds. Nonetheless, depending on the particular additive manufacturing system, the transfusion step may not necessarily be the rate limiting step for printing speeds. As discussed below, each layer is imaged (e.g., developed) at an imaging engine, transferred from the imaging engine to a build platform, and thermally treated before and/or after the transfusion step, where any one of these steps may dictate the maximum printing speed attainable.

For example, due to the layers being thin, the imaging of the layers at the imaging engine may be the slowest step in each layer cycle. In this situation, a longer transfusion duration at a lower transfer temperature may be used. The lower transfer temperature allows the heated layer to be hot enough for sufficient polymer interdiffusion over the longer transfusion duration, while also being cool enough to readily release from the transfer medium.

The use of a lower transfer temperature is also particularly suitable for some embodiments of the present disclosure that incorporate post-fuse or heat-setting steps (e.g., layer transfusion assemblies 333 and 433, shown below in FIGS. 7 and 8). In these embodiments, after release, the transfused layer and the 3D part may then be further heated to at least the fusion temperature of the layer material in the post-fuse or heat-setting step. This sufficiently melts the transfused layer material to a fusable state such that polymer molecules of the transfused layer material at least partially interdiffuse to promote interfacial entanglement.

Another factor to consider when balancing the transfer temperature and the minimum transfusion duration involves the bulk temperature of the 3D part. Because the imaging system is capable of printing the layers at speeds that are much faster than the rate at which heat diffuses through the variable thermal resistance of the 3D parts, heat accumulation in the 3D parts has been observed. This heat accumulation is proportional to the transfer temperature and the size of the 3D part.

As such, as the height of a given 3D part grows, heat dissipation from passive thermal diffusion can become insufficient to cool the heated layers. The faster the layer speed, the faster the heat accumulation in the bulk of the 3D part. As successive layers are continuously printed, this heat accumulation may exceed the "deformation temperature" of the 3D part, causing the bulk of the 3D part to soften enough to reduce its structural integrity. Such a soft part may deform under a subsequently-applied transfusion pressure during a subsequent transfusion step.

In some embodiments, heat accumulation can be reduced by slowing down the printing process to allow the passive thermal diffusion to lower the part temperature. As mentioned above, the transfer temperature may also be lowered since the printing speed is already being slowed down. However, as can be appreciated, these techniques can substantially increase the time required to print 3D parts, particularly if the layer transfusion step is the rate limiting step in the process, thereby reducing throughput. Instead, to overcome this issue while maintaining fast printing rates, the layer transfer technique may include an "active cooling step" to prevent the 3D part from accumulating additional heat, thereby maintaining the 3D part at an "average part temperature" ($T_{part}$) that is lower than the deformation temperature ($T_{deform}$) of the 3D part, as illustrated in Equation 4:

$$T_{part} = f(T_{transfer} + \text{active cooling}) < T_{deform} \quad \text{(Equation 4)}$$

In particular, after each layer of the 3D part is transfused, the heat added to the 3D part from the transfused layer may be substantially removed prior to the transfusion of the next layer. This holds the 3D part at an average part temperature that is desirably balanced to promote interlayer adhesion and reduce the effects of curling, while also being low enough to prevent the 3D part from softening too much (i.e., below its deformation temperature).

The following embodiments illustrate example additive manufacturing systems of the present disclosure that are configured to balance the thermal effects described by one or more of Equations 1-4. For example as shown in FIG. 2A, system 10 is an example additive manufacturing system for printing 3D parts and support structures using electrophotography, which incorporates the layer transfer technique of the present disclosure. In the shown embodiment, system 10 includes EP engine 12, transfer belt 14, rollers 16, build platform 18, and press plate 20 for printing 3D parts (e.g., 3D part 22) and any associated support structures (not shown). Examples of suitable components and functional operations for system 10 include those disclosed in U.S. patent application Ser. Nos. 13/242,669 and 13/242,841.

In alternative embodiments, system 10 may include different imaging engines for imaging the layers. As discussed below, the layer transfer technique focuses on the transfer of layers from belt 14 (or other transfer medium) to build platform 18 (or to the 3D part 22 being printed on build platform 18), and on belt 14, rather than on the particular imaging engine. However, the layer transfer technique is particularly suitable for use with electrophotography-based additive manufacturing systems (e.g., system 10), where the multiple printed layers in a 3D environment effectively prevents electrostatic transfer of part and support materials after a given number of layers are printed, as discussed above.

System 10 also includes controller 24, which is one or more control circuits, microprocessor-based engine control systems, and/or digitally-controlled raster imaging processor systems, and which is configured to operate the components of system 10 in a synchronized manner based on printing instructions received from host computer 26. Host computer 26 is one or more computer-based systems configured to communicate with controller 24 to provide the print instructions (and other operating information). For example, host computer 26 may transfer information to controller 24 that relates to the sliced layers of 3D part 22 (and any support structures), thereby allowing system 10 to print 3D part 22 in a layer-by-layer manner.

As discussed in the U.S. patent application Ser. Nos. 13/242,669 and 13/242,841, EP engine 12 is configured to develop or otherwise image successive layers 28 of a thermoplastic-based powder using electrophotography. As used herein, the term "electrophotography" includes ionography. The thermoplastic-based powder includes one or more thermoplastic materials (e.g., an acrylonitrile-butadiene-styrene (ABS) copolymer), and may also include one or more additional components for development with EP engine 12 and electrostatic attraction to belt 14.

The imaged layers 28 of the thermoplastic-based powder are then rotated to a first transfer region in which layers 28 are transferred from EP engine 12 to belt 14. Belt 14 is an example transfer medium for transferring or otherwise conveying the imaged layers 28 from EP engine 12 to build platform 18 with the assistance of press plate 20. In the shown embodiment, belt 14 includes front or transfer surface 14a and rear or contact surface 14b, where front surface 14a faces EP engine 12. As discussed below, in some embodiments, belt 14 may be a multiple-layer belt with a low-surface-energy film that defines front surface 14a, and which is disposed over a base portion that defines rear surface 14b.

System 10 may also include biasing mechanism 29, which is configured to induce an electrical potential through belt 14 to electrostatically attract layers 28 of the thermoplastic-based powder from EP engine 12 to belt 14. Because layers 28 are each only a single layer increment in thickness at this point in the process, electrostatic attraction is suitable for transferring layers 28 from EP engine 12 to belt 14. However, as mentioned above, the multiple printed layers 28 for 3D part 22 effectively prevents electrostatic transfer of layers 28 from belt 14 to build platform 18 after a given number of layers 28 are printed.

Rollers 16 are a series of drive and/or idler rollers or pulleys that are configured to maintain tension on belt 14 while belt 14 rotates in the rotational direction of arrows 30. This allows belt 14 to maintain a substantially planar orientation when engaging build platform 18 and press plate 20. System 10 may also include service loops (not shown), such as those disclosed in U.S. patent application Ser. No. 13/242,841.

System 10 also includes heater 32, located upstream from build platform 18 and press plate 20, based on the rotational direction of belt 14. Heater 32 is one or more heating devices configured to heat layers 28 to a temperature near an intended transfer temperature of the thermoplastic-based powder, such as at least a fusion temperature of the thermoplastic-based powder, prior to reaching press plate 20. Examples of suitable devices for heater 32 include non-contact radiant heaters (e.g., infrared heaters or microwave heaters), convection heating devices (e.g., heated air blowers), contact heating devices (e.g., heated rollers and/or platens), combinations thereof, and the like, where non-contact radiant heaters are preferred. Each layer 28 desirably passes by (or through) heater 32 for a sufficient residence time to heat the layer 28 to the intended transfer temperature.

As defined above, the fusion temperature is a temperature that sufficiently melts the thermoplastic-based powder to a fusable state. Thus, the fusion temperature will vary depending on the particular layer material used and on the applied pressure. For example, for an ABS copolymer material, the fusion temperature may range from about 180° C. to about 220° C. depending on the particular copolymer composition, as mentioned above. Heating the thermoplastic-based powder to the fusion temperature does not necessarily require every component of the thermoplastic-based powder to melt. Rather, the overall thermoplastic-based powder needs to reach a fusable state for subsequent transfusion. This typically refers to the one or more thermoplastic materials of the thermoplastic-based powder being sufficiently melted to the fusable state.

Build platform 18, press plate 20, and heater 32 may collectively be referred to as layer transfusion assembly 33. Layer transfusion assembly 33 is configured to transfuse the heated layers 28 from the belt 14 to the previously-transfused layers of 3D part 22 (or onto build platform 18) in a layer-by-layer manner.

Build platform 18 is a platform assembly or platen of system 10 that is configured to receive the heated layers 28 for printing 3D part 22 in a layer-by-layer manner. Build platform 18 is supported by z-axis gantry 34, which is a linear guide mechanism configured to incrementally lower build platform 18 along the vertical z-axis relative to belt 14 and press plate 20 after each pressing step. The movement of build platform 18 with z-axis gantry 34 is operated by z-axis motor 36 based on commands from controller 24, where z-axis motor 36 may be an electrical motor, a hydraulic system, a pneumatic system, or the like. In some embodiments, build platform 18 may include removable film substrates for receiving the printed layers 28.

In the shown embodiment, build platform 18 is heatable with heating element 38 (e.g., an electric heater). Heating element 38 is configured to heat and maintain build platform 18 at an elevated temperature that is greater than room temperature (25° C.), such as at the desired average part temperature of 3D part 22. This allows build platform 18 to assist in maintaining 3D part 22 at this average part temperature.

As mentioned above, the average part temperature for 3D part 22 is desirably high enough to promote interlayer adhesion and to reduce the effects of curling, while also being low enough to prevent 3D part 22 from softening too much (i.e., below its deformation temperature). Suitable average part temperatures for 3D part 22 range from greater than the average solidification temperature of the thermoplastic material(s) of the thermoplastic-based powder to about the glass transition temperature of the thermoplastic material(s). More desirably, the average part temperature is maintained at about the creep relaxation temperature of the thermoplastic material(s) of the thermoplastic-based powder, or within about 10° C. above or below thereof. Examples of suitable techniques for determining the creep relaxation temperatures of materials are disclosed in Batchelder et al., U.S. Pat. No. 5,866,058.

Figure 2B:
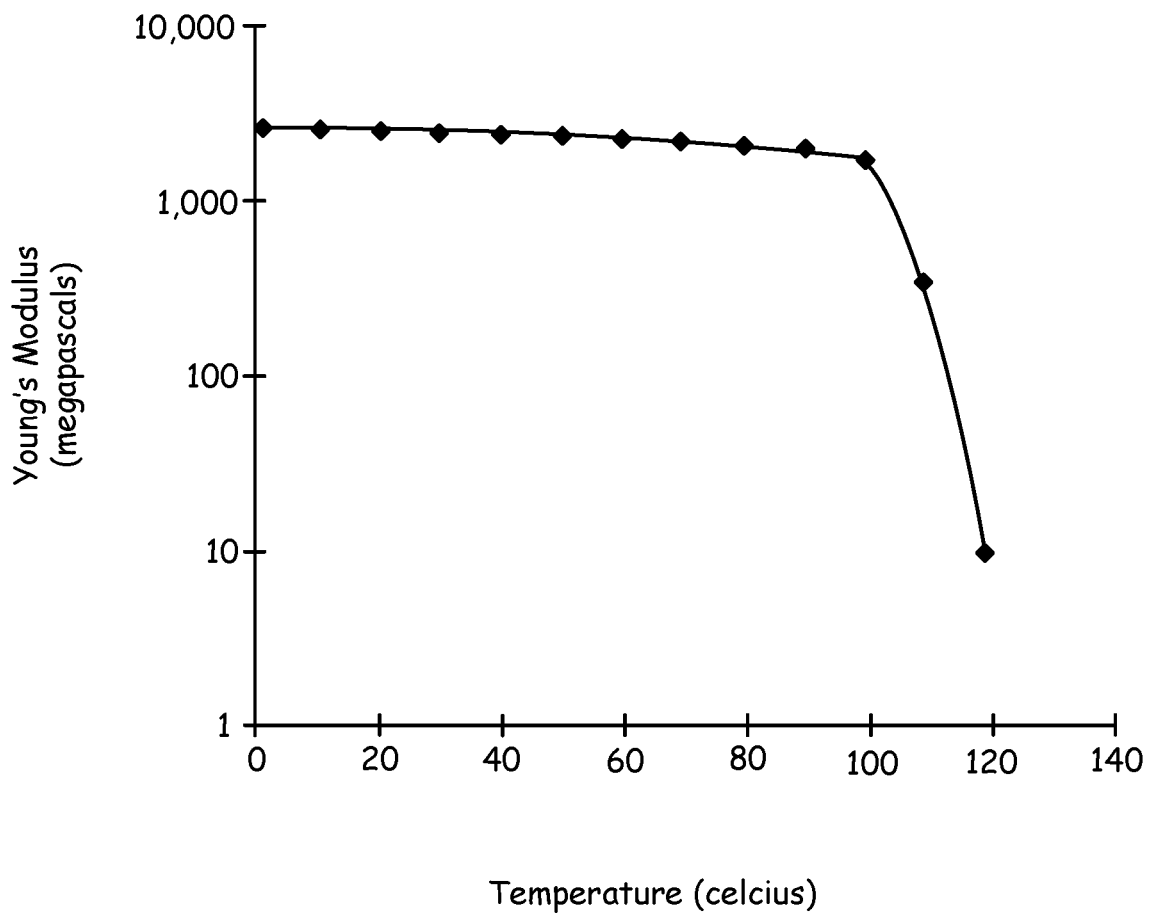
FIG. 2B is a logarithmic graphical illustration of Young's modulus versus temperature at atmospheric pressure for an acrylonitrile-butadiene-styrene (ABS) copolymer.

In some preferred embodiments, the average part temperature is maintained in a range between the creep relaxation temperature of the thermoplastic material(s) of the thermoplastic-based powder and a maximum allowable solidification temperature, where the maximum allowable solidification temperature may be illustrated by the stress relaxation of the thermoplastic-based powder. For example, when printing layers 28 of an ABS copolymer-based powder, the average part temperature for 3D part 22 may be about 100° C., as may be appreciated by a comparison of the stress relaxation or Young's modulus versus temperature for the composition. As shown in FIG. 2B, which is a logarithmic graphical illustration of Young's modulus versus temperature at atmospheric pressure for a particular ABS copolymer, as the temperature increases by a small amount above about 100° C., the elastic modulus of the ABS copolymer significantly drop (illustrated by the shoulder in the plot). At this Young's modulus drop, the ABS copolymer significantly softens, which reduces its structural integrity.

As such, maintaining 3D part 22 at an average part temperature below the Young's modulus drop for its composition allows 3D part 22 to maintain its structural integrity when pressed between build platform 18 and press plate 20 during subsequent transfusion steps. Furthermore, when the top-most layer of 3D part 22 is maintained at this temperature and receives a heated layer 28 at a fusion temperature of about 200° C., the transfusion interface temperature for transfusing the layers together starts at about 150° C. This temperature is suitable for the polymer molecules of the layers 28 to at least partially interdiffuse to promote interfacial entanglement, pursuant to the plot line function of $f(\tau_r)$ in FIG. 1 and Equations 1-3.

Press plate 20 is an example heateable element or heatable layer transfusion element, which is configured to press belt 14 and a given heated layer 28 downward against 3D part 22 and build platform 18 during each transfusion step. Press plate 20 may be actuated with a servo mechanism (not shown) configured to move press plate 20 along the vertical z-axis during each transfusion step.

As mentioned above, the particular pressure applied during each transfusion step is desirably high enough to adhere the heated layer 28 to the previously-transfused layer 28 (or to build platform 18), allowing the polymer molecules to at least partially interdiffuse. However, the transfusion pressure is also desirably balanced to prevent press plate 20 from compressing 3D part 22 too much, thereby allowing 3D part 22 to maintain its dimensional integrity.

In the shown embodiment, press plate 20 is heatable with heating element 40 (e.g., an electric heater). Heating element 40 is configured to heat and maintain press plate 20 at an elevated temperature that is greater than room temperature (25° C.). However, in comparison to the elevated temperature of build platform 18, heating element 40 may heat and maintain press plate 20 at a temperature that is less than the desired average part temperature of 3D part 22. For example, in situations where the intended average part temperature for 3D part 22 is 100° C., heating element 40 may heat and maintain press plate 20 at about 70° C.

The lower temperature for press plate 20 will cool belt 14 from the side of rear surface 14b (i.e., a transfixing step). This is in addition to thermal conduction that occurs by the previously-printed layers of 3D part 22 itself, which draw heat from the transfused layers down into the previously-printed layers. As discussed above, if the transfused layer 28 remains too hot, it may remain adhered to front surface 14a of belt 14, rather than cleanly releasing from belt 14. As such, cooling belt 14 with the contact from press plate 20 (and/or via the previously-printed layers) allows the interface between front surface 14a of belt 14 and the transfused layer 28 to cool down enough to cleanly release the transfused layer 28 from belt 14.

On the other hand, due to the large contact surface area between belt 14 and press plate 20, if press plate 20 is maintained at a temperature that is too low, the contact duration between press plate 20 and belt 14 during the transfusion step may cool the transfused layer 28 down too much, thereby lowering the transfusion interface temperature, which can reduce the interlayer adhesion. As such, in some embodiments, heating element 40 desirably maintains press plate 20 at a temperature that balances these competing thermal effects to facilitate both transfusion and transfixing in a single, combined step.

Figure 3A:
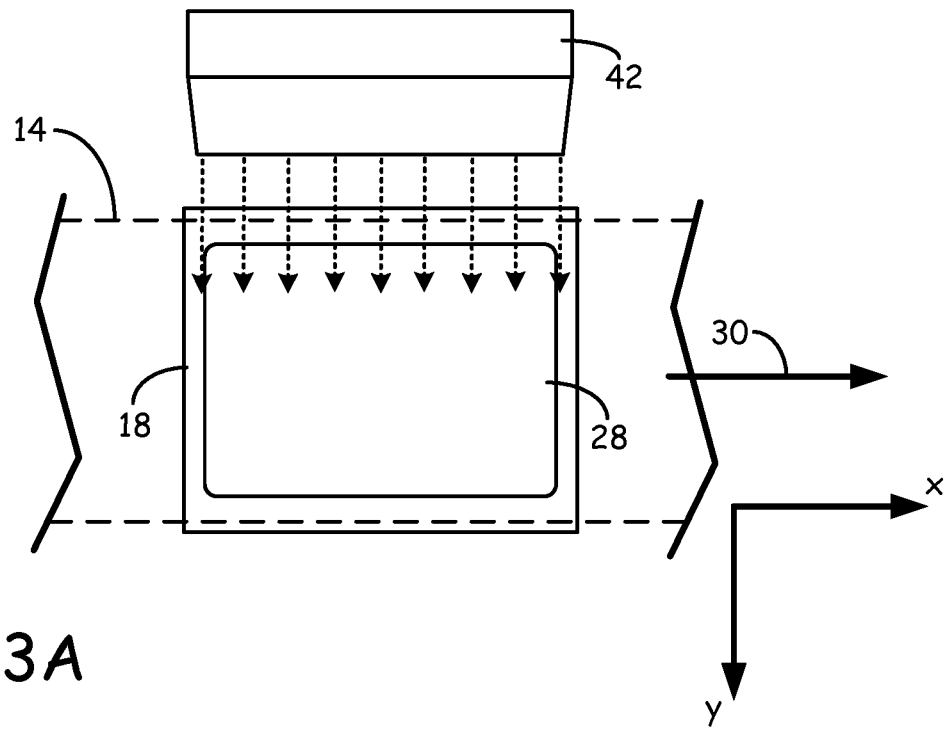
FIG. 3A is a top view of a build platform receiving a heated layer, illustrating an air knife arrangement.

System 10 may also include one or more air knives 42 or other cooling units, where air knife 42 is an example cooling unit configured to blow localized cooling air to the top layers of 3D part 22. As best shown in FIG. 3A, air knife 42 is located adjacent to the lateral side of build platform 18 to direct the cooling air laterally relative to the direction of movement of belt 14. This allows air knife 42 to extend along the entire length of 3D part 22, providing good air flow over the top layers of 3D part 22, including the fused layer 28.

In an alternative embodiment, system 10 may also include a second air knife 42 (not shown) located at the opposing lateral side of build platform 18. In embodiments having air knives 42 or other cooling units, press plate 20 may be heated to the fusion temperature to promote interdiffusion in the transfusion step. Then, upon release of press plate 20, a separate transfix step may be performed by cooling the transfused layer before release of the layer from the belt 14.

As also stated above, when system 10 prints layers 28 at high speeds, the printed layers 28 do not have sufficient time to cool down to the desired average part temperature before successive layers 28 are printed. As such, as the height of 3D part 22 grows, heat dissipation from passive thermal diffusion becomes insufficient to cool the heated layers.

Figure 3B:
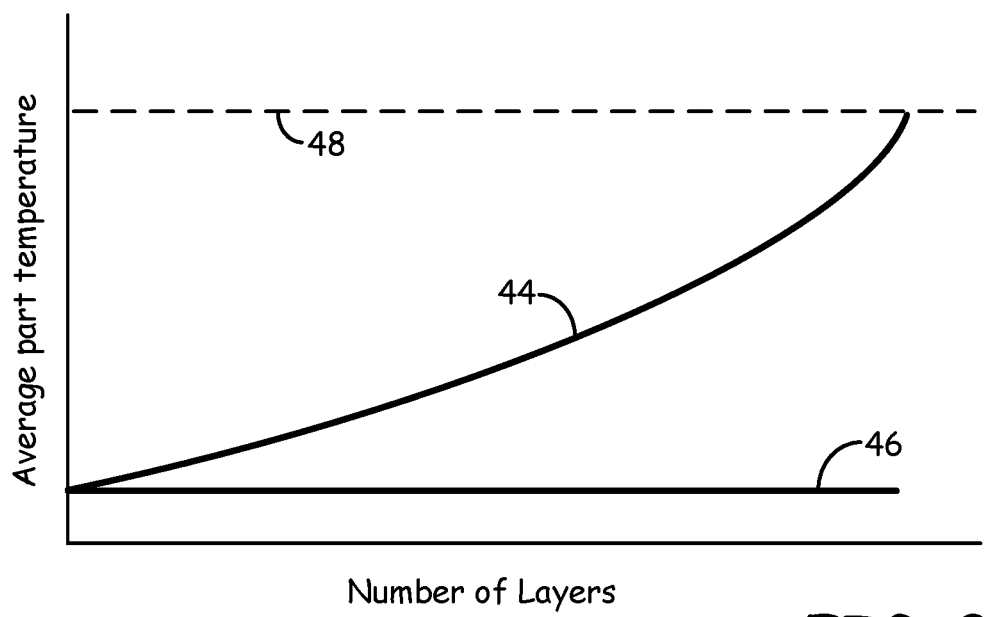
FIG. 3B is a graphical illustration of number of printed layers for a 3D part versus an average part temperature, showing plot lines for a 3D part printed without active cooling and for a 3D part printed with active cooling.

This is depicted in FIG. 3B, which is a graphical illustration of the number of layers printed versus the average part temperature for a 3D part printed without the active cooling (represented by line 44) and for 3D part 22 printed with the active cooling (represented by line 46). As shown by line 44, without the active cooling, the heat added by each layer at its fusion temperature will accumulate in the 3D part, causing the average part temperature to increase until the deformation temperature of the 3D part is reached, as illustrated by threshold line 48. At threshold line 48, the temperature in the bulk of the 3D part is high enough such that the part material substantially softens. When the 3D part reaches this point, the transfusion pressure applied by press plate 20 during subsequent transfusion steps may overcome the structural integrity of the 3D part, thereby deforming the 3D part.

Air knife 42, however, actively cools each layer after the transfusion step to prevent the additional heat from accumulating. As shown by line 46, the active cooling substantially removes the heat provided by each layer 28, thereby providing substantially zero heat accumulation after each printed layer 28. As such, 3D part 22 may be substantially maintained at an average part temperature that is below its deformation temperature during the entire printing operation, as illustrated above in Equation 4.

In some embodiments, it can be beneficial for the average part temperature to be high enough such that the bulk of 3D part 22 exhibits a small amount of softening. It has been found that when the bulk of 3D part 22 exhibits a small amount of softening that still maintains its overall structural integrity (i.e., 3D part 22 does not deform), subsequent transfusion steps with press plate 20 may mildly compress the bulk of 3D part 22, thereby increasing the part density. The increased part density correspondingly reduces brittleness and porosity of the resulting 3D part 22, and increases its z-axis strength. These properties are beneficial for a variety of applications.

While illustrated with air knife 42, system 10 may alternatively include a variety of different convective and/or conductive cooling units configured to actively cool each layer after the transfusion step to prevent the additional heat from accumulating, such as refrigeration units, liquid-cooling units, evaporation units, and the like. Furthermore, one or more air knives 42 (or other cooling units) may be located at other locations around build platform 18 and press plate 20 to direct the cooling air towards the top layers of 3D part 22. Optionally, system 10 may also include additional preheaters (e.g., heaters 270 and 272, shown in FIGS. 6A-6F) to heat the top layer(s) or surface of 3D part 22 to the transfer temperature (e.g. to the fusion temperature) prior to each subsequent transfusion step.

FIG. 4A-4D illustrate an example process for printing a layer 28 with system 10 using the layer transfer technique of the present disclosure. At the start of the printing operation, build platform 18 and press plate 20 may be heated to their desired temperatures. For example, build platform 18 may be heated to the desired average part temperature for 3D part 22 (e.g., about 100° C. for an ABS copolymer), and press plate 20 may be heated to a temperature that is lower than the desired average part temperature for 3D part 22 (e.g., about 70° C. for an ABS copolymer).

Figure 4A:
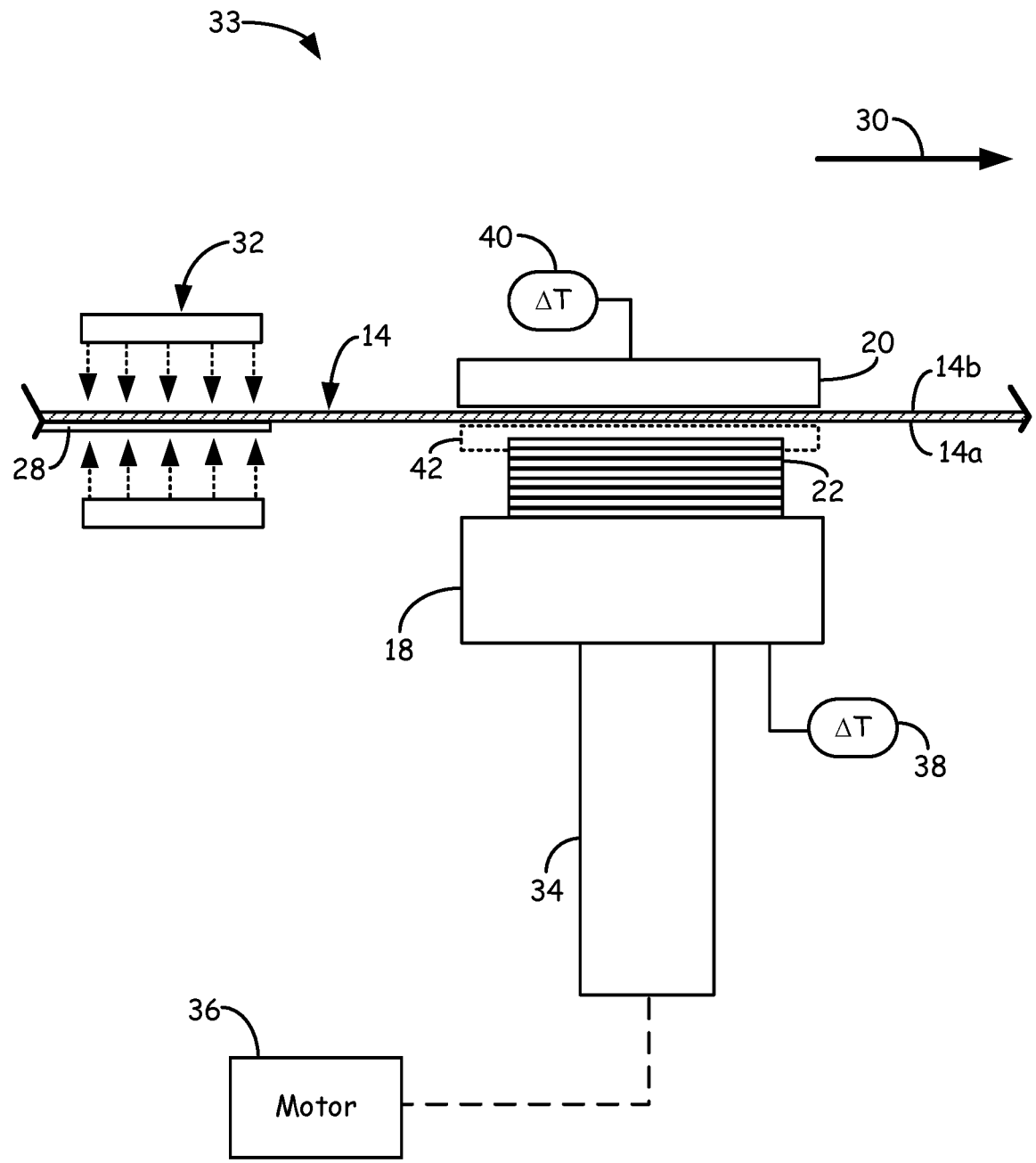
FIGS. 4A-4D are expanded views of the layer transfusion assembly, illustrating a layer transfer technique of the present disclosure.

The printing operation initially involves imaging (e.g., developing) a powder layer 28 with EP engine 12 (shown in FIG. 1) and transferring the imaged powder layer to heater 32 via belt 14. As shown in FIG. 4A, as the imaged powder layer 28 passes by (or through) heater 32, heater 32 heats the layer 28 and the associated region of belt 14 to an intended transfer temperature of the thermoplastic-based powder, pursuant to the plot line function of in FIG. 1 and Equations 1-3. For simplification, the following discussion will be made with reference to the fusion temperature of the thermoplastic-based powder or layer material (e.g., about 200° C. for an ABS copolymer).

Figure 4B:
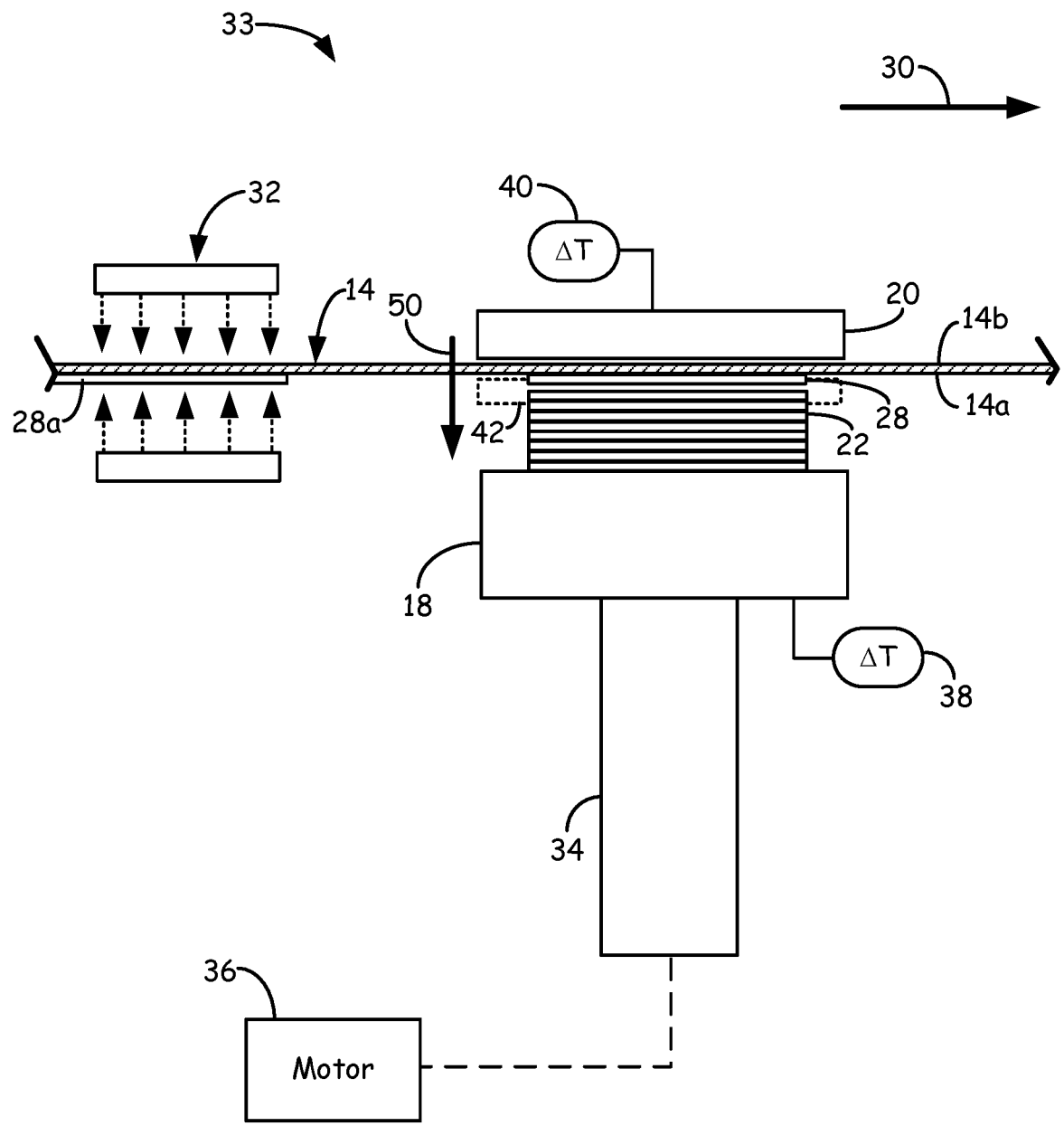
Figure 4C:
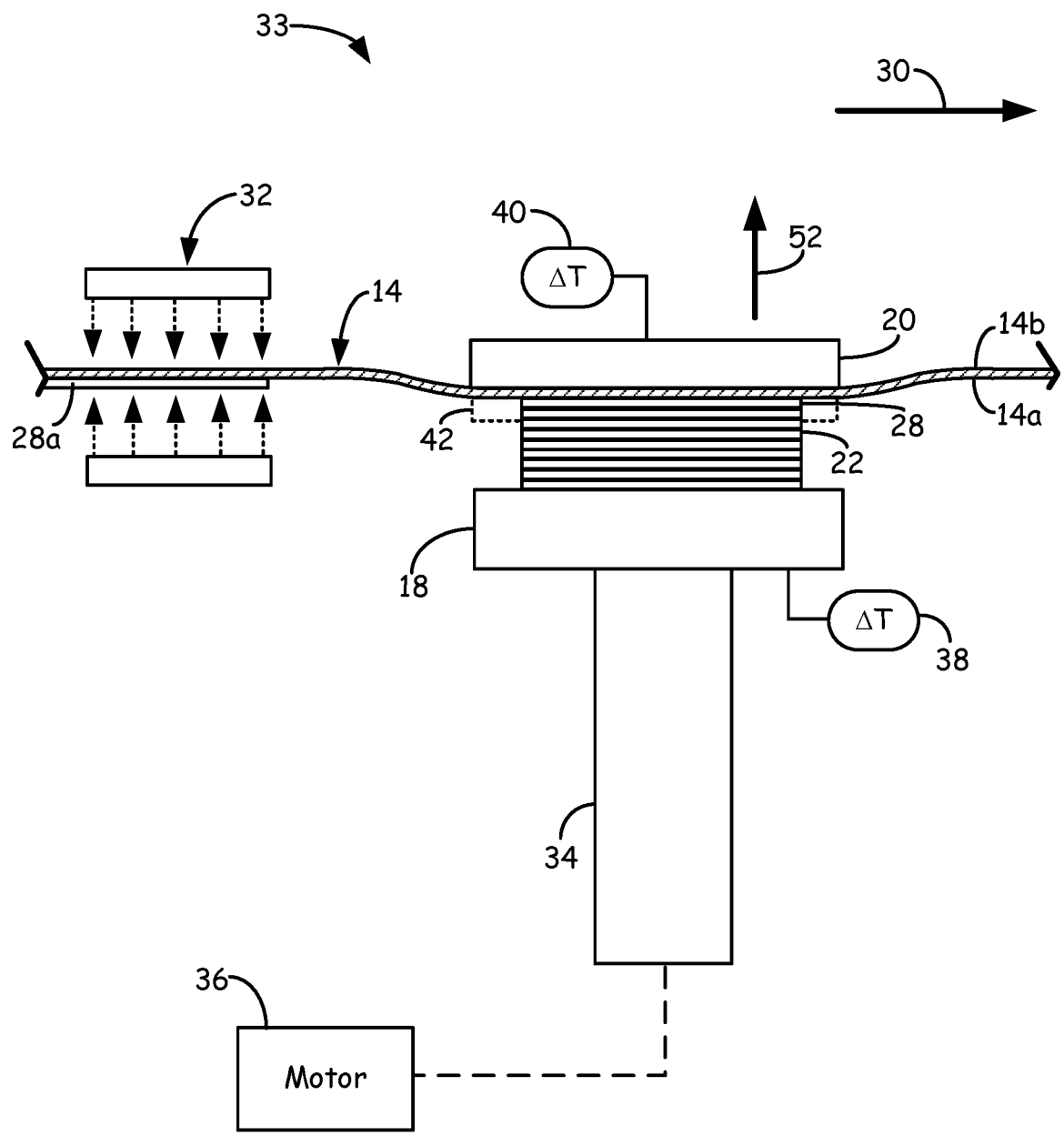

As shown in FIG. 4B, the continued rotation of belt 14 in the direction of arrow 30 aligns the heated layer 28 above build platform 18 with proper registration location along the x-axis. Press plate 20 may then actuate downward, as illustrated by arrow 50, to press the heated layer 28 onto the previously-printed layer of 3D part 22. As shown in FIG. 4C, because layer 28 is heated to the fusion temperature of the thermoplastic-based powder, the pressed layer 28 transfuses to the top surface of 3D part 22.

The temperature of press plate 20, being lower than the desired average part temperature, and substantially lower than the fusion temperature, begins to draw heat from the heated region of belt 14 in a transfixing step. Additionally, the previously-printed layers of 3D part 22, which are at the desired average part temperature, may also conductively draw heat from the transfused layers and the heated region of belt 14. These assist in releasing the transfused layer 28 by cooling belt 14 from rear side 14b, as discussed above. As also mentioned above, at its fusion temperature, the minimum transfusion duration for an ABS-copolymer material can be as low as about 0.03 seconds. However, this low duration may be countered by the duration required for the transfixing step to cool the interface between belt 14 and the transfused layer 28.

As such, examples of suitable transfusion durations for pressing during the transfusion step range from about 0.1 seconds to about 1.0 second, with particularly suitable transfusion durations ranging from about 0.1 seconds to about 0.5 seconds. In some embodiments, the transfusion duration is a fixed value for each layer 28. In alternative embodiments, the transfusion duration may be varied based on the dimensions and geometry of 3D part 22. For example, the transfusion duration may be reduced for layers 28 having smaller cross-sectional areas and/or fine-feature details.

After the transfusion/transfixing step is completed, press plate 20 may then be retracted upward, as illustrated by arrow 52 in FIG. 4C, to release the pressure applied to belt 14 and the transfused layer 28. In the embodiment shown in FIG. 4D, this releases the layer 28 from belt 14, allowing the layer 28 to remain transfused to 3D part 22. Additionally, z-axis gantry 34 may lower build platform 18 downward, such as by a single layer increment or other suitable distance, as illustrated by arrow 54.

In an alternate embodiment, press plate 20 may be heated to the fusion temperature of the thermoplastic-based powder to assist in the transfusion of layer 28. In this embodiment, layer transfusion assembly 33 is desirably configured such that retracting press plate 20 upward does not immediately release the transfused layer 28 from belt 14. Rather, belt 14 may be maintained in a relatively constant position upon the retraction of press plate 20 by positioning build platform 18 in a higher position relative to that shown in FIG. 4D during the transfusion step. A separate transfixing step may then be utilized.

In this transfixing step, air knife 42 may be activated to cool the transfused layer 28 before releasing it from belt 14. After a duration sufficient to cool the layer material down below the fusion temperature, which maintains the transfused layer 28 in a fixed spatial position and adhered to 3D part 22, build platform 18 is then lowered to release transfused layer 28 from belt 14.

Air knife 42 may also be activated to blow cooling air onto the transfused layer 28 after delamination from belt 14. This actively cools the transfused layer 28 down to the desired average part temperature. Examples of suitable durations for this active cooling step range from about 1.0 second to about 2.0 seconds, which may correspond with the transfer and alignment of the next layer 28.

As can be appreciated, the transfer of layer 28 from belt 14 to build platform 18 requires a pause during the pressing step. Otherwise, the movement of belt 14 in the rotational direction of arrows 30 during the transfusion step may cause a mis-registration of the pressed layer 28, potentially resulting in lower part quality. These pauses during each transfusion step may be accommodated with the use of service loops, such as those disclosed in U.S. patent application Ser. No. 13/242,841.

Figure 4D:
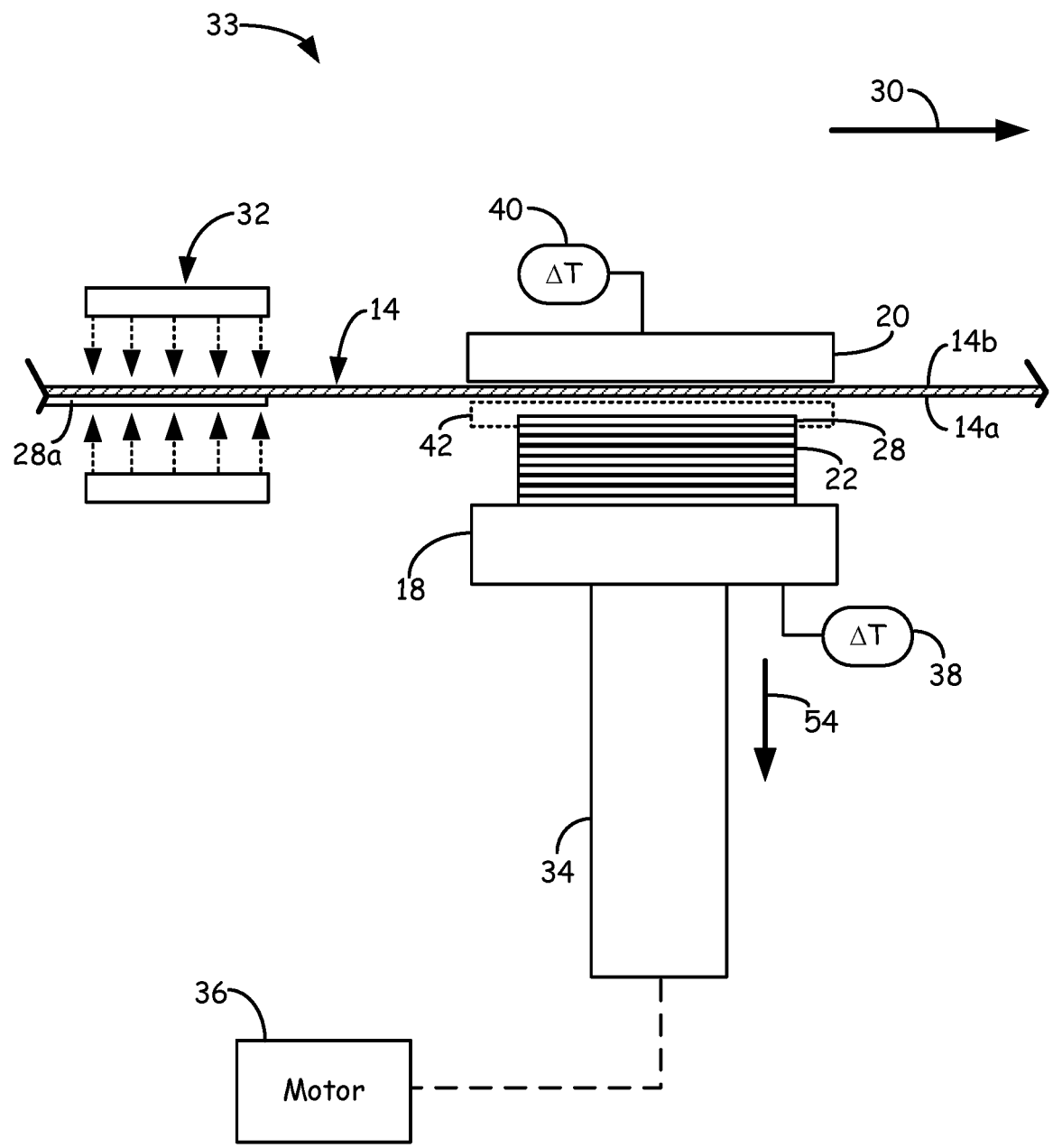

As further shown in FIGS. 4B-4D, as a present layer 28 is being transfused, the next layer 28a may be positioned at heater 32. This allows heater 32 to sufficiently heat the next layer 28a during the required pause while the present layer 28 is transfused to 3D part 22. After the layer 28 is transfused and cooled, the same process may then be repeated for layer 28a, and each subsequent layer for 3D part 22.

While layer transfusion assembly 33 is illustrated with a planar press plate 20, in alternative embodiments, press plate 20 may be replaced with different pressing mechanisms, such as rollers, partial-cylinder presses (configured to simulate rolling motions, e.g., blotters), and the like. The embodiments are beneficial for increasing part density due to their capabilities in expelling any gases (e.g., air) trapped between the powder particles. For example, FIGS. 5A-5E illustrate layer transfusion assembly 133, which is an alternative to layer transfusion assembly 33 of system 10 (shown in FIGS. 2A, 3A, and 4A-4D), and where the reference numbers of the respective components are increased by "100" from system 10.

Figure 5A:
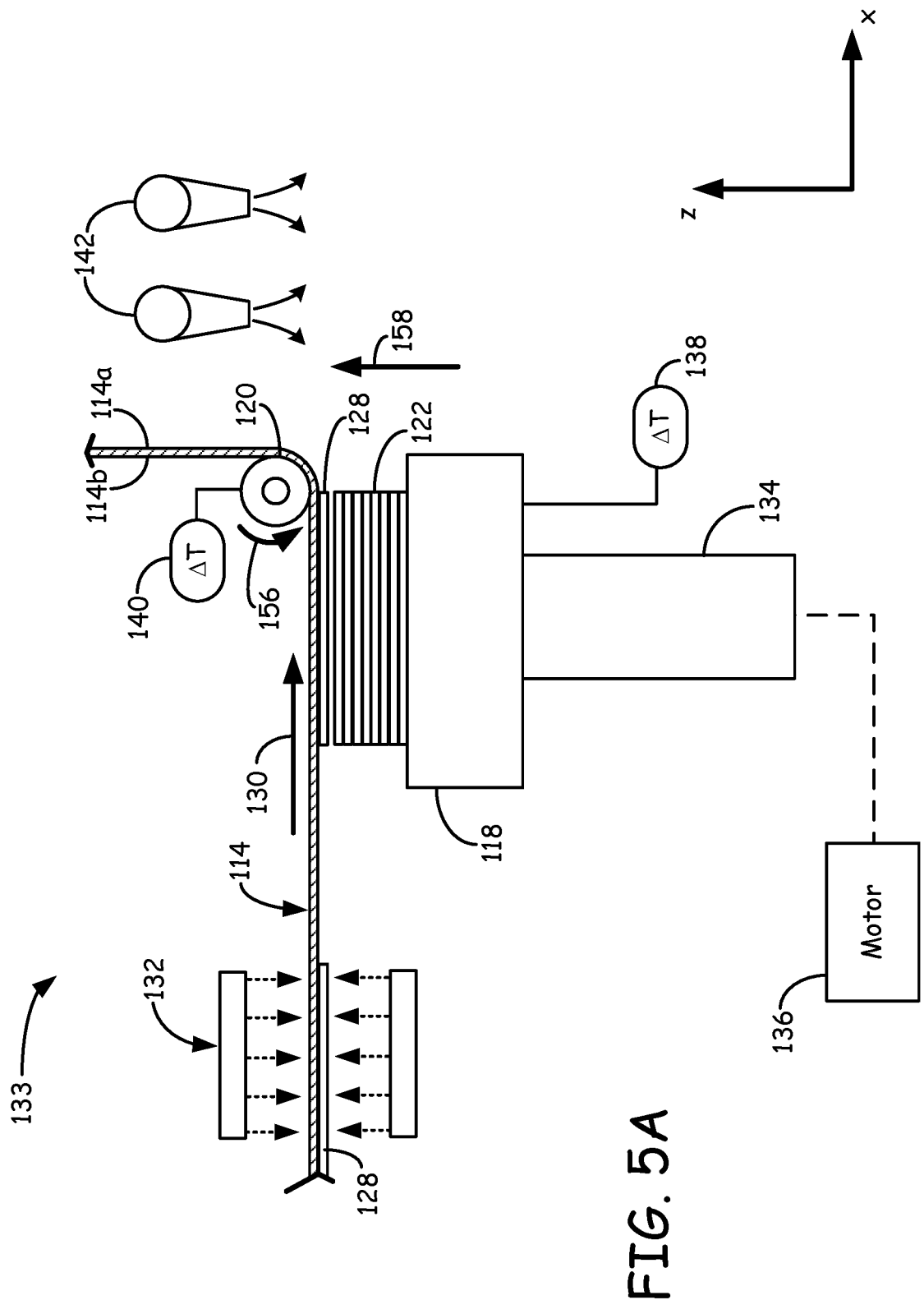

As shown in FIG. 5A, layer transfusion assembly 133 includes nip roller 120 in lieu of press plate 20, where nip roller 120 is another example heateable element or heatable layer transfusion element, and is configured to rotate around a fixed axis with the movement of belt 114. In particular, nip roller 120 may roll against rear surface 114b in the direction of arrow 156 while belt 114 rotates in the direction of arrows 130. In some embodiments, nip roller 120 may function as a drive roller for belt 114. While belt 114 is illustrated as bending around nip roller 120 at about a 90-degree angle, belt 114 may alternatively bend around nip roller 120 at about 180-degree angle in a U-shaped arrangement as shown below for belt 314 and nip roller 320 (shown below in FIG. 7).

As further shown, air jets 142 (or other suitable cooling units) are used in lieu of air knife 42, and are located downstream from the interface between belt 114 and nip roller 120. Air jets are configured to blow cooling air towards the top layers of 3D part 122 to actively cool the layers after each transfusion step, as discussed below. Air jets 142 may alternatively be replaced by a variety of different convective and/or conductive cooling units, such as refrigeration units, liquid-cooling units, evaporation units, and the like (e.g., one or more cold belts and/or drums, as discussed below).

In this embodiment, build platform 118 is supported by gantry 134, which is a guide mechanism configured to move build platform 118 along the z-axis and the x-axis to produce a reciprocating rectangular pattern, where the primary motion is back-and-forth along the x-axis. Gantry 134 may be operated by motor 136 based on commands from controller 124, where motor 136 may be an electrical motor, a hydraulic system, a pneumatic system, or the like. Accordingly, the pressure that is applied during each transfusion step is performed by build platform 118.

Prior to printing 3D part 122, build platform 118 and nip roller 120 may be heated to their desired temperatures, as discussed above for build platform 18 and press plate 20. In comparison to press plate 20, heating element 140 may heat nip roller 120 to a higher temperature (e.g., to the average part temperature, such as about 100° C. for an ABS copolymer) since there is a relatively short time for the heat to locally flow from nip roller 120 through belt 114.

During the printing operation, heater 132 heats an imaged powder layer 128 and the associated region of belt 114 to an intended transfer temperature of the thermoplastic-based powder, such as to at least the fusion temperature of the thermoplastic-based powder (e.g., about 200° C. for an ABS copolymer). Belt 114 may then move the heated layer 132 to a predetermined registration location along the x-axis, as shown. Gantry 134 may then actuate build platform 118 upward to engage belt 114, which presses the top layer of 3D part 122 against the heated layer 124, as illustrated by arrow 158. Alternatively, nip roller 120 may be actuated downward to meet the top layer or surface of 3D part 122.

Figure 5B:
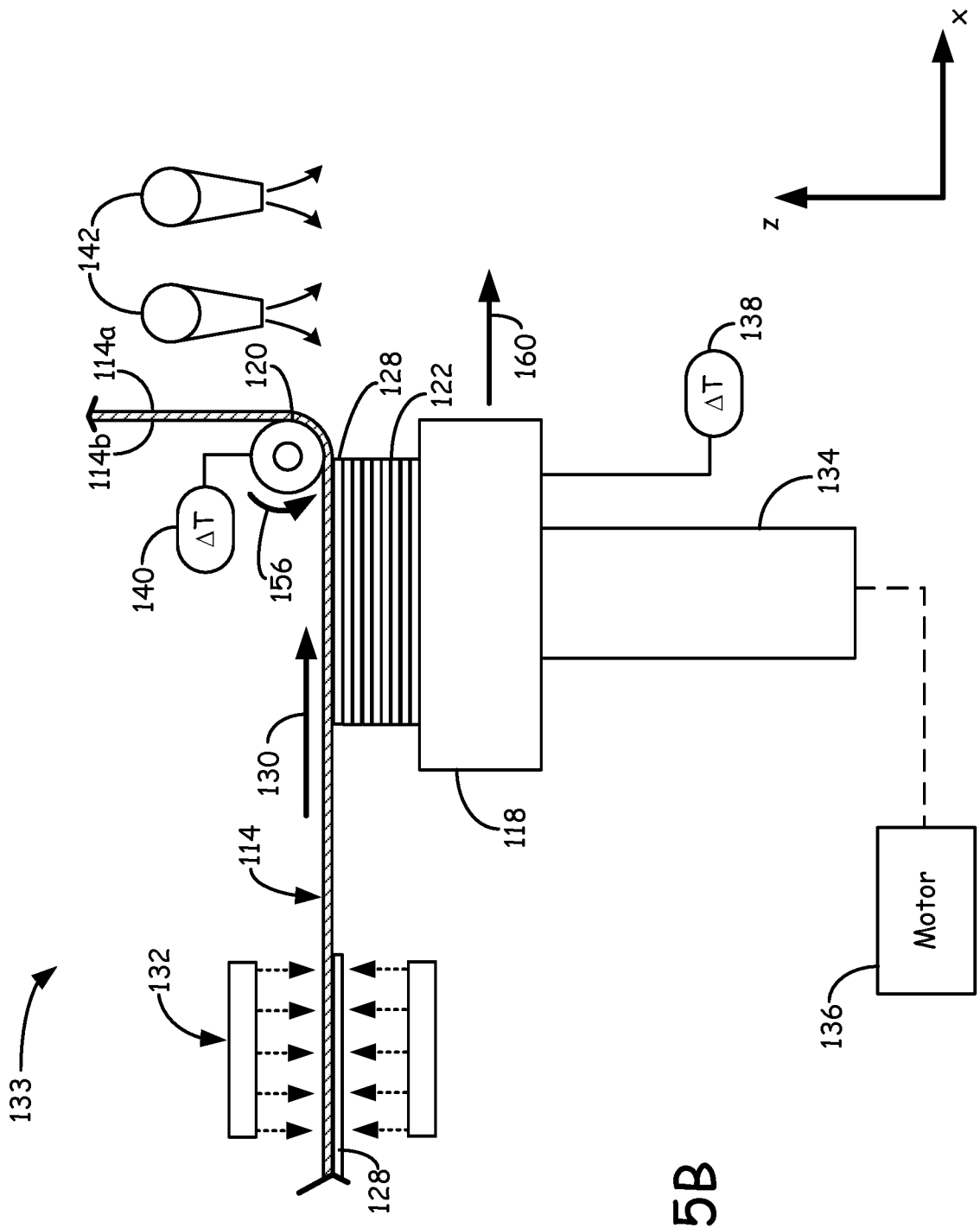

As shown in FIG. 5B, this presses the heated layer 128 between the top layer of 3D part 122 and belt 114 at the location of nip roller 120. While build platform 118 remains engaged with belt 114, gantry 134 may then move build platform 118 (and 3D part 122) along the x-axis in the direction of arrow 160, at a rate that is synchronized with the rotational rate of belt 114 in the direction of arrow 130 (i.e., the same directions and speed). This presses belt 114 and the heated layer 128 between the top layer of 3D part 122 and nip roller 120.

Figure 5C:
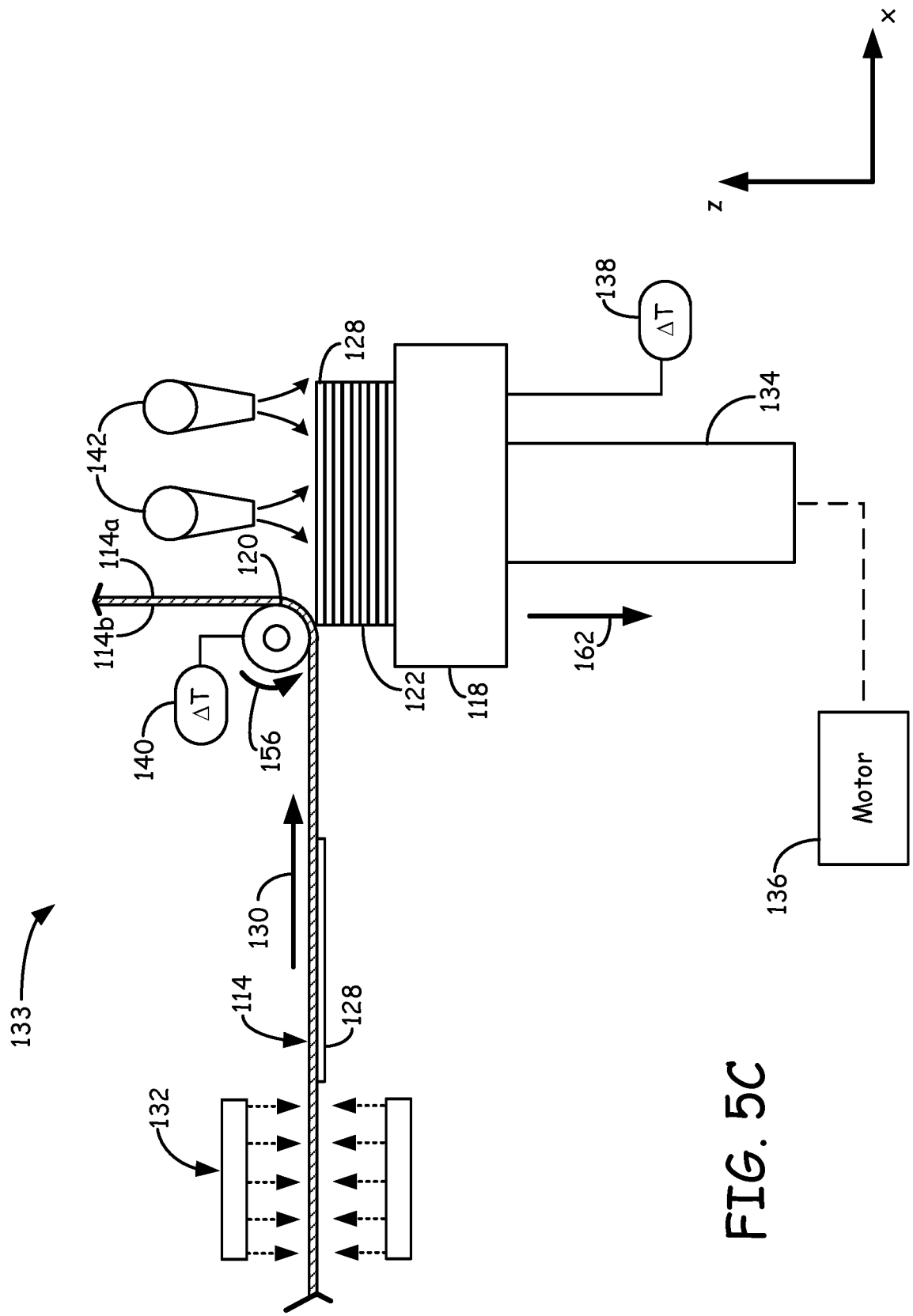

As shown in FIG. 5C, this causes rear surface 114b of belt 114 to roll across nip roller 120 to nip belt 114 and the heated layer 128 against the top layer of 3D part 122. Because layer 128 is heated to the fusion temperature of the thermoplastic-based powder and 3D part 122 is maintained at the average part temperature, the pressed layer 128 transfuses to the top layer of 3D part 122 in a similar manner to that discussed above for 3D part 22 and layer 28.

As further shown, as the transfused layer 128 passes the nip of nip roller 120, belt 114 wraps around nip roller 120 to separate and disengage from build platform 118. This assists in releasing the transfused layer 128 from belt 114, allowing the transfused layer 128 to remain adhered to 3D part 122. Additionally, air jets 142 blow cooling air towards the top layers of 3D part 122 as build platform 118 moves along the x-axis past nip roller 120 to cool down the transfused layer 128. The transfused layer 128 may be cooled down to the average part temperature (e.g., about 100° C. for an ABS copolymer) by continuing to blow cooling air against the 3D part 122 in between transfusion steps.

Figure 5D:
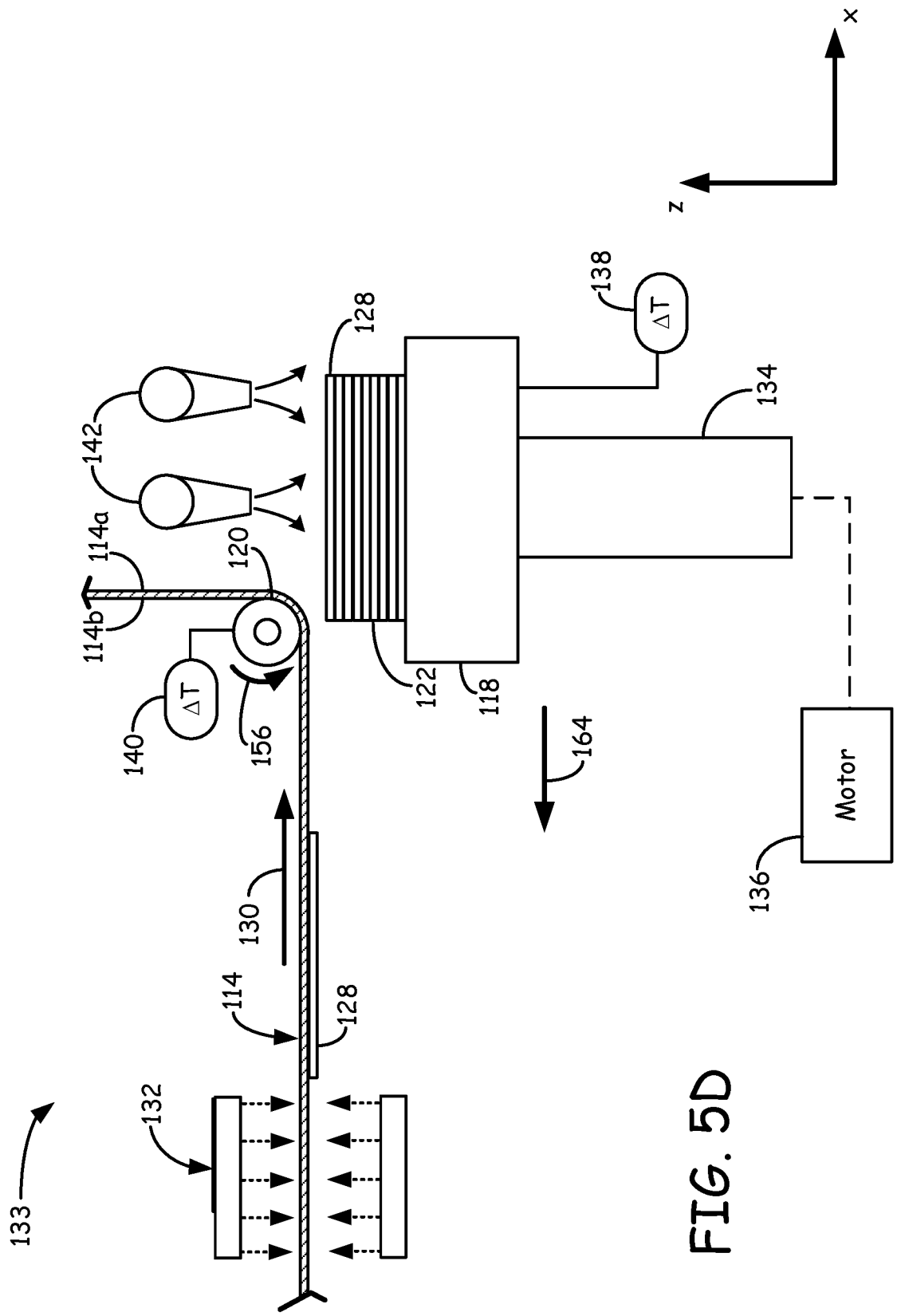

When build platform 118 moves 3D part 122 past nip roller 120, gantry 134 may actuate build platform 118 (and 3D part 122) downward, as illustrated by arrow 162. As shown in FIG. 5D, gantry 134 may then move build platform 118 (and 3D part 122) along the x-axis in the direction of arrow 164, back to a starting position along the x-axis. As shown in FIG. 5E, build platform 118 desirably reaches the starting position as the next heated layer 128 is positioned above 3D part 122. The same process may then be repeated, where gantry 134 actuates build platform 118 upward to press belt 114 and the next heated layer 128 between the top layer of 3D part 122 and roller 120, as illustrated by arrow 166. In this step, however, the height of the top surface of 3D part 122 is offset downward, such as by a single layer increment, compared to the previous pressing step.

As can be appreciated, moving build platform 118 (and 3D part 122) in the reciprocating rectangular pattern allows the transfusion steps to be performed while belt 114 continuously rotates. In particular, moving build platform 118 at a rate that is synchronized with the rotational rate of belt 114, along with the use of nip roller 120, which rotates against rear surface 114b of belt 114, allows the transfusion and transfixing steps to be performed rapidly (e.g., within about 0.1 to about 0.5 seconds). This allows the active cooling steps to range from about 1.0 second to about 2.0 seconds, which may correspond with the transfer and alignment of the next heated layer 28.

While the reciprocating rectangular pattern is described as a rectangular pattern with sharp axial corners (defined by arrows 160, 162, 164, and 166), gantry 134 may move build platform 118 (and 3D part 122) in a reciprocating rectangular pattern having rounded or oval-defining corners, so long as build platform 118 moves linearly along the x-axis during the transfusion steps.

As can be appreciated from the depictions in FIGS. 5C and 5D, air jets 142 may direct cooling air towards 3D part 122 in a global manner, where cooling air, while directed at the top layers of 3D part 122, may also flow around the lateral sides of 3D part 122. Depending on the geometry of 3D part 122, this global cooling can cool 3D part 122 down below its desired average part temperature, which can have adverse effects on 3D part 122 in some circumstances (e.g., curling issues).

As such, in some embodiments, air jets 142 may be replaced with one or more localized cooling mechanisms or units, such as one or more cold belts and/or drums, which can contact the top layers of 3D part 122 to selectively cool only the areas of 3D part 122 that are in contact with the cooling unit 642. In other words, the cold belts and/or drums only cool the top heated layers of 3D part 122 in a localized manner, rather than a global cooling of 3D part 122. This draws away the additional heat from the transfused layers (and a portion of the previously-printed layers) in an active cooling step without cooling down the entire 3D part 122. This accordingly precludes the need to heat the bulk of 3D part 122 back up to its desired average part temperature. Examples of suitable cooling units in these embodiments include those discussed below for layer transfusion assembly 633 (e.g., cooling unit 642, shown below in FIG. 10).

FIGS. 6A-6F illustrate layer transfusion assembly 233, which is an alternative to layer transfusion assembly 133 (shown in FIGS. 5A-5E), and where the reference numbers of the respective components are increased by "200" from system 10 (shown in FIGS. 2A, 3A, and 4A-4D). Layer transfusion assembly 233 may function in a similar manner to layer transfusion assembly 133, where build platform 218 may move in a reciprocating rectangular pattern.

Figure 6A:
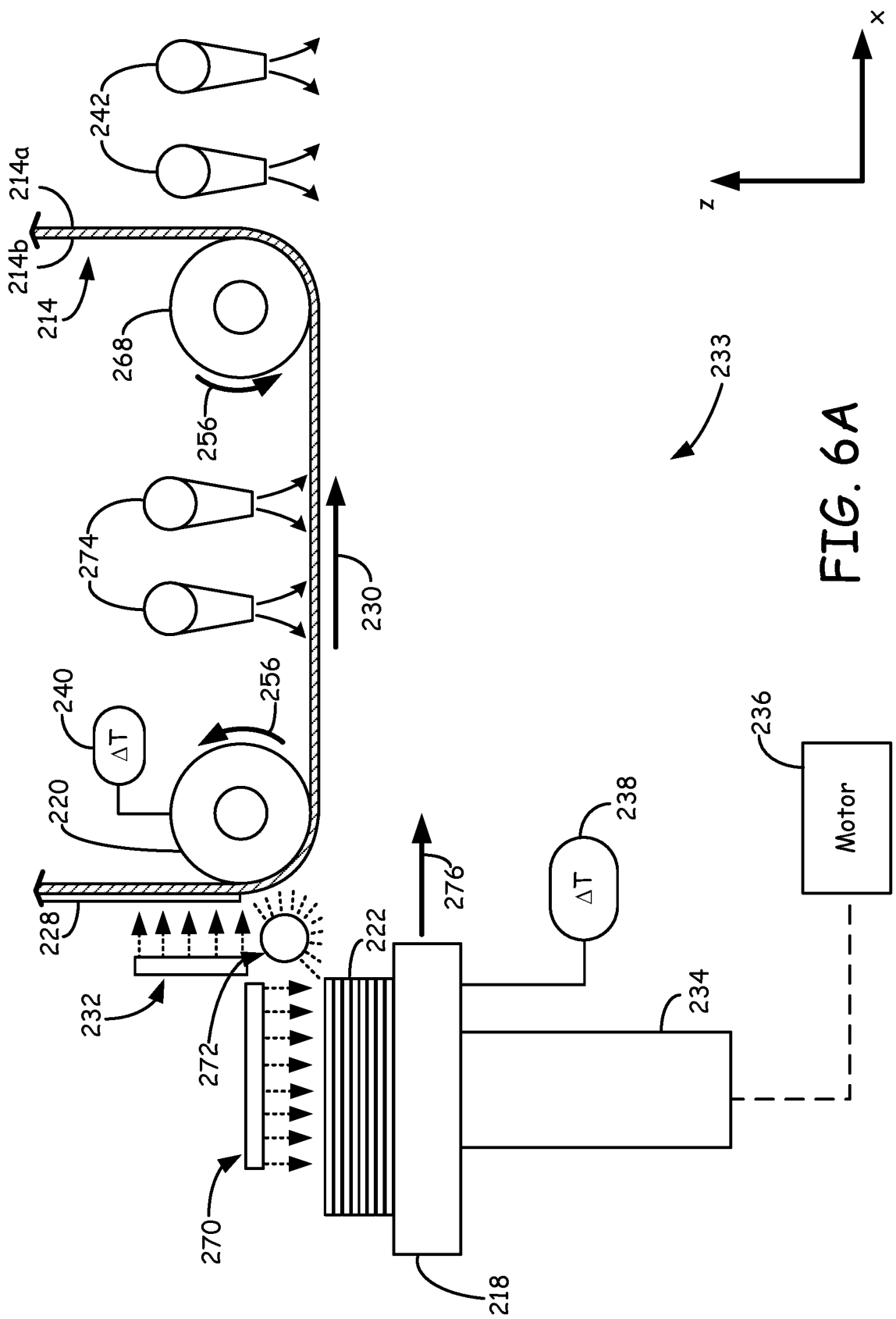
FIGS. 6A-6F are expanded views of a second alternative layer transfusion assembly of the electrophotography-based additive manufacturing system, having separate transfusion and release rollers, and which illustrate a layer transfer technique.

However, as shown in FIG. 6A, layer transfusion assembly 233 includes fusion roller 220 and release roller 268 in lieu of a single nip roller 120, where fusion roller 220 and release roller 268 are each configured to rotate around an axis with the movement of belt 214. The use of separate rollers (i.e., fusion roller 220 and release roller 268) separates the functions of each roller, allowing them to be optimized for their particular purposes. For example, fusion roller 220 may be heated to a high transfer temperature (e.g., the fusion temperature of the thermoplastic-based powder) to accelerate the layer transfusion, and release roller 268 may be maintained at a substantially lower temperature to assist in delaminating the transfused layers 228 from belt 214.

As further shown, layer transfusion assembly 233 also includes heaters 270 and 272 and air jets 274. The separation of fusion roller 220 and release roller 268 creates separate transfusion and release steps, and allows a transfixing step to be performed therebetween via cooling by air jets 274. By postponing the release step, fusion roller 220 may be heated to a transfer temperature best suited for the transfusion step (e.g., the fusion temperature of the thermoplastic-based powder), rather than a compromise temperature that facilitates both transfusion and release. This can increase the printing speed and/or increase the interlayer adhesion between the transfused layers 228 per transfusion step, while also cleanly releasing the transfused layers 228 from belt 214.

Prior to printing 3D part 222, build platform 218 and fusion roller 220 may be heated to their desired temperatures. For example, build platform 218 may be heated to the average part temperature (e.g., about 100° C. for an ABS copolymer) and fusion roller 220 may be heated to the transfer temperature of the thermoplastic-based powder (e.g., to the fusion temperature, such as about 200° C. for an ABS copolymer). During the printing operation, belt 214 carries an imaged powder layer 228 past heater 232, which heats the imaged powder layer 228 and the associated region of belt 214 to the desired transfer temperature.

Additionally, platen gantry 234 moves build platform 218 along the x-axis in the direction of arrow 276 below, along, or through heater 270. Heater 270 may function in the same manner as heaters 32 and 232, and heats the top surface of 3D part 222 to an elevated temperature, such as at the same transfer temperature as the heated layer 228 (or other suitable elevated temperature).

Figure 6B:
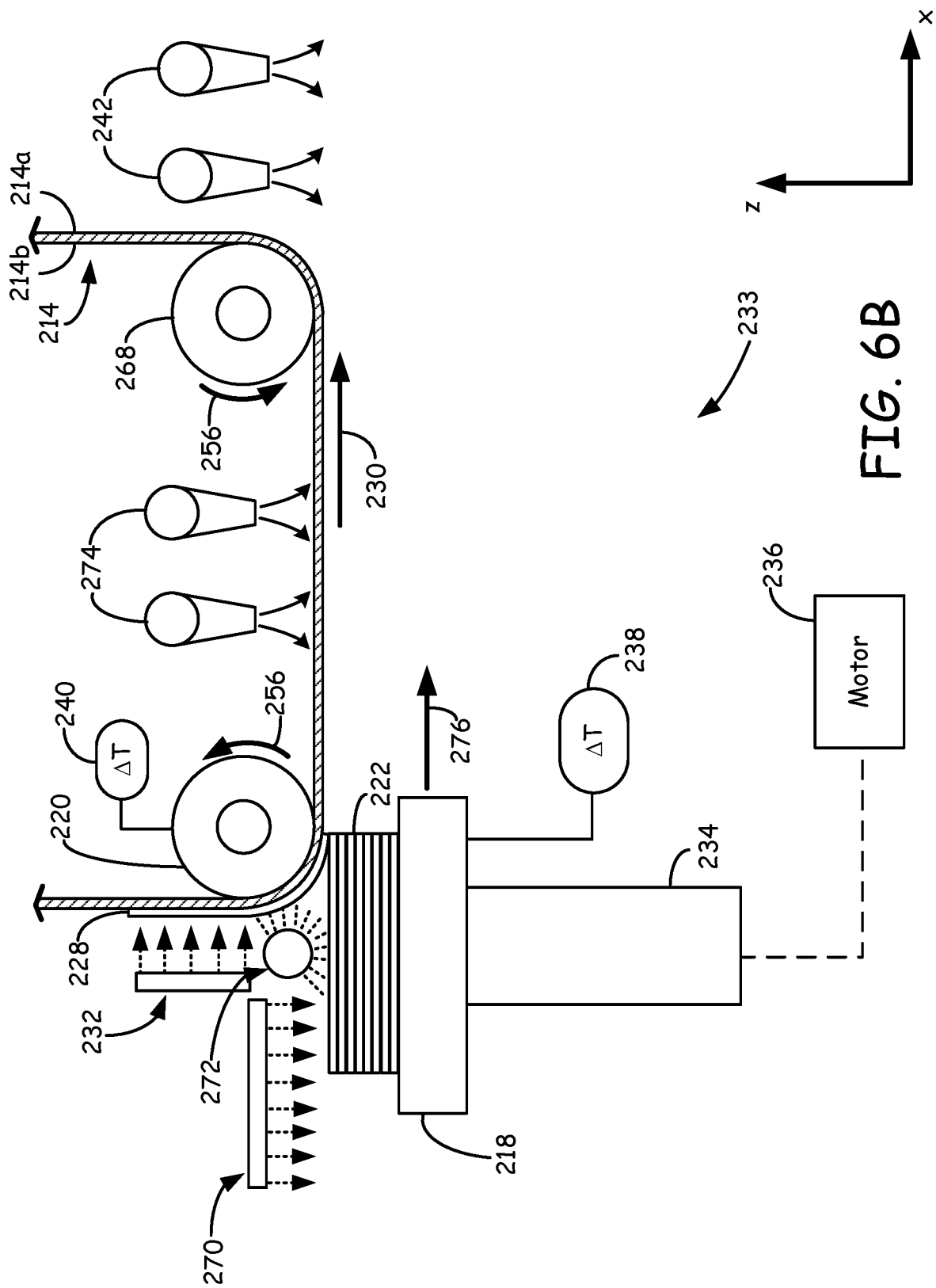

As shown in FIG. 6B, the continued rotation of belt 214 and the movement of build platform 218 align the heated layer 228 with the heated top surface of 3D part 222 with proper registration along the x-axis. Furthermore, the heated layer 228 and the heated top surface of 3D part 222 each pass heater 272, which may be configured to heat and/or maintain both the heated layer 228 and the heated top surface of 3D part 222 at the transfer temperature of the layer material. This prevents the heated layer 228 from cooling down prior to reaching fusion roller 220, and brings the temperature of the heated top surface of 3D part 222 to or near the transfer temperature before the next transfusion step is performed. In alternative embodiments, one or more of heaters 232, 270, and 272 may be provided a single heater configured to direct heat in multiple directions (e.g., towards both the layer 228 and the top surface of 3D part 222).

In further alternative embodiments, one or both of heaters 270 and 272 may be omitted if not needed. Correspondingly, one or both of heaters 270 and 272 may also be utilized with layer transfusion assembly 133 (shown above in FIGS. 5A-5E) in the same manner as for layer transfusion assembly 233 to direct heat towards the top surface of 3D part 122 prior to the transfusion step.

Gantry 234 may continue to move build platform 218 (and 3D part 222) along the x-axis in the direction of arrow 276, at a rate that is synchronized with the rotational rate of belt 214 in the direction of arrow 230 (i.e., the same directions and speed). This causes rear surface 214b of belt 214 to rotate around fusion roller 220 to nip belt 214 and the heated layer 228 against the top surface of 3D part 222. This engages build platform 218 and belt 214, and presses the heated layer 228 between the heated top surface of 3D part 222 and belt 214 at the location of fusion roller 220.

Because layer 228 and the heated top layer of 3D part 222 are can each be heated to the fusion temperature of the thermoplastic-based powder, the pressed heated layer 228 transfuses to the heated top surface of 3D part 222 with a high level of interlayer adhesion. By separating fusion roller 220 and release roller 268, with a cooling step therebetween via air jets 274, layer transfusion assembly 233 allows the layers to be heated to an optimal transfusion interface temperature, and to be cooled to a temperature that fixes the layers before release.

For example, the transfusion interface temperature for transfusing the layers together may be at about the fusion temperature of the thermoplastic-based powder (e.g., about 200° C. for an ABS copolymer). This can substantially increase the printing speed and/or increase the extent to which the polymer molecules of the transfused layers inter-diffuse per transfusion step to promote interfacial entanglement, while also maintaining dimensional accuracy of 3D part 222.

Figure 6C:
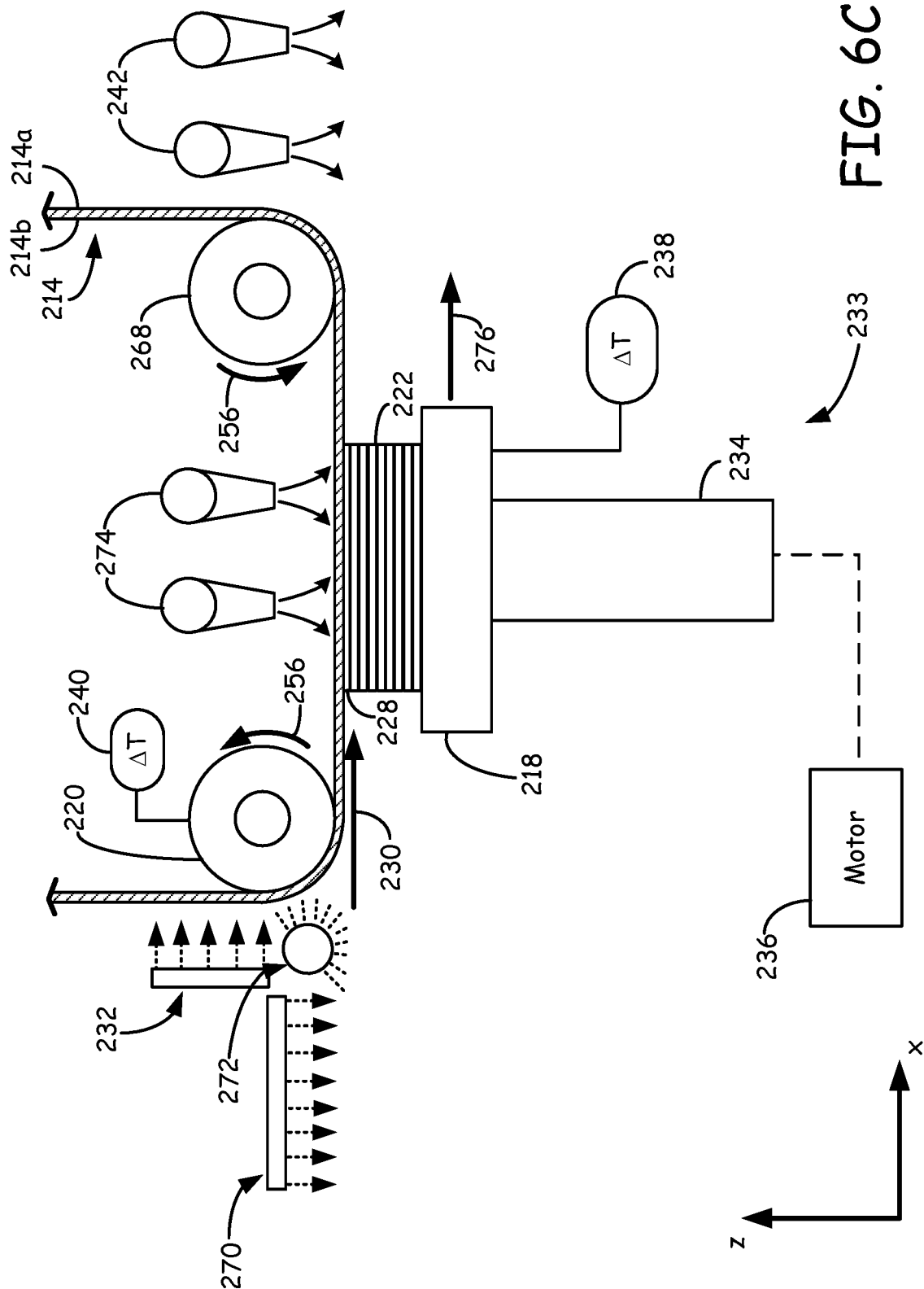

As shown in FIG. 6C, after passing fusion roller 220, and while build platform 218 remains engaged with belt 214, belt 214, build platform 218, and 3D part 222 pass air jets 274. Air jets 274 may function in the same manner as air jets 142 and 242 for cooling belt 214 the side of rear surface 214b. In alternative embodiments, air jets 274 may be a variety of different convective and/or conductive cooling units, such as refrigeration units, liquid-cooling units, evaporation units, and the like.

As discussed above, if the transfused layer 228 remains too hot, portions of it may remain adhered to front surface 214a of belt 214, rather than cleanly releasing from belt 214. As such, cooling belt 214 with air jets 274 allows the interface between front surface 214a of belt 214 and the transfused layer 228 to cool so that the transfused layer 228 will remain adhered to 3D part 222 and cleanly release from belt 214. This also partially assists in the active cooling of 3D part 222 to maintain 3D part 222 at the average part temperature below its deformation temperature, as illustrated above in Equation 4.

Figure 6D:
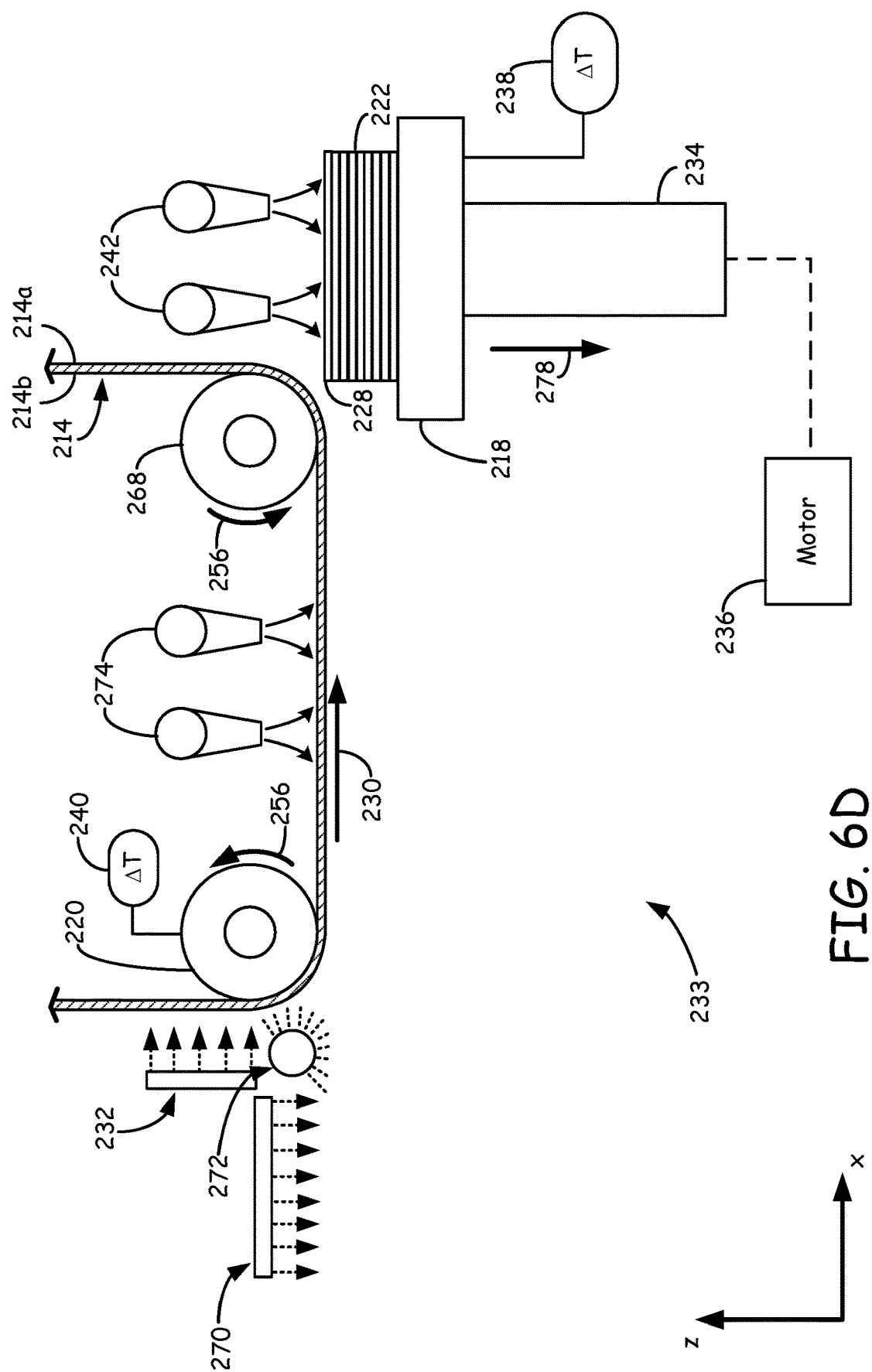

As further shown in FIG. 6D, as the transfused layer 228 passes the nip of release roller 268, belt 214 rotates around release roller 268 to separate and disengage from build platform 218. This assists in releasing the transfused layer 228 from belt 214, in an "assisted delamination" step, allowing the transfused layer 228 to remain adhered to 3D part 222. Additionally, air jets 242 blow cooling air towards the top layers of 3D part 222 as build platform 218 moves along the x-axis past release roller 268. This actively cools the transfused layer 228 down to the average part temperature, as also illustrated above in Equation 4.

Figure 6E:
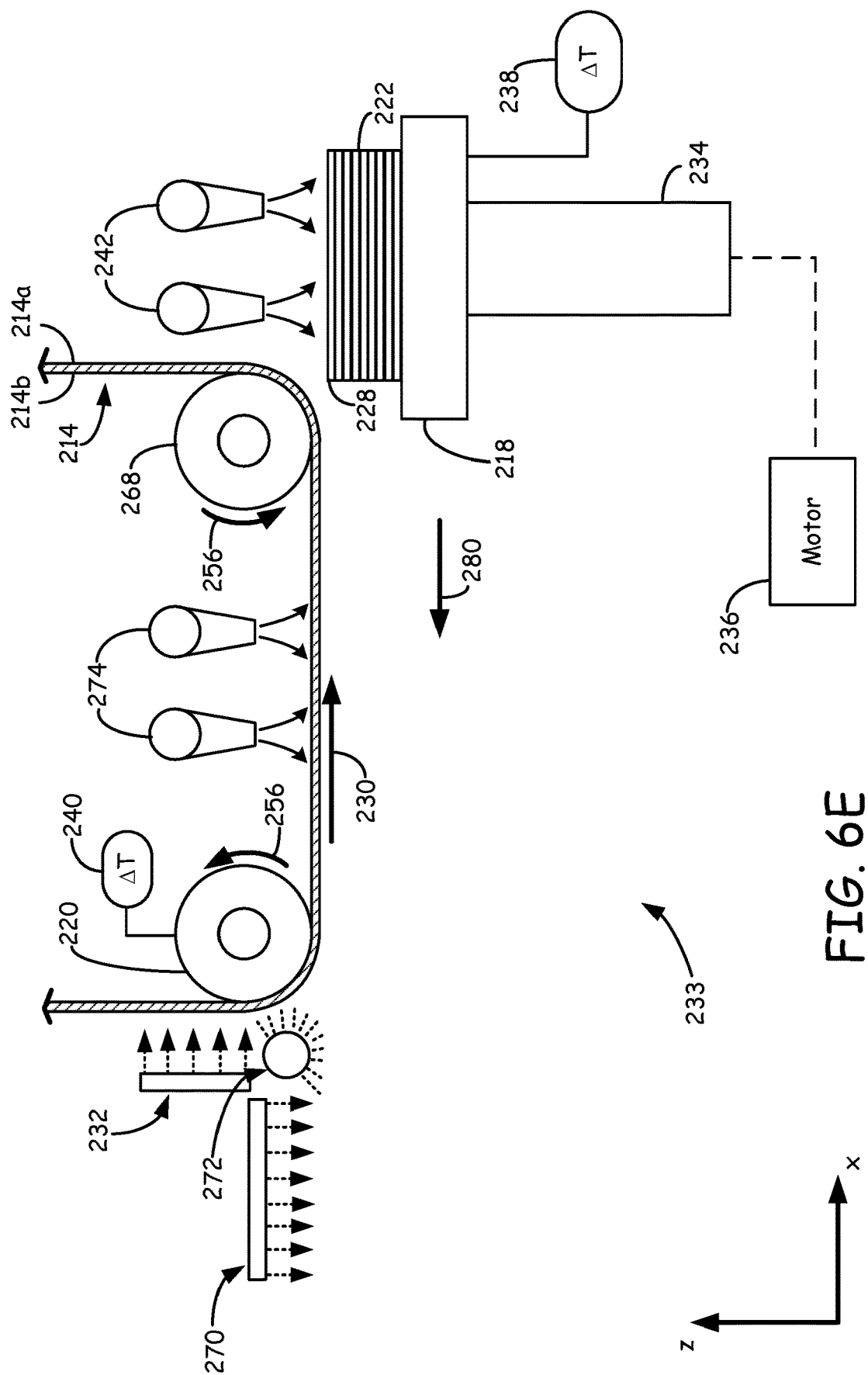

When build platform 218 moves 3D part 222 past release roller 268, gantry 234 may actuate build platform 218 (and 3D part 222) downward, as illustrated by arrow 278. For example, build platform 218 may be incrementally offset downward by a single layer increment. As shown in FIG. 6E, gantry 234 may then move build platform 218 (and 3D part 222) along the x-axis in the direction of arrow 280, back to a starting position along the x-axis.

Figure 6F:
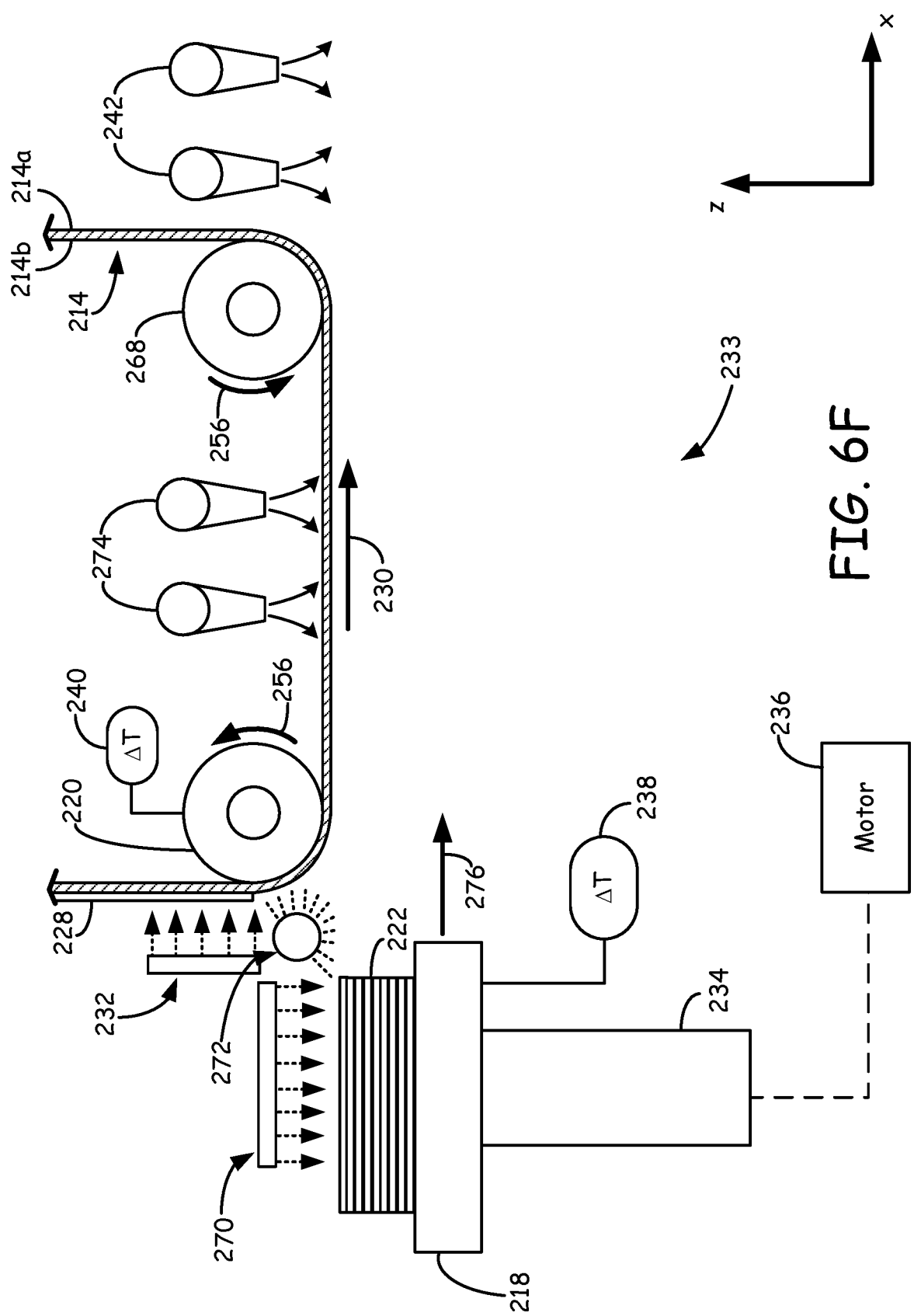

As shown in FIG. 6F, build platform 218 desirably reaches the starting position for proper registration with the next layer 228. In some embodiments, gantry 234 may also actuate build platform 218 and 3D part 222 upward for proper registration with the next layer 228. The same process may then be repeated for each remaining layer 228 of 3D part 222. Layer transfusion assembly 233 provides the benefits of transfusing the layers together at the desired transfer temperature (e.g., the fusion temperature of the thermoplastic-based material) to increase interlayer adhesion, while also sufficiently cooling down the interface between front surface 214a of belt 214 and the transfused layers 228 to transfix the layers 228 in place before release from belt 214. This promotes a clean release by assisting the delamination from belt 214.

In addition, for each printed layer 228, the combination of air jets 242 and 274 (or other cooling units) substantially removes the heat that is added from heating elements 232, 270, 272, and from the heated fusion roller 220, prior to printing the next layer 228. This active cooling substantially removes the heat provided by each layer 228, thereby providing substantially zero heat accumulation after each printed layer 228. As such, 3D part 222 may be substantially maintained at an average part temperature that is below its deformation temperature during the entire printing operation. Further, the top layer surface temperature of the printed 3D part 222 may be brought back up to the transfer temperature after delamination using heater 270 and/or 272 of layer transfusion assembly 233 for optimal transfusion of the next layer 228.

Figure 7:
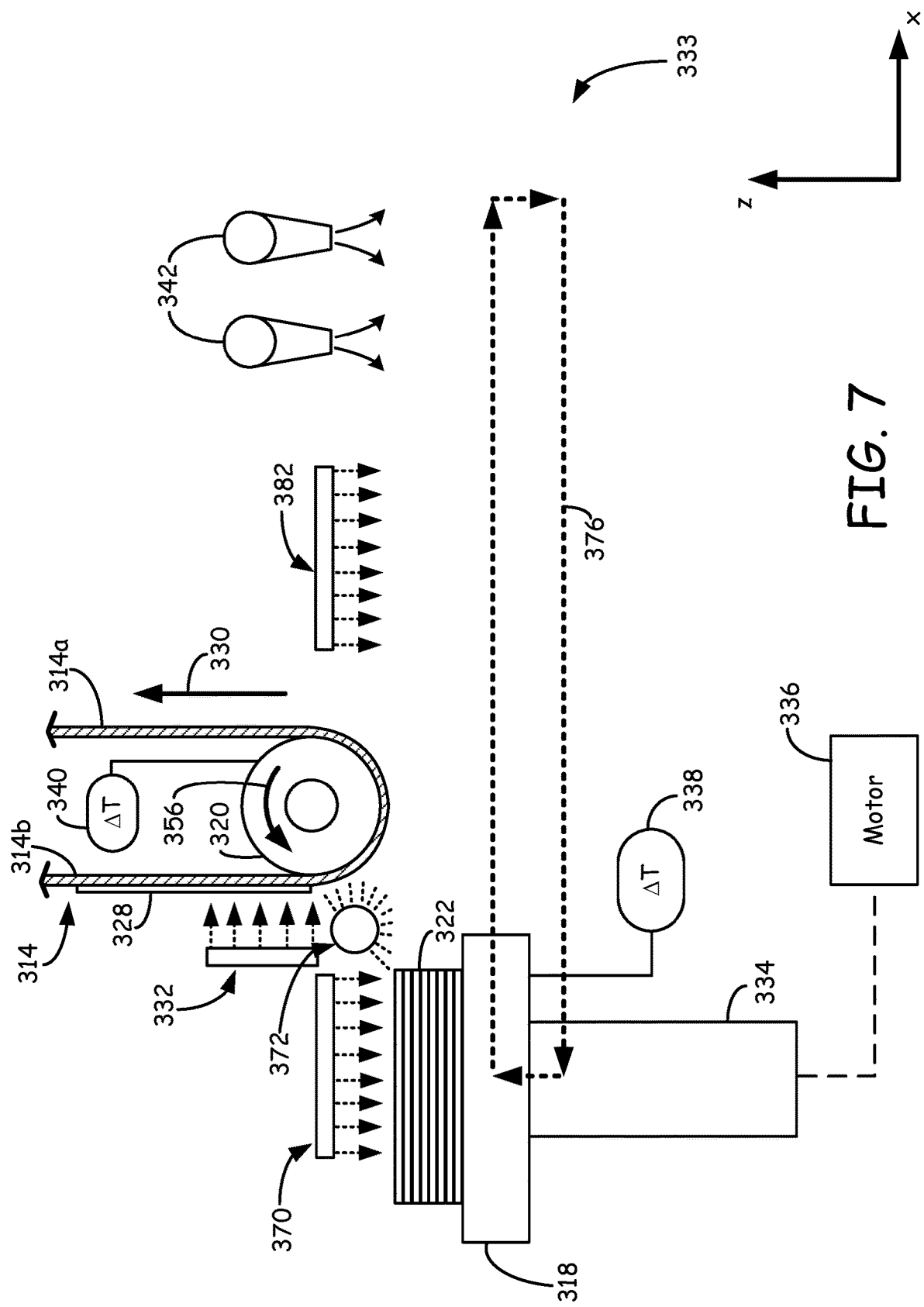
FIG. 7 is an expanded view of a third alternative layer transfusion assembly of the electrophotography-based additive manufacturing system, having a nip roller and a post heater, and which illustrates a layer transfer technique.
Figure 8:
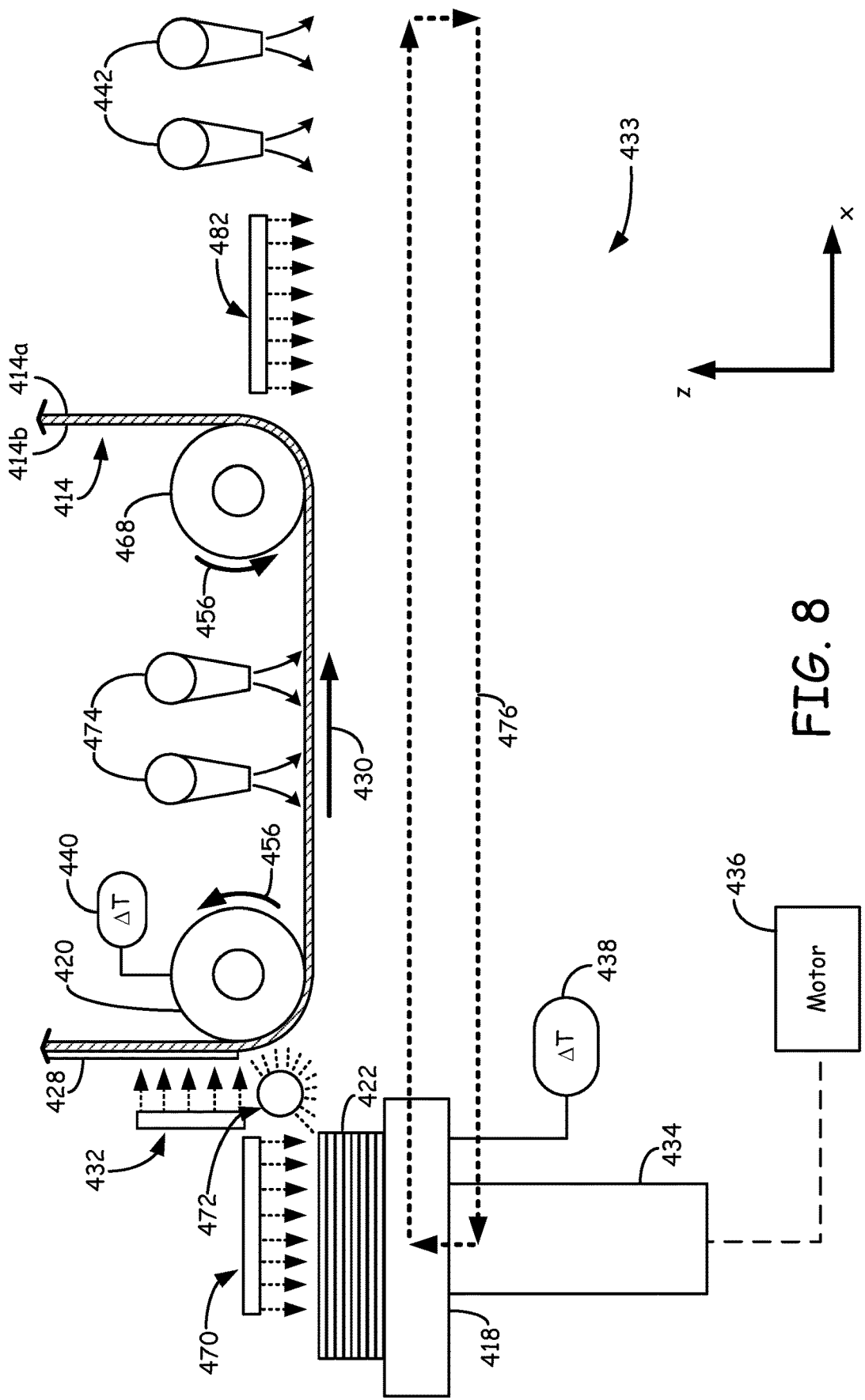
FIG. 8 is an expanded view of a fourth alternative layer transfusion assembly of the electrophotography-based additive manufacturing system, having separate transfusion and release rollers, and a post heater, and which illustrates a layer transfer technique.

FIGS. 7 and 8 illustrate layer transfusion assemblies 333 and 433, which are alternatives to layer transfusion assemblies 133 (shown in FIGS. 5A-5E) and layer transfusion assembly 233 (shown in FIGS. 6A-6F), and include post-fuse heaters 382 and 482 configured to perform a post-fuse or heat-setting step by heating the part surface to an elevated temperature (e.g., to at least the fusion temperature of the thermoplastic-based powder) after transferring a layer. As shown in FIG. 7, layer transfusion assembly 333 may function in a similar manner to layer transfusion assembly 133, where the reference numbers of the respective components are increased by "300" from system 10 (shown in FIGS. 2A, 3A, and 4A-4D).

As shown in FIGS. 7 and 8, this post-fuse step follows the transfusion/transfixing and release steps of the layer transfer process, which may be performed at a transfer temperature that is below the fusion temperature of the thermoplastic-based powder. The addition of post heaters 382 and 482 in layer transfusion assemblies 333 and 433 permits transferring of layers to 3D parts 322 and 422 at transfer temperatures optimized for clean and quick transfer of layers, without sacrificing part strength gained through interfacial bonding of the layer material at the fusion temperature of the thermoplastic-based powder. In this manner, part quality may be optimized for dimensional accuracy and porosity (by a clean transfer), and also for strength.

As shown in FIG. 7, layer transfusion assembly 333 also includes heaters 370 and 372 (in addition to post-fuse heater 382). Heaters 370 and 372 correspond to heaters 270 and 272 of layer transfusion assembly 233 and function in a similar manner for heating the top surface or layer(s) of 3D part 322 prior to the transfusion step. Post heater 382 is located downstream from nip roller 320 and upstream from air jets 342, and is configured to heat the transfused layers to an elevated temperature in the post-fuse or heat-setting step.

Prior to printing 3D part 322, build platform 318 and nip roller 320 may be heated to their desired temperatures. For example, build platform 318 may be heated to the average part temperature (e.g., about 100° C. for an ABS copolymer). However, nip roller 320 may be heated to a desired transfer temperature for an imaged layer 328.

During the printing operation, belt 314 carries the imaged powder layer 328 past heater 332, which heats the imaged powder layer 328 and the associated region of belt 314 to the transfer temperature. In comparison to layer transfusion assemblies 133 and 233, in which the imaged powder layers may be heated to at least the fusion temperature of the thermoplastic-based powder, the transfer temperature for imaged powder layer 328 is desirably less than its fusion temperature, but high enough to achieve partial entanglement of the polymer molecules between the heated layer 328 and 3D part 322 during the subsequent transfusion step. Suitable transfer temperatures for the thermoplastic-based powder include temperatures that exceed the glass transition temperature of the thermoplastic-based powder, where the layer material is softened but not melted, for example, a temperature of ranging from about 140° C. to about 180° C. for an ABS copolymer.

As further shown in FIG. 7, during operation, gantry 334 may move build platform 318 and 3D part 322 in a reciprocating rectangular pattern (depicted by arrows 376) in the same manner as gantries 134 and 234. In particular, gantry 334 moves build platform 318 along the x-axis below, along, or through heater 370. Heater 370 heats the top surface of 3D part 322 to an elevated temperature, such as the transfer temperature of the thermoplastic-based powder. As with the above-discussed embodiments, heaters 332 and 370 may heat the imaged powder layers 328 and the top surface of 3D part 322 to about the same temperatures to provide a consistent transfusion interface temperature. Alternatively, heaters 332 and 370 may heat the imaged powder layers 328 and the top surface of 3D part 322 to different temperatures to attain a desired transfusion interface temperature.

The continued rotation of belt 314 and the movement of build platform 318 align the heated layer 328 with the heated top surface of 3D part 322 with proper registration along the x-axis. Furthermore, the heated layer 328 and the heated top surface of 3D part 322 may each pass heater 372, which may be configured to heat and/or maintain both the heated layer 328 and the heated top surface of 3D part 322 at the transfer temperature. This prevents the heated layer 328 from cooling down prior to reaching nip roller 320, and brings the temperature of the heated top surface of 3D part 322 to or near the transfer temperature before the next transfusion step is performed. In alternative embodiments, heater 372 may be omitted.

Gantry 334 may continue to move build platform 318 (and 3D part 322) along the x-axis, at a rate that is synchronized with the rotational rate of belt 314 in the direction of arrow 330 (i.e., the same directions and speed). This causes rear surface 314b of belt 314 to rotate around nip roller 320 to nip belt 314 and the heated layer 328 against the top surface of 3D part 322. This engages build platform 318 and belt 314, and presses the heated layer 328 between the heated top surface of 3D part 322 and belt 314 at the location of nip roller 320. This at least partially transfuses heated layer 328 to the top layer of 3D part 322.

As the transfused layer 328 passes the nip of nip roller 320, belt 314 wraps around nip roller 320 to separate and disengage from build platform 318. This assists in releasing the transfused layer 328 from belt 314, in an assisted delamination step, allowing the transfused layer 328 to remain adhered to 3D part 322. As discussed above, maintaining the transfusion interface temperature at a transfer temperature that is higher than its glass transition temperature, but lower than its fusion temperature, allows the heated layer 328 to be hot enough to adhere to 3D part 322, while also being cool enough to readily release from belt 314.

After release, gantry 334 continues to move build platform 318 (and 3D part 322) along the x-axis to post-fuse heater 382. At post-fuse heater 382, the transfused layer 328 and 3D part 322 are then heated to at least the fusion temperature of the thermoplastic-based powder in a post-fuse or heat-setting step. This melts the material of the transfused layer 328 to a highly fusable state such that polymer molecules of the transfused layer 328 quickly interdiffuse to achieve a high level of interfacial entanglement with 3D part 322.

Additionally, as gantry 334 continues to move build platform 318 (and 3D part 322) along the x-axis past post-fuse heater 382 to air jets 342, air jets 342 blow cooling air towards the top layers of 3D part 322. This actively cools the transfused layer 328 down to the average part temperature, as discussed above.

Gantry 334 may then actuate build platform 318 (and 3D part 322) downward, and move build platform 318 (and 3D part 322) back along the x-axis to a starting position along the x-axis, following the reciprocating rectangular pattern 376. Build platform 318 desirably reaches the starting position for proper registration with the next layer 328. In some embodiments, gantry 334 may also actuate build platform 318 and 3D part 322 upward for proper registration with the next layer 328. The same process may then be repeated for each remaining layer 328 of 3D part 322.

Layer transfusion assembly 333 provides an alternative mechanism for transfusing the imaged layers 428 together at 3D part 322, while also keeping the heated layers 328 cool enough for clean release from belt 314. The heat-setting step performed after releasing each transfused layer 328 from belt 314 accordingly increase interlayer adhesion to promote good part strengths.

Additionally, air jets 342 (or other cooling units) substantially remove the heat that is added from heating elements 332, 370, and 372, and post-fuse heater 382 prior to printing the next layer 328. This active cooling substantially removes the heat provided by each layer 328, thereby providing substantially zero heat accumulation after each printed layer 328. As such, 3D part 322 may be substantially maintained at an average part temperature that is below its deformation temperature during the entire printing operation. Further, the top layer surface temperature of the printed 3D part 322 may be brought back up to above its glass transition temperature using heaters 370 and/or 372 for transfusion of the next layer 328.

As shown in FIG. 8, layer transfusion assembly 433 is a combination of layer transfusion assemblies 233 and 333, where the reference numbers of the respective components are increased by "400" from system 10 (shown in FIGS. 2A, 3A, and 4A-4D). Layer transfusion assembly 433 includes post-fuse heater 482 located downstream from release roller 468 and upstream from air jets 442, which may operate in the same manner as post-fuse heater 382 to heat the transfused layers to at least the fusion temperature of the thermoplastic-based powder in the post-fuse or heat-setting step.

Prior to printing 3D part 422, build platform 418 and fusion roller 420 may be heated to their desired temperatures. For example, build platform 418 may be heated to the average part temperature and fusion roller 420 may be heated to an elevated temperature, such as to the fusion temperature of the thermoplastic-based powder, as discussed above for fusion roller 220, or to a lower transfer temperature. During the printing operation, belt 414 carries an imaged powder layer 428 past heater 432, which heats the imaged powder layer 428 and the associated region of belt 414 to an elevated transfer temperature, desirably above the glass transition temperature and typically not exceeding the fusion temperature of the thermoplastic-based powder.

During operation, gantry 434 may move build platform 418 and 3D part 422 in a reciprocating rectangular pattern (depicted by arrows 476) in the same manner as gantries 134, 234, and 334. Gantry 434 may move build platform 418 along the x-axis below, along, or through heater 470, which heats the top surface of 3D part 422 to an elevated transfer temperature, likewise above the glass transition temperature and desirably not to exceeding the fusion temperature of the thermoplastic-based powder.

The continued rotation of belt 414 and the movement of build platform 418 align the heated layer 428 with the heated top surface of 3D part 422 with proper registration along the x-axis. Furthermore, the heated layer 428 and the heated top surface of 3D part 422 may each pass heater 472, which may be configured to heat and/or maintain both the heated layer 428 and the heated top surface of 3D part 422 at the transfer temperature. This prevents the heated layer 428 from cooling down prior to reaching fusion roller 420, and brings the temperature of the heated top surface of 3D part 422 to the transfer temperature before the next transfusion step is performed.

Gantry 434 may continue to move build platform 418 (and 3D part 422) along the x-axis, at a rate that is synchronized with the rotational rate of belt 414 in the direction of arrow 430 (i.e., the same directions and speed). This causes rear surface 414b of belt 414 to rotate around fusion roller 420 to nip belt 414 and the heated layer 428 against the heated top surface of 3D part 422. This engages build platform 418 and belt 414, and presses the heated layer 428 between the heated top surface of 3D part 422 and belt 414 at the location of fusion roller 420 to perform the transfusion step.

By separating fusion roller 420 and release roller 468, with a cooling step therebetween via air jets 474 (or other cooling mechanism), layer transfusion assembly 433 also allows the layers to be heated to a transfusion interface temperature higher than is permitted in using layer transfusion assembly 333. Where layer 428 and the heated top layer of 3D part 422 are heated to, at, or near the fusion temperature of the thermoplastic-based powder, the pressed heated layer 428 transfuses to the heated top surface of 3D part 422 with a high level of interlayer adhesion.

After passing fusion roller 420, and while build platform 418 remains engaged with belt 414, belt 414, build platform 418, and 3D part 422 pass air jets 474, which cool belt 414 the side of rear surface 414b, as discussed above for air jets 274. In alternative embodiments, air jets 474 may be a variety of different convective and/or conductive cooling units, such as refrigeration units, liquid-cooling units, evaporation units, and the like. Cooling belt 414 with air jets 474 allows the interface between front surface 414a of belt 414 and the transfused layer 428 to cool so that the transfused layer 428 will remain adhered to 3D part 422 and cleanly release from belt 414.

In particular, as the transfused layer 428 passes the nip of release roller 468, belt 414 rotates around release roller 468 to separate and disengage from build platform 418. This assists in releasing the transfused layer 428 from belt 414, in an assisted delamination step, allowing the transfused layer 428 to remain adhered to 3D part 422.

After release, gantry 434 continues to move build platform 418 (and 3D part 422) along the x-axis to post-fuse heater 482. At post-fuse heater 482, the transfused layer 428 and 3D part 422 are then heated back up to the fusion temperature of the thermoplastic-based powder in a heat-setting step. This melts the material of the transfused layer 428 to a fusable state such that polymer molecules of the transfused layer 428 become highly interdiffused to promote interfacial entanglement with 3D part 422. In effect, layer transfusion assembly 433 generates two interdiffusion steps separated by a transfixing step, a process particularly suitable for building very high strength parts.

Additionally, as gantry 434 continues to move build platform 418 (and 3D part 422) along the x-axis past post-fuse heater 482 to air jets 442, air jets 442 blow cooling air towards the top layers of 3D part 422. This actively cools the transfused layer 428 down to the average part temperature, as discussed above.

Gantry 434 may then actuate build platform 418 (and 3D part 422) downward, and move build platform 418 (and 3D part 422) back along the x-axis to a starting position along the x-axis, following the reciprocating rectangular pattern 476. Build platform 418 desirably reaches the starting position for proper registration with the next layer 428. In some embodiments, gantry 434 may also actuate build platform 418 and 3D part 422 upward for proper registration with the next layer 428. The same process may then be repeated for each remaining layer 428 of 3D part 422.

Layer transfusion assembly 433 provides a further alternative mechanism for transfusing the layers together, while also keeping the heated layers 428 cool enough for clean release from belt 414. The separation of fusion roller 420 and release roller 468, with a cooling or transfixing step therebetween via air jets 474, allows the layers to be heated to an optimal transfusion interface temperature, and to be cooled to a temperature that transfixes the layers 428 before release. Furthermore, the heat-setting step via post-fuse heater 482 provides an even greater control over part strength.

Accordingly, the thermal profile of the layers 428 and 3D part 422 may be tightly controlled to meet a variety of requirements. After release from belt 414, the transfused layer 428 may then be reheated to at least its fusion temperature via post-fuse heater 482, as discussed above, to further promote interfacial entanglement with 3D part 422.

Figure 9:
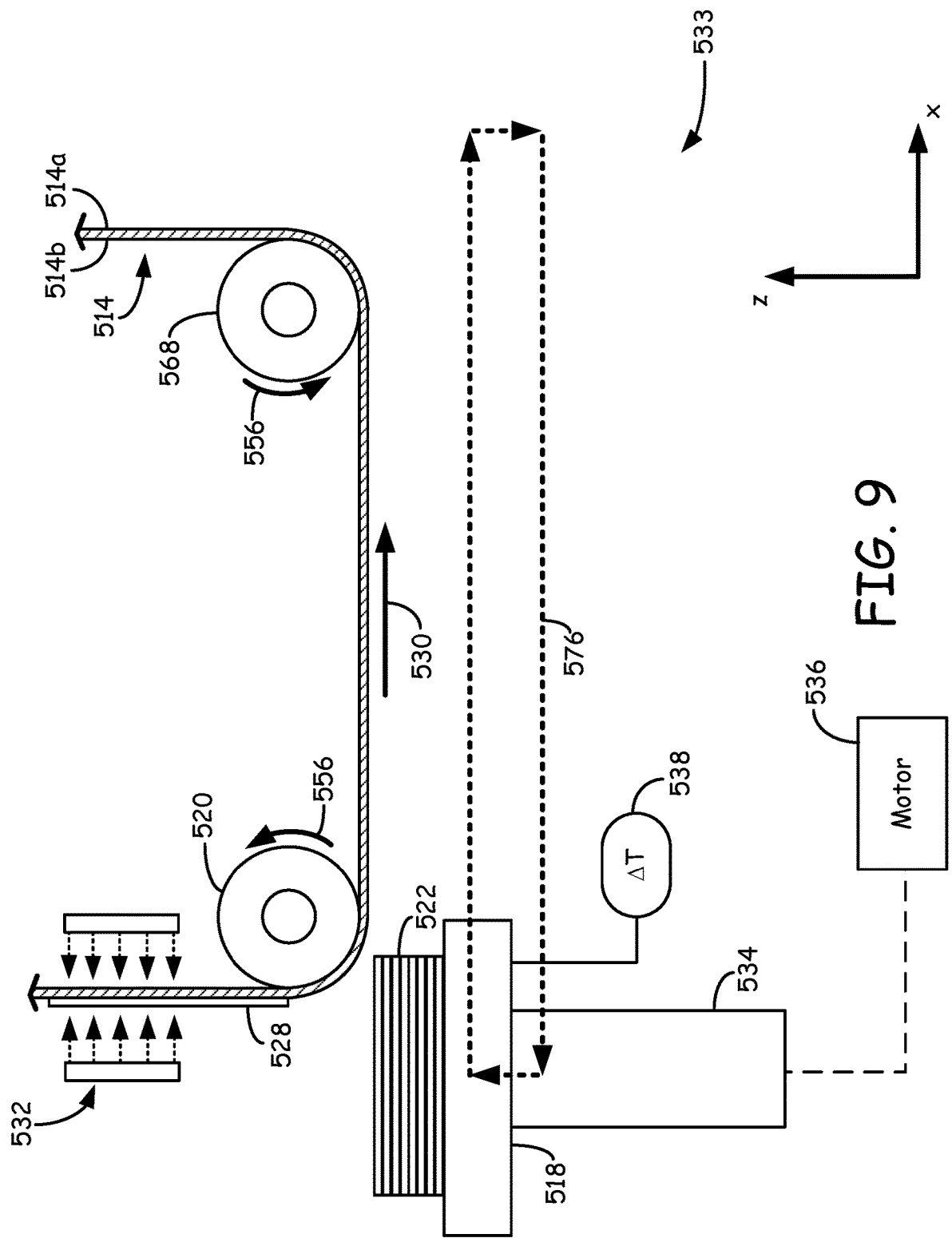
FIG. 9 is an expanded view of a fifth alternative layer transfusion assembly of the electrophotography-based additive manufacturing system, having separate transfusion and release rollers, and a belt with a high thermal conductivity and heat capacity, and which illustrates a layer transfer technique.
Figure 10:
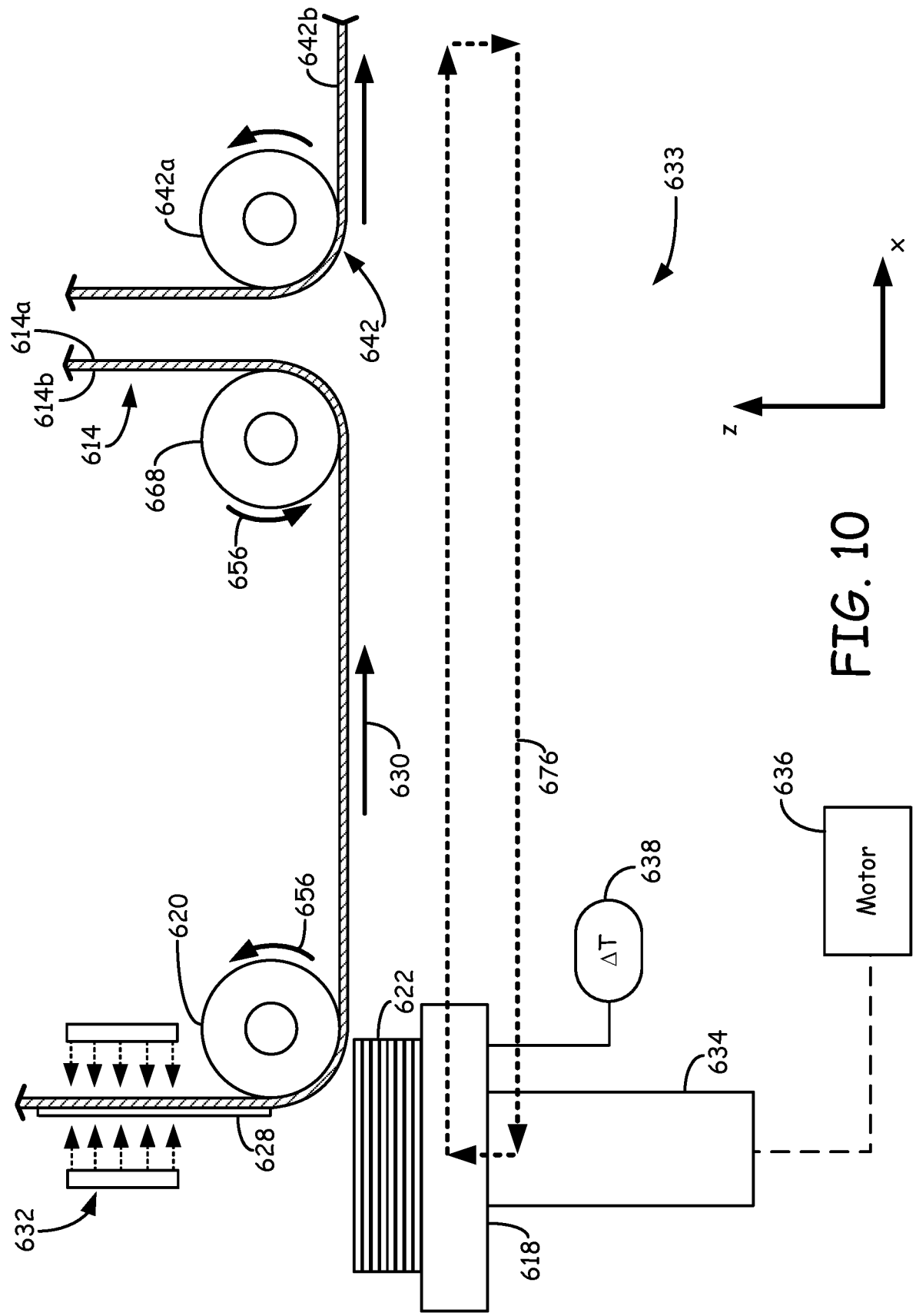
FIG. 10 is an expanded view of a sixth alternative layer transfusion assembly of the electrophotography-based additive manufacturing system, having separate transfusion and release rollers, a belt with a high thermal conductivity and heat capacity, and a contact cooling unit, and which illustrates a layer transfer technique.

FIGS. 9 and 10 illustrate layer transfusion assemblies 533 and 633, which are further alternatives layer transfusion assembly 233 (shown in FIGS. 6A-6F), where air jets 274 are omitted. For example, as shown in FIG. 9, layer transfusion assembly 533 may function in a similar manner to layer transfusion assembly 233, where the reference numbers of the respective components are increased by "500" from system 10 (shown in FIGS. 2A, 3A, and 4A-4D), and by "300" from layer transfusion assembly 233.

In this embodiment, belt 514 desirably functions as a heat capacitor for heating the layers 528 and 3D part 522. In particular, belt 514 desirably has a high thermal conductivity and high heat capacity, as discussed below. Heater 532 as shown is a non-contact radiant heater that directs heat to opposing faces of the belt, so as to heat the belt itself along with heating an imaged powder layer 528. As such, after being heated with heater 532, belt 514 may be the sole source of heating for the transfusion step, and nip roller 520 may optionally be unheated or heated to a lower temperature (e.g., the desired average part temperature). In other embodiments, an alternative or additional heat source may be used in place of heater 532, such as contact heat source or non-radiant heaters.

Accordingly, prior to printing 3D part 522, build platform 518 may be heated to its desired temperature (e.g., the average part temperature). During the printing operation, belt 514 carries imaged powder layer 528 past heater 532, which heats the imaged powder layer 528 and the associated region of belt 514 to an elevated transfer temperature, such as the fusion temperature of the thermoplastic-based powder. In this embodiment, due to its higher thermal conductivity and heat capacity, belt 514 desirably continues to heat the heated layer 528 during transit to build platform 518.

During operation, gantry 534 may move build platform 518 and 3D part 522 in a reciprocating rectangular pattern (depicted by arrows 576) in the same manner as gantries 134, 234, 334, and 434. The continued rotation of belt 514 and the movement of build platform 518 align the heated layer 528 with the top surface of 3D part 522 with proper registration along the x-axis. Gantry 534 may continue to move build platform 518 (and 3D part 522) along the x-axis, at a rate that is synchronized with the rotational rate of belt 514 in the direction of arrow 530 (i.e., the same directions and speed). This causes rear surface 514b of belt 514 to rotate around nip roller 520 to nip belt 514 and the heated layer 528 against the heated top surface of 3D part 522. This engages build platform 518 and belt 514, and presses the heated layer 528 between the top surface of 3D part 522 and belt 514 at the location of nip roller 520 to perform the transfusion step.

The conductive heating from belt 514 directly heats only those areas of 3D part 522 that are being fused together (i.e., the areas of 3D part 522 that are in contact with the heated layer 528 or belt 514. Additionally, belt 514 desirably conducts thermal energy to the transfused layer 528 and 3D part 522 as belt 514 and build platform 518 continue to move in the direction of arrow 530 from nip roller 520 to release roller 568. While not wishing to be bound by theory, it is believed that the release of thermal energy from belt 514 to the transfused layers of 3D part 522 during this step provides two functions.

First, it continues to heat the transfused layers of 3D part 522, thereby increasing the interlayer adhesion. For example, if belt 514 and layer 528 are heated to a fusion temperature of about 200° C., and 3D part 522 is maintained at an average part temperature of about 100° C., the initial transfusion interface temperature for transfusing the layers together starts at about 150° C. However, the continued conductance of thermal energy from belt 514 to the transfused layers of 3D part 522 while moving from nip roller 520 to release roller 568 increases the transfusion interface temperature. This accordingly increases the extent that the polymer molecules interdiffuse to promote interfacial entanglement, pursuant to the plot line function of $f(\tau_r)$ in FIG. 1 and Equations 1-3.

Second, the conductive heat transfer, which draws heat from belt 514 and layer 528 into the top-most layers of 3D part 522, cools belt 514 and layer 528 down from the fusion temperature to a lower temperature, so that when passing release roller 568 the transfused layer 528 may remain adhered to 3D part 522 and cleanly release from belt 514. Thus, drawing heat from belt 514 in this manner cools belt 514 and layer 528 down in a similar manner to air jets 274 and 474, without employing the jets.

In particular, as the transfused layer 528 passes the nip of release roller 568, belt 514 rotates around release roller 568 to separate and disengage from build platform 518. This assists in releasing the transfused layer 528 from belt 514, in an assisted delamination step, allowing the transfused layer 528 to remain adhered to 3D part 522.

After release, belt 514 may rotate back around to EP engine 12 (shown in FIG. 2A), and may be cooled down further with additional cooling mechanisms (not shown) or via ambient cooling. Gantry 534 may actuate build platform 518 (and 3D part 522) downward, and move build platform 518 (and 3D part 522) back along the x-axis to a starting position along the x-axis, following the reciprocating rectangular pattern 576. Build platform 518 desirably reaches the starting position for proper registration with the next layer 528. In some embodiments, gantry 534 may also actuate build platform 518 and 3D part 522 upward for proper registration with the next layer 528. The same process may then be repeated for each remaining layer 528 of 3D part 522.

Layer transfusion assembly 533 provides a further alternative mechanism for transfusing the layers together, while also keeping the heated layers 528 cool enough for clean release from belt 514. The separation of fusion roller 520 and release roller 568, with a cooling or transfixing step therebetween via the thermal conductance from belt 514 to 3D part 522, allows the layers to be heated to an optimal transfusion interface temperature, and to be cooled to a temperature that transfixes the layers 528 before release.

In some embodiments, layer transfusion assembly 533 may also optionally include one or more pre-heaters (e.g., heaters 270 and 272) to direct heat towards the top surface of 3D part 522 prior to the transfusion step; one or more air jets (e.g., air jets 274 and 474) to assist in further cooling belt 514; one or more post-fuse heaters (e.g., post-fuse heaters 382 and 482) to reheat 3D part 522; and/or one or more active cooling air units (e.g., air jets 242, 342, and 442) to assist in maintaining 3D part 522 at its desired average part temperature.

However, the high thermal conductivity and heat capacity of belt 514 allows layer transfusion assembly to selectively transfer heat only to those areas of 3D part 522 that are being fused together. This conductive heating reduces the risk of melting melt small part features of 3D part 522 that have been completed and are not being fused with the current layer 528. This is in addition to allowing a reduced number of heating and cooling units in layer transfusion assembly 533, thereby reducing the number of re-heating and re-cooling steps.

Examples of suitable average thermal conductivities for belt 514 include thermal conductivities of at least about 0.12 watts/meter-Kelvin (W/m-K), with particularly suitable average thermal conductivities ranging from about 0.2 W/m-K to about 0.5 W/m-K, where the average thermal conductivities are measured pursuant to ASTM E1225-09. Furthermore, examples of suitable average heat capacities for belt 514 include specific heat capacities of at least about 1,000 joules/(kilogram-Kelvin) (J/kg-K), with particularly suitable average heat capacities ranging from about 2,000 J/kg-K to about 3,000 J/kg-K, where the specific heat capacities are measured pursuant to ASTM E1269-11.

Examples of suitable materials for belt 514 include polymeric and metallic materials, which may be doped with one or more conductive materials to promote the electrostatic charges. Examples of suitable polymeric materials include polyimide materials, such as those commercially available under the trade designation "KAPTON" from E.I. du Pont de Nemours and Company, Wilmington, Del.

The thermal conductivity and heat capacity of belt 514 may alternatively be collectively referred to based on its average thermal inertia or effusivity, pursuant to Equation 5:

$$I=\sqrt{(\kappa \cdot \rho \cdot c)} \tag{Equation 5}$$

where "I" is the thermal inertia or effusivity with units of joules/(meter$^2$–Kelvin–seconds$^{0.5}$) (J/m$^2$–K–s$^{0.5}$), "$\kappa$" is the thermal conductivity of belt 514, "$\rho$" is the density of belt 514 (kilograms/meter$^3$), and "c" is the specific heat capacity of belt 514, where the density and specific heat capacity are typically referred to together as the volumetric heat capacity. Accordingly, examples of suitable average thermal inertias for belt 514 include thermal inertias of at least about 400 J/m$^2$–K–s$^{0.5}$, with particularly suitable average thermal inertias ranging from about 600 J/m$^2$–K–s$^{0.5}$ to about 800 J/m$^2$–K–s$^{0.5}$.

In some embodiments, belt 514 may be also be a multi-layer belt having layers of different materials, as discussed below. In these embodiments, the above-discussed average thermal conductivities and heat capacities are based on the averages of entirety of belt 514, which is dependent on the materials of the different layers and the relative cross-sectional thicknesses of the different layers.

FIG. 10 illustrates layer transfusion assembly 633, which is an alternative to layer transfusion assembly 533 (shown in FIG. 9), where the reference numbers of the respective components are increased by "600" from system 10 (shown in FIGS. 2A, 3A, and 4A-4D), and by "100" from layer transfusion assembly 533. As shown in FIG. 10, layer transfusion assembly 633 also includes cooling unit 642, which is a conductive cooling unit to actively cool 3D part 622 in a similar manner to air jets 242, 342, and 442 to assist in maintaining 3D part 622 at its desired average part temperature.

However, in comparison to non-contact cooling units (e.g., air jets 242, 342, and 442), cooling unit 642 selectively cools only the areas of 3D part 622 that are in contact with cooling unit 642. In particular, cooling unit 642 may include roller 642a and cooling belt 642b, where cooling belt 642b is configured to rotate around roller 642a (and other idler and/or drive rollers), desirably at a rate that is synchronized with the movement of build platform 618 and 3D part 622 along the x-axis in the direction of arrow 630. Belt 642b itself desirably has a thermal conductivity and is cooled down (e.g., via a refrigeration unit or other cooling mechanism, not shown) to function as a heat sink. In alternative embodiments, cooling unit 642 may include any suitable mechanism for drawing thermal energy from 3D part 622 via thermal conduction (e.g., a rotatable cold drum or a reciprocating cold platform).

In this embodiment, after moving past release roller 668, the top surface of 3D part 622 desirably contacts and moves along with belt 642b for a sufficient duration to actively draw heat from 3D part 622 in an active cooling step. As mentioned above, this selectively cools only the areas of 3D part 622 that are in contact with cooling unit 642, rather than a global cooling of 3D part 622. As can be appreciated, during each transfusion step with belt 614, which selectively heats only those areas of 3D part 622 that are being fused together, the majority of the heat drawn into 3D part 622 resides at the top-most layers of 3D part 622. As such, selectively drawing heat from these same areas promptly after the transfusion steps prevents the heat from diffusing into the bulk of the part, without globally cooling 3D part 622.

Accordingly, the combination of belt 614 and cooling unit 642 allows layer transfusion assembly 633 to directly heat and cool only those areas of 3D part 622 that are being fused. This may eliminate bulk heating and bulk cooling steps that potentially impart undesirable effects such as melting of small features that have been completed, or over cooling of surfaces that are still under construction.

System 10 with layer transfusion assemblies 33, 133, 233, 333, 433, 533, and 633 is suitable for printing 3D parts (and any support structures) from thermoplastic-based powders at high rates and with good part resolutions. In some embodiments, system 10 may print layers of a 3D part at a rate of at least about 40 layers per minute (e.g., about 50 layers per minute) with accurate registration, layer thicknesses ranging from about 5 micrometers to about 125 micrometers, and layer dimensions along the y-axis up to at least about 51 centimeters (about 11 inches). For example, system 10 may print a 3D part at a rate of about three inches in height along the vertical z-axis per hour.

The resolutions of the 3D parts may also be varied based on the printing rate. For example, each 3D part may be printed at a "high quality" resolution, in which system 10 operates at a slower rate, but prints with lower layer thicknesses. Alternatively, a 3D part may be printed at a "draft quality" resolution, in which system 10 operates a faster rate, but prints with greater layer thicknesses. Furthermore, a 3D part may be printed in "gray scale", in which a lower density of the part material is developed or otherwise imaged. Numerous resolutions and speeds therebetween may also be incorporated. In each of these situations, the controller may adjust the applied pressures, temperatures, and/or contact durations during the transfusion steps to account for the different printing rates.

System 10 is illustrated as being configured to print 3D parts (e.g., 3D parts 22, 122, 222, 322, 422, 522, and 622) from a single thermoplastic-based powder. However, the additive manufacturing systems of the present disclosure may also be configured to print 3D parts and/or support structures from multiple part materials and/or support materials derived from thermoplastic-based powders (e.g., multiple compositions and/or colors). Examples of suitable multiple-material systems include those disclosed in U.S. patent application Ser. Nos. 13/242,669 and 13/242,841.

In some embodiments, controller 24 may monitor the applied pressure, the temperature of the layers, part heights, and the contact durations during the transfusion steps to maximize or otherwise increase the effectiveness in transferring the layers from the front surface of the transfer belt to the build platform. In an open-loop embodiment, one or more of the applied pressure, temperature, and contact durations may be fixed parameters for a given part material and overall printing rate. For example, in embodiments in which the 3D part 22 (and any associated support structure) is printed with partially porous structures, the part height may be self compensated in an open-loop manner where a spring action of the transfer roller may function as a mechanical proportional control system.

If the printed layers begin to fall behind in height relative to the ideal nip height, the nip compression is reduced, which reduces the transfer pressures and the layers may not be fully compressed. The resulting material would be slightly porous and have a resulting larger layer thickness. Alternatively, if the height of the printed layers grows too large, the nip compression is increased, which increases the transfer pressures and the layers would be more compressed. The resulting material would be less porous and have a resulting smaller layer thickness.

Figure 11A:
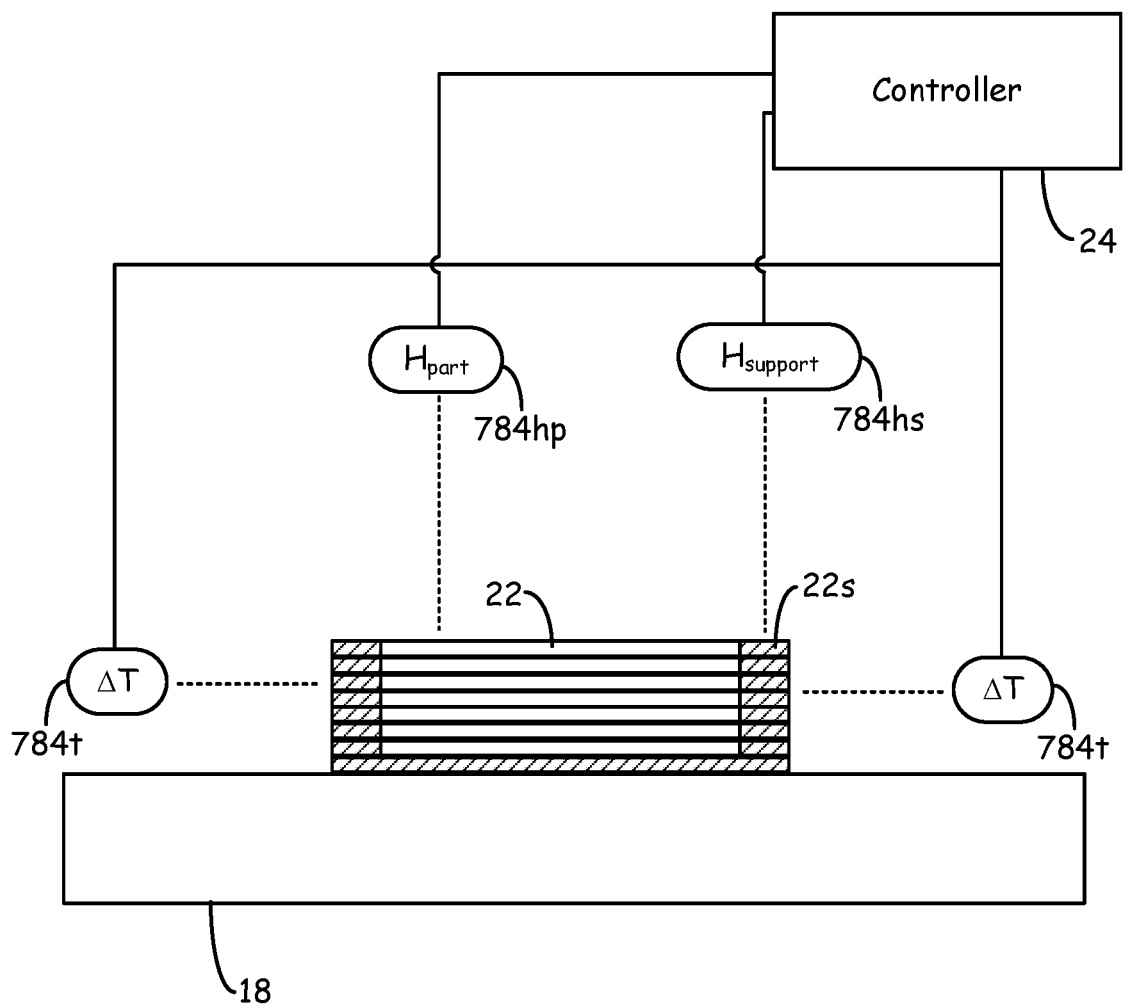
FIGS. 11A, 11B, and 11C are expanded views of a seventh alternative layer transfusion assembly of the electrophotography-based additive manufacturing system, having a closed-loop feedback control.

More preferably, in a closed-loop embodiment, controller 24 may adjust one or more parameters in response to the monitored signals using one or more process control loops. For example, as shown in FIG. 11A, layer transfusion assembly 33 may include one or more temperature sensors 784$t$ and/or one or more height sensors 784$hp$ and 784$hs$, each configured to communicate with controller 24. While illustrated in use with layer transfusion assembly 33, sensors 784$t$ and 784$h$ are equally suitable for use with layer transfusion assemblies 133, 233, 333, 433, 533, and 633.

Temperature sensors 784$t$ are configured to monitor the temperature of 3D part 22 and/or the associated support structure (referred to as support structure 22$s$). Examples of suitable temperature sensors for temperature sensors 784$t$ include non-contact sensors, such as infrared pyrometers, which may communicate with controller 24 to transmit signals relating to the monitored temperatures. Alternative temperature sensors may include ultrasonic transducers for measuring the part temperatures using acoustic thermometry.

Based on the received signals of the monitored temperatures, controller 24 may adjust one or more parameters of system 10 to maintain 3D part 22/support structure 22$s$ at a desired temperature (e.g., at its desired average part temperature). For example, controller 24 may adjust operations of one or more of the heating components of system 10 (e.g., heaters, rollers, platforms) and/or one or more of the active cooling mechanisms of system 10 (e.g., cooling air jets). In some aspects, controller 24 may adjust the temperatures and contact durations during the transfusion steps to compensate for changes in the temperatures of layers and/or fluctuations in the monitored applied pressures.

Alternatively, and more preferably, the heating components of system 10 (e.g., heaters, rollers, platforms) may be maintained at set point temperatures, and controller 24 may adjust operations of one or more of the active cooling mechanisms of system 10 (e.g., cooling air knives and air jets). In particular, the cooling air flow may be adjusted using commercial flow control valves based on feedback from the temperature sensors 784$t$ to substantially maintain 3D part 22 at the intended average part temperature.

As further shown in FIG. 11A, the layers of 3D part 22 may be laterally encased by the layers of support structure 22$s$. In these embodiments, temperature sensors 784$t$ may be configured to monitor the temperatures of 3D part 22 and support structure 22$s$ independently of each other (e.g., with different temperature sensors 784$t$) or together. In some aspects, the thermoplastic-based powder for support structure 22$s$ may have a higher glass transition temperature and/or a higher creep relaxation temperature compared to that of the thermoplastic-based powder of 3D part 22. As such, the layers of 3D part 22 may conform to the dimensions of support structure 22$s$ during the printing operation.

Height sensors 784$hp$ and 784$hs$ are respectively configured to monitor the heights of 3D part 22 and support structure 22$s$ during the printing operation. Examples of suitable height sensors for height sensors 784$hp$ and 784$hs$ include non-contact sensors (e.g., laser height sensors), which may communicate with controller 24 to transmit signals relating to the independently monitored heights.

Maintaining an intended part height during the printing operation is beneficial for good part accuracy, and also controls the amount of nip compression at the transfer rollers, which have small working nip interference ranges (e.g., from about 0.002 inches to about 0.012 inches). Accordingly, in some aspects, controller 24 may adjust the pressure applied by press plate 20 or build platforms 118, 218, 318, 418, 518, and 618 in response to changes in a monitored nip pressure.

However, this can present issues when printing with part and support materials at the same time. If the printed 3D part 22 is too high relative to the printed support structure 22s, the transfer roller pressure will be high due to the higher 3D part 22 and completely mask any feedback from the lower height of support structure 22s. As such, the use of separate height sensors 784hp and 784hs allows controller 24 to compensate for height variations in each of 3D part 22 and support structure 22s, as well as when using multiple part materials and/or multiple support materials.

Due to the variety of 3D part and support structure geometries that system 10 can print, the cross-sectional locations of 3D part 22 and support structure 22s may vary in location in the x-y build plane. This can present issues for height sensors 784hp and 784hs that have fixed measurement locations. For instance, in a first printing operation support structure 22s may be positioned below height sensor 784hs. in a subsequent printing operation 3D part 22 may be positioned below height sensor 784hs, and in another printing operation neither 3D part 22 nor support structure 22s may be positioned below height sensor 784hs.

Figure 11B:
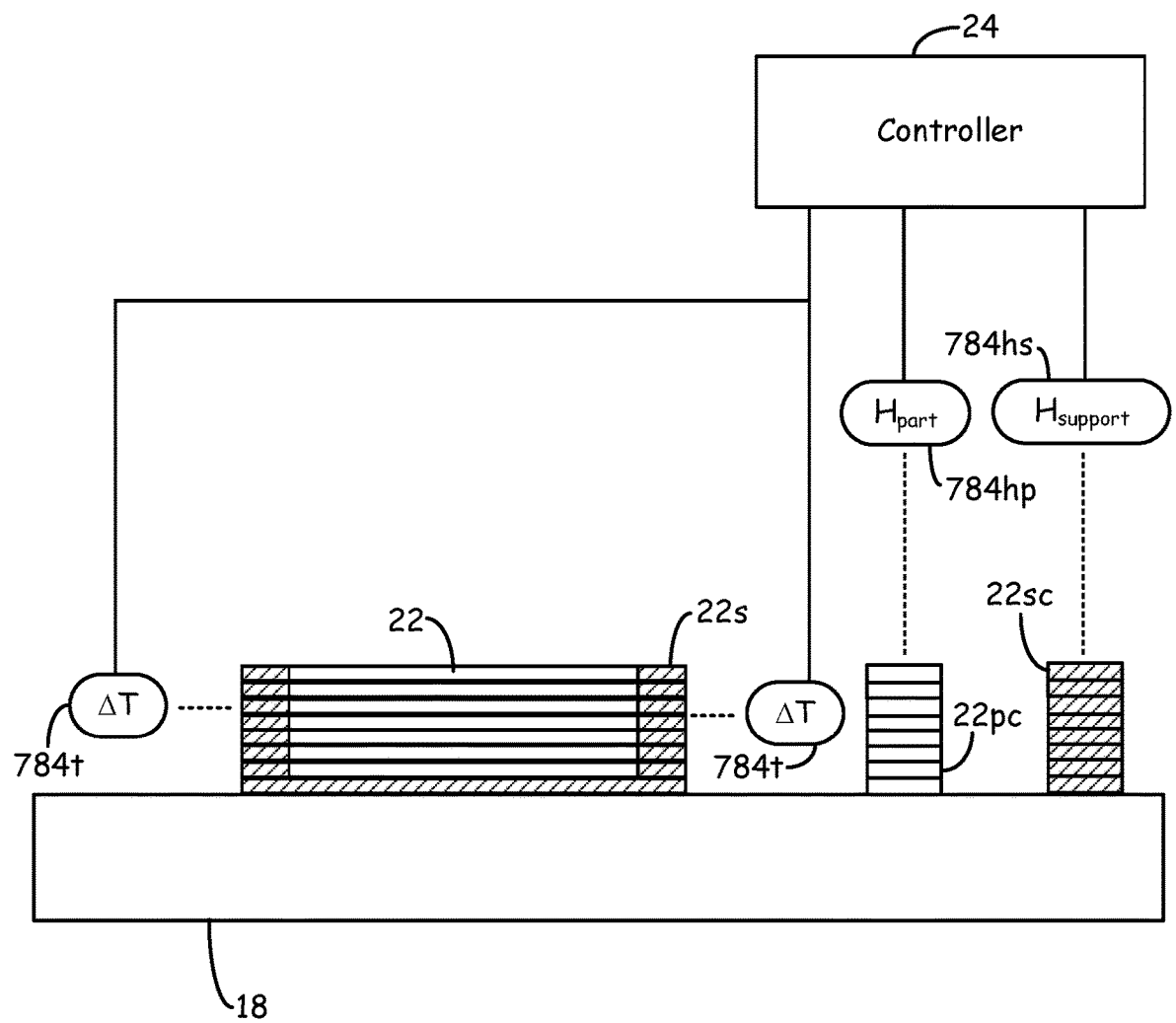

As such, as shown in FIG. 11B, in some embodiments, system 10 may print layers of part column 22pc and support column 22sc along with the layers of 3D part 22 and support structure 22s, where part column 22pc may be positioned below height sensor 784hp, and support column 22sc may be positioned below height sensor 784hs. This allows height sensors 784hp and 784hs to independently measure the heights of 3D part 22 and support structure 22s, and allow controller 24 to direct height compensation protocols based on the feedback from height sensors 784hp and 784hs.

Height compensation for each of 3D part 22 and support structure 24 can be accomplished, for example, by adjusting bias voltage at the imager (e.g., EP engine 12), and by adjusting light-emitting diode (LED) discharge on any organic photo conductor in the part or support material to affect its mass density.

Figure 11C:
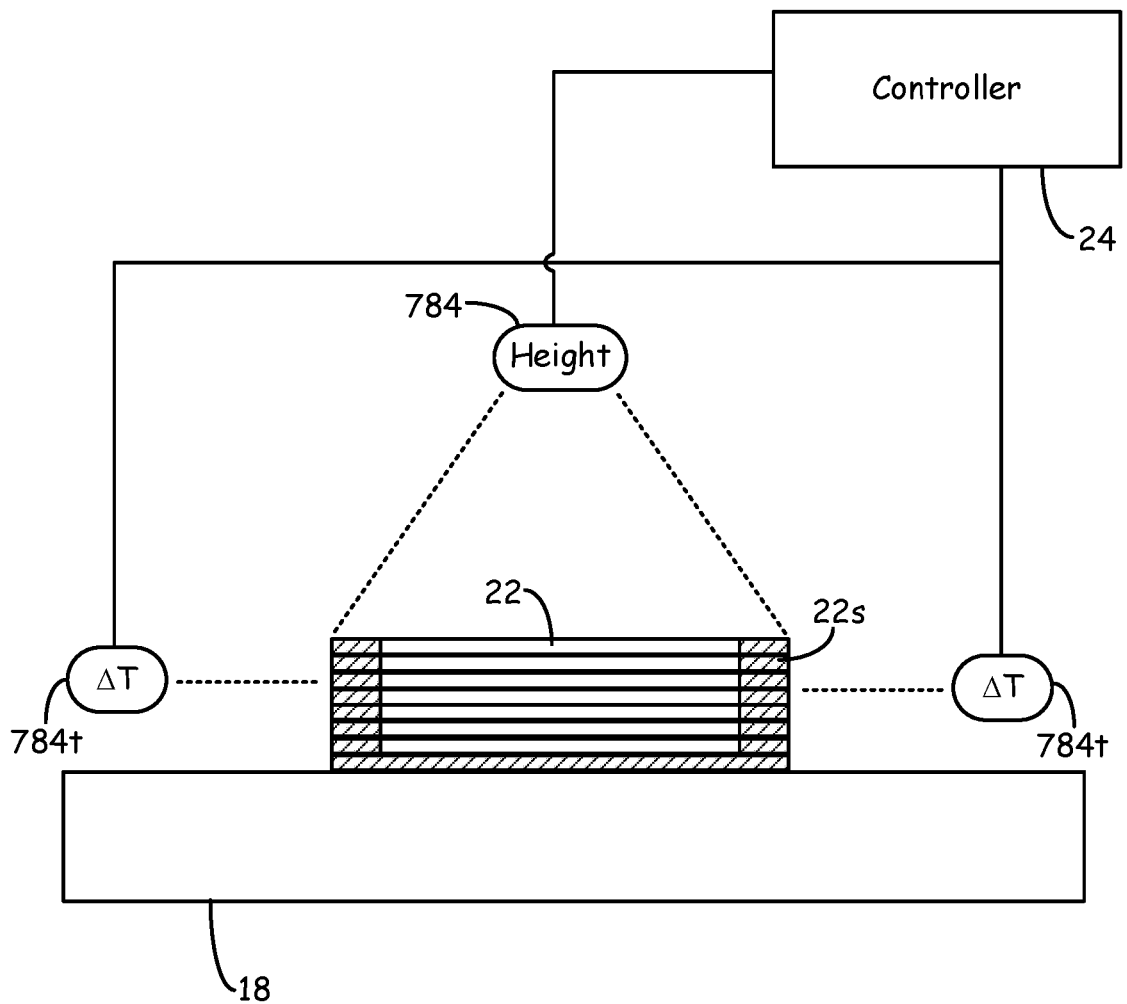

As shown in FIG. 11C, in some embodiments, a single height sensor 784 may be configured to map the entire surface of 3D part 22 and support structure 22s in a two-dimensional image, allowing controller 24 to direct height compensation protocols regardless of the geometries of 3D part 22 and support structure 22s. Examples of suitable height sensors for this embodiment include scanning laser line sensors.

Moreover, this two-dimensional image data allows controller 24 to account for height changes in the lateral directions along the y-axis well as in the process directions along the x-axis by adjusting the intensity of the LED pixel or grayscale across the light bar in EP engine 12 (for the lateral directions) or in time (for the process directions). In further embodiments, the height sensor 784 may be configured to also measure layer thickness of each layer 28 on belt 14 prior to the transfusion step.

Figure 12:
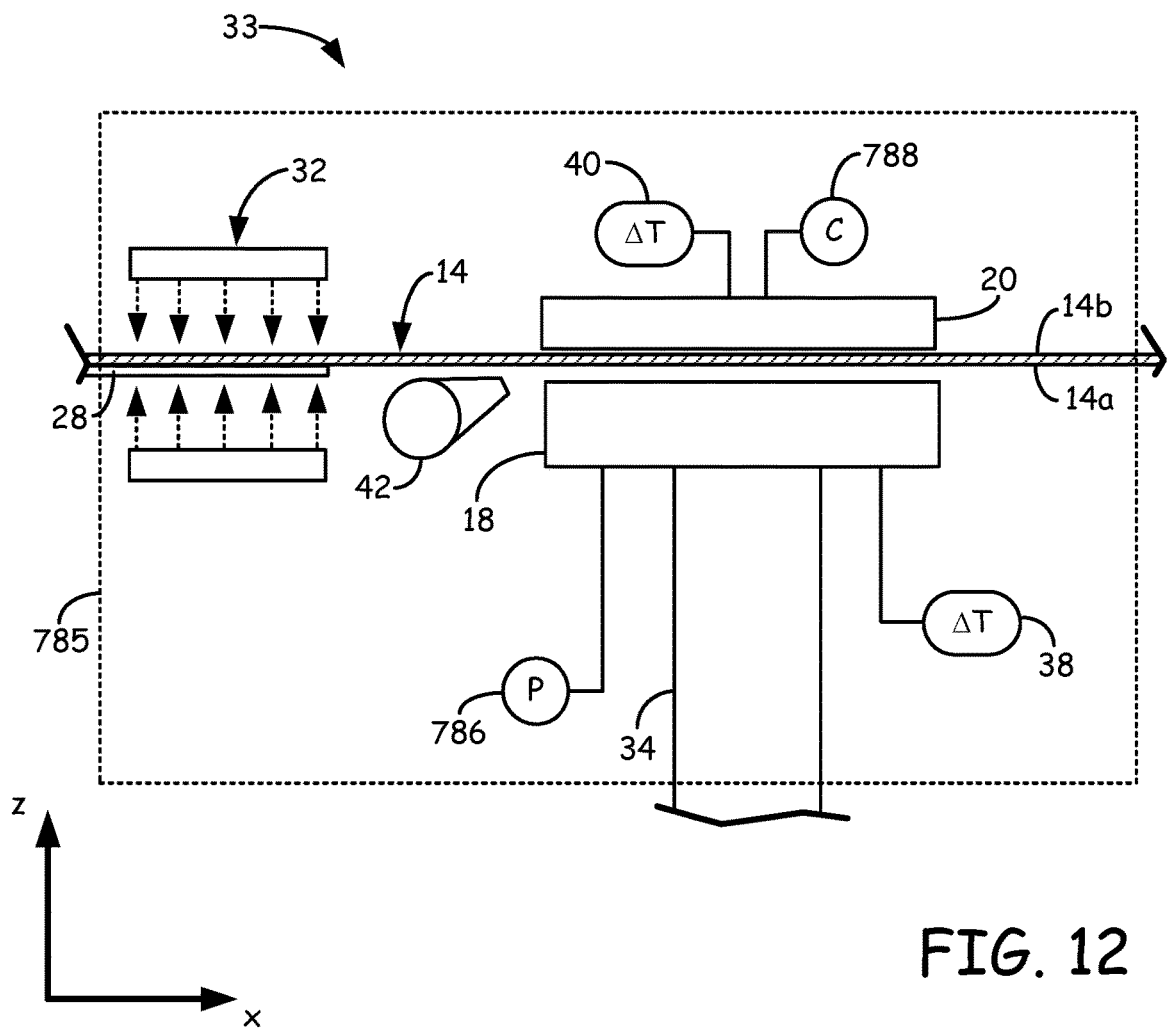
FIG. 12 is an expanded view of an eighth alternative layer transfusion assembly of the electrophotography-based additive manufacturing system, having an enclosable chamber.
Figure 13:
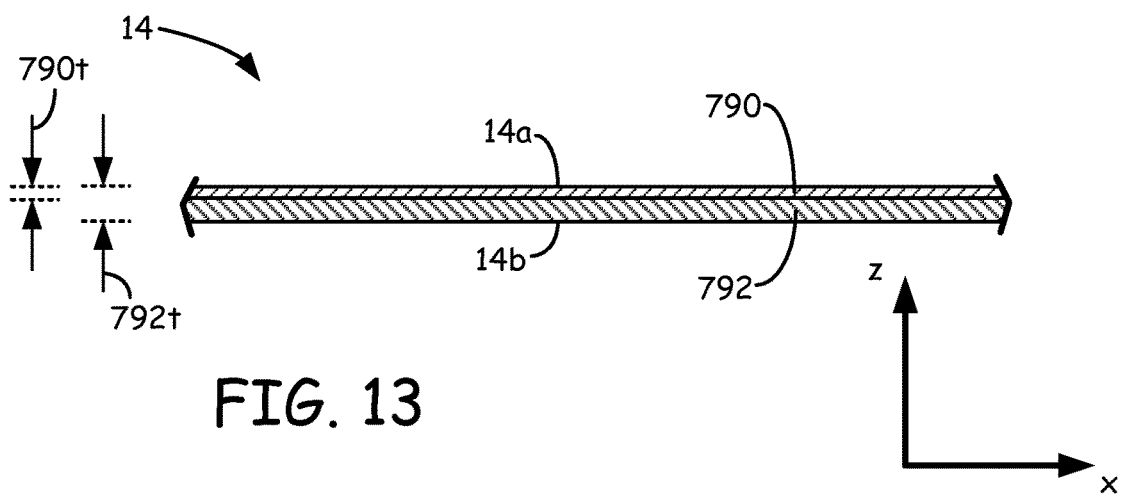
FIG. 13 is a sectional side of a rotatable transfer belt.

As shown in FIG. 12, in some embodiments, system 10 may also include a chamber 785, which can extend around layer transfusion assembly 33, and may define an enclosable environment for printing 3D part 22. While illustrated in use with layer transfusion assembly 33, chamber 785 is equally suitable for use with layer transfusion assemblies 133, 233, 333, 433, 533, and 633. Chamber 785 is a temperature-controllable chamber, which provides greater control over the active cooling step. For example, chamber 785 may be maintained at the average part temperature of 3D part 22 (e.g., about 100° C. for an ABS copolymer).

In these embodiments, chamber 785 may partially enclose z-axis gantry 34 and belt 14, allowing z-axis gantry 34 and belt 14 to extend through the walls of chamber 785. In some embodiments, deformable baffles may be incorporated to maintain a thermal barrier. In alternative embodiments, heater 32 may be located outside and upstream of chamber 784. In further alternative embodiments, chamber 785 may be located below press plate 20, allowing build platform 18 to be lowered down into chamber 785. These embodiments further assist in maintaining 3D part 22 at an average part temperature that is below its deformation temperature, as illustrated above in Equation 4.

As further shown in FIG. 11, layer transfusion assembly 33, 133, 233, 333, 433, 533, or 633 may also include pressure sensors (e.g., pressure sensor 786) and/or capacitive or resistive sensors (e.g., capacitive sensor 788), each of which is configured to communicate with controller 24 over one or more communication lines (not shown). Pressure sensor 786 is one or more sensor assemblies configured to measure the transfusion pressure applied between build platform 18 and press plate 20 (or between build platforms 118/218/318/418 and rollers 120/220/320/420), allowing controller 24 to monitor the applied transfusion pressure and adjust the height of build platform 18 and/or press plate 20 using one or more process control loops. Examples of suitable sensor assemblies for pressure sensor 786 include one or more strain gauges retained on build platform 18 and/or press plate 20.

Capacitive or resistive sensor 788 is one or more capacitive/resistive sensor assemblies configured to measure the electrical resistance between build platform 18 and press plate 20 (or between build platforms 118/218/318/418/518/ 618 and rollers 120/220/320/420/520/620). For example, during a transfusion step, capacitive sensor 788 may induce an electrical current from platen 18 to press plate 20 (or vice versa), and measure the intensity of the resulting electrical current through the printed layers 28 of 3D part 22 and belt 14. Since the thickness of belt 14 is constant, the resulting electrical current will reduce as the 3D part 22 grows through the printing of successive layers 28.

Thus, capacitive sensor 788 is also suitable for monitoring the height of 3D part 22 and the number of layers 28 transferred to build platform 18. This allows controller 24 to accurately predict the applied pressure during a subsequent pressing step rather than merely relying on the calculated height of a single layer increment. This accurate prediction allows build platform 18 to be quickly raised to an intended height, rather than relying solely on feedback signals from pressure sensor 786. Build platforms 18, 118, 218, 318, 418, 518, and 618, press plate 20, and rollers 120, 220, 320, 420, 520, and 620 may each also include one or more temperature sensors (not shown) configured to respectively measure the temperatures of the build platforms and press plate/rollers, allowing controller 24 to hold them at the above-discussed temperatures.

In some embodiments, controller 24 and/or host computer 26 may receive operational mode selections for operating system 10 in different modes. For example, a user may select operational modes such as high quality printing, draft quality printing, and gray scale, as discussed above. Alternatively, system 10 may receive the operational mode selections as default or system generated modes (e.g., a default of a high quality printing). These received operational mode selections may alternatively (or additionally) be set based on the geometry of the 3D part, such as if the 3D part has a small cross-sectional area and/or fine-feature details, as discussed above.

Upon receipt of these operational mode selections, controller 24 and/or host computer 26 may set transfusion parameters for performing the transfusion steps, based on the received operational mode selections. For example, the transfusion pressure, temperature(s), and or duration for each transfusion step may be set or adjusted based on the received operational mode select. This provides greater control over the transfusion steps when operating system 10 to improve printing accuracies and/or printing rates.

System 10 may then image a powder layer of the 3D part from a thermoplastic-based powder (e.g., develop a powder layer with EP engine 12), transfer the imaged powder layer to a transfer medium, heat the imaged powder layer while the imaged layer is retained on the transfer medium, and transfuse the heated layer to a surface of the three-dimensional part based on the set transfusion parameters.

In some embodiments, the set transfusion parameters allow the transfusion pressure, temperature(s), and or duration for each transfusion steps to vary between different transfusion steps. For example, if a first portion of a 3D part contains a simple block geometry and a second portion of the 3D part contains a fine-feature geometry, controller 24 and/or host computer 26 may set the transfusion parameters such that the layers used to form the simple block geometry are transfused differently (e.g., higher transfusion pressure) from those used to form the fine-feature geometry (e.g., lower transfusion pressure).

FIGS. 13 and 14A-14C illustrate a suitable embodiment for belt 14 (shown in FIGS. 2A, 3A, and 4A-4D), and is equally suitable for belt 114 (shown in FIGS. 5A-5E), belt 214 (shown in FIGS. 6A-6F), belt 314 (shown in FIG. 7), belt 414 (shown in FIG. 8), belt 514 (shown in FIG. 9), and belt 614 (shown in FIG. 10). In the embodiment shown in FIG. 13, belt 14 is a multiple-layer belt that includes layer or film 790 (defining front surface 14a) and base portion 792 (defining rear surface 14b).

Film 790 and base portion 792 are desirably derived from materials that are suitable for transferring the layers 28 of part (or support) materials from EP engine 12 to build platform 18, that are thermally stable at the fusion temperatures $T_{(f)}$ of the part and support materials, and that are robust for continued operation at high rotational speeds while being repeatedly heated and cooled during the heating and active cooling steps. Furthermore, for use as belts 514 and 614, film 790 and/or base portion 792 also desirably have high thermal conductivities and heat capacities for selectively heating the 3D parts.

Film 790 has a film thickness 790t, and is derived from one or more low-surface energy materials, thereby allowing the received layers 28 to effectively release from front surface 14a to build platform 18. Examples of suitable materials for film 790 include one or more fluorinated polymers, such as polytetrafluoroethylenes (PTFE), fluorinated ethylene propylenes, and perfluoroalkoxy polymers. Examples of suitable commercially available fluorinated polymers include PTFE available under the trade designation "TEFLON" from E.I. du Pont de Nemours and Company, Wilmington, Del.

Base portion 792 has a thickness 792t, and is derived from one or more materials that promote good electrostatic attraction for the thermoplastic-based powders to front surface 14a via electrostatic charges. Examples of suitable materials for base portion 792 include one or more polyimide materials, such as those commercially available under the trade designation "KAPTON" from E.I. du Pont de Nemours and Company, Wilmington, Del., which may be doped with one or more conductive materials to promote the electrostatic charges. In some embodiments, belt 14 may also include one or more additional layers between film 790 and base portion 792, such as one or more tie layers.

For use as belts 514 and 614, examples of suitable materials for base portion 792 include those discussed above for belts 514 and 614. In these embodiments, base portion 792 may constitute the bulk of belt 14, where thickness 792t is substantially greater than film thickness 790t. This allows film 790 to be derived from a low-surface energy material that may have a lower thermal conductivity and/or heat capacity, while still retaining an overall high thermal conductivity and high heat capacity.

Figure 14A:
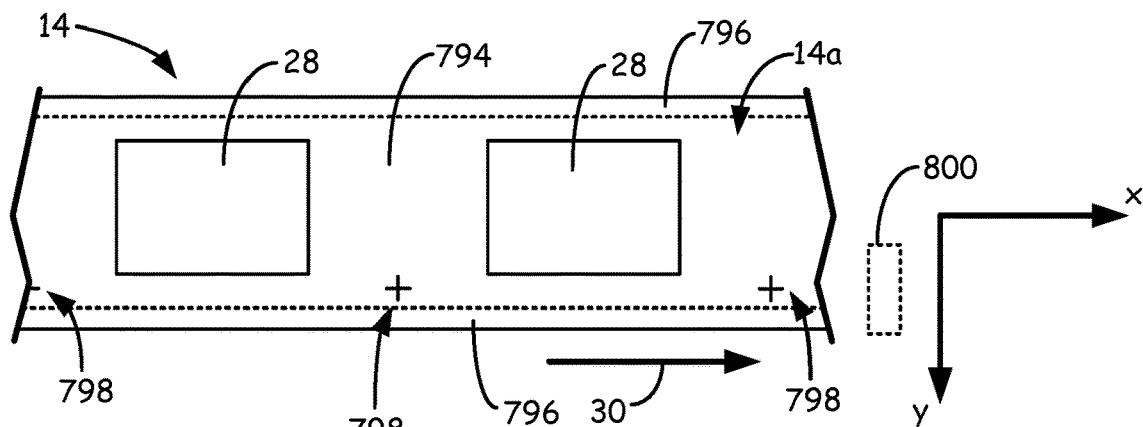
FIG. 14A is a top view of a first embodiment of the rotatable transfer belt, having receiving regions and encoder markings.

FIGS. 13A-13C illustrate alternative embodiments for belt 14 for engaging with various drive rollers of system 10. As shown in FIG. 14A, front surface 14a of belt 14 may include receiving region 794 and edge regions 796 on opposing lateral sides of receiving region 794. Receiving region 794 is the region of front surface 14a on which layers 28 are retained for transfer between EP engine 12 and build platform 18. Edges regions 796 are the regions at which one or more drive mechanisms may engage drive belt 14.

For example, one or more rollers (e.g., rollers 16, nip roller 120, fusion roller 220, release roller 268, nip roller 320, fusion roller 420, release roller 468, nip roller 520, release roller 568, nip roller 620, release roller 668, and/or any service-loop roller) may engage front surface 14a and/or rear surface 14b at edge regions 796 to ensure the rollers to not interfere with the imaged layers 28. In some embodiments, pairs of opposing rollers (not shown) may simultaneously engage front surface 14a and rear surface 14b at edge regions 796 to nip and drive belt 14 in the direction of arrow 30.

Registration along the x-axis may be maintained with the use of encoder markings 798. Encoder markings 798 may be pre-marked on front surface 14a and/or rear surface 14b at preset increments along the x-axis, or may be printed with the imaged layers 28 to identify relative locations of the imaged layers 28 along the x-axis. System 10 may also include one or more optical readers (e.g., optical reader 800) to locate encoder markings 798 as belt 14 rotates in the direction of arrow 30.

Figure 14B:
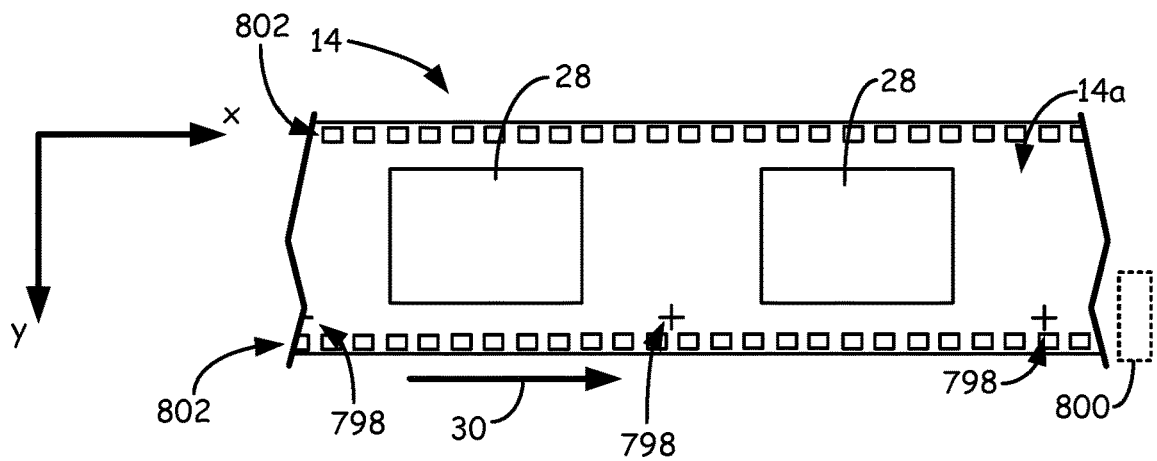
FIG. 14B is a top view of a second embodiment of the rotatable transfer belt, having holes for engagement in a tractor-feed manner.

Alternatively, as shown in FIG. 14B, belt 14 may include an array of holes 802 or other openings that extend through film 790 and base portion 792 adjacent to the lateral edges of belt 14. Holes 802 are configured to engage with gear teeth (not shown) of one or more rollers (e.g., rollers 16, nip roller 120, fusion roller 220, release roller 268, nip roller 320, fusion roller 420, release roller 468, nip roller 520, release roller 568, nip roller 620, release roller 668, and/or any service-loop roller) to drive belt 14 in a tractor-feed manner. In this embodiment, registration along the x-axis may also be maintained with the use of encoder markings 798, if desired. Alternatively, holes 802 may themselves function as encoder markings in the same manner. System 10 may also include one or more optical readers (e.g., optical reader 799) to locate encoder markings 798 and/or holes 802 as belt 14 rotates in the direction of arrow 30.

Figure 14C:
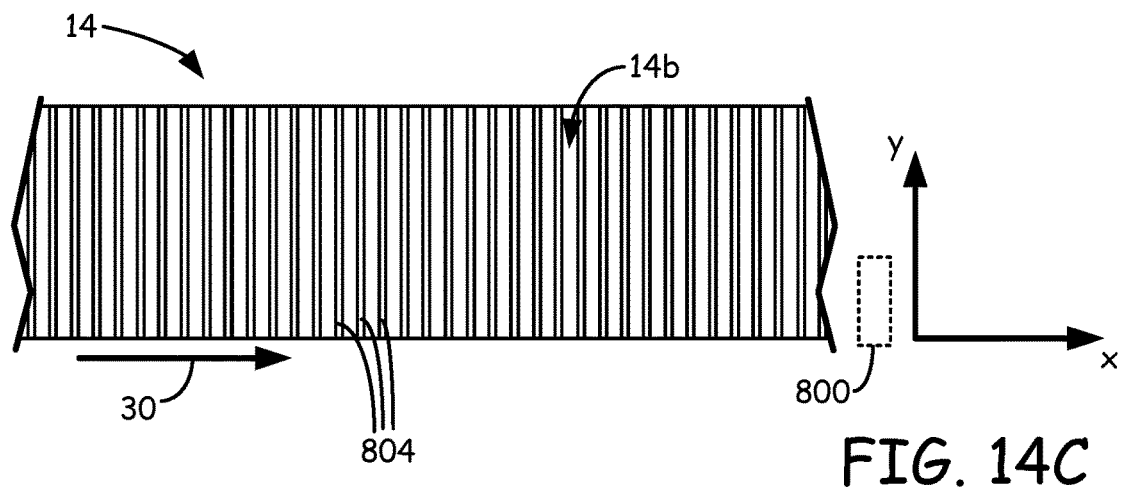
FIG. 14C is a bottom view of a third embodiment of the rotatable transfer belt, having rear ribs for engagement in a timing-belt manner.

FIG. 14C shows yet another alternative embodiment in which belt 14 includes rear ribs 804 that extend laterally along rear surface 14b. Ribs 804 are configured to engage with reciprocating gear teeth (not shown) of one or more rollers (e.g., rollers 16, nip roller 120, fusion roller 220, release roller 268, nip roller 320, fusion roller 420, release roller 468, nip roller 520, release roller 568, nip roller 620, release roller 668, and/or any service-loop roller) to drive belt 14 in a timing-belt manner. In this embodiment, registration along the x-axis may also be maintained with the use of encoder markings corresponding to encoder markings 798, if desired. Alternatively, ribs 804 may themselves function as encoder markings in the same manner. System 10 may also include one or more optical readers (e.g., optical reader 800) to locate the encoder markings and/or holes ribs as belt 14 rotates in the direction of arrow 30.

FIGS. 14A-14C illustrate example engagement mechanisms for belt 14, allowing belt 14 to engage with one or more drive mechanisms of system 10. However, belt 14 may alternatively include different engagement mechanisms as particular designs may require.

Figure 15:
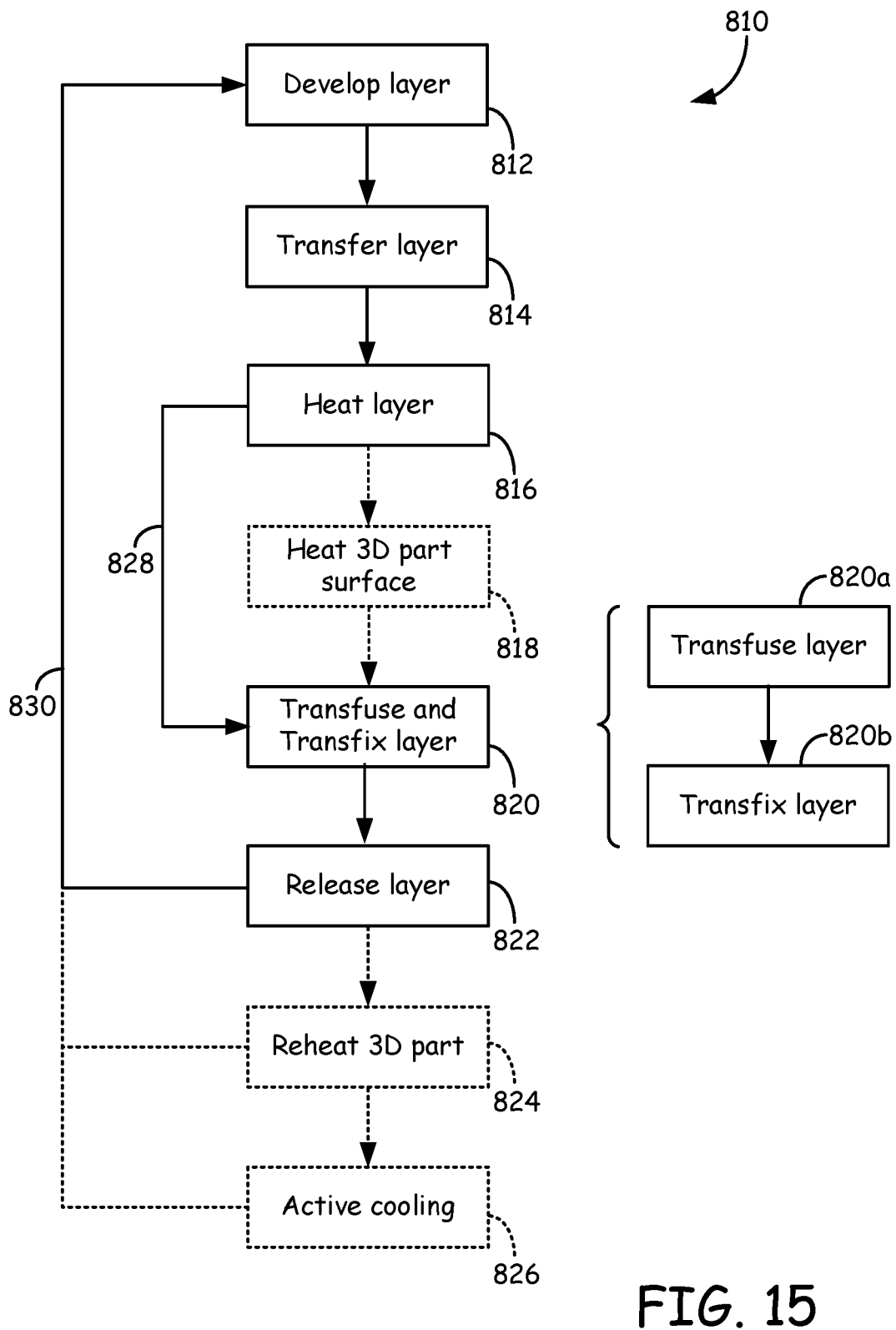
FIG. 15 is a flow diagram of an example method for the layer transfer technique of the present disclosure.

FIG. 15 is a flow diagram of method 810, which is an example method for the layer transfer technique of the present disclosure, and may be performed with system 10 having layer transfusion assemblies 33, 133, 233, 333, 433, 533, and 633. As shown, method 810 includes step 812-826, where steps 818, 820a, 820b, 824, and 826 are optional steps depending on the particular embodied layer transfusion assembly utilized (e.g., layer transfusion assemblies 33, 133, 233, 333, 433, 533, and 633).

Method 810 initially involves developing or otherwise imaging a powder layer (step 812), such as with EP engine 12. The imaged powder layer may then be transferred on a transfer medium from a first location at EP engine 12 to a second location at the layer transfusion assembly (e.g., layer transfusion assemblies 33, 133, 233, 333, 433, 533, and 633) (step 814). Prior to reaching the second location at the layer transfusion assembly, the powder layer is heated to a transfer temperature, such as the fusion temperature of the thermoplastic-based powder (e.g., at heaters 32, 132, 232, 332, 432, 532, and 632) (step 816).

In some embodiments, the top surface or layer(s) of the 3D part may also be pre-heated prior to the transfusion/transfixing steps (step 818). For example, with layer transfusion assembly 233, heaters 270 and 272 may heat the top surface or layer(s) of 3D part 222 to the fusion temperature of the thermoplastic-based powder, or other suitable transfer temperature. Because layer 228 and the heated top surface/layer of 3D part 222 can each be heated to the fusion temperature of the thermoplastic-based powder, the pressed heated layer 228 transfuses to the heated top surface/layer of 3D part 222 with a high level of interlayer adhesion (during transfusion step 520).

If the particular embodiment does not incorporate heating of the top surface or layer(s) of the 3D part, the heated layer may then be directly transfused and transfixed with the layer transfusion assembly, as illustrated by arrow 828. Upon reaching the layer transfusion assembly, after either step 816 or step 818, the heated layer may then be transfused and transfixed (step 820).

In some embodiments, such as for layer transfusion assemblies 33, 133, and 333, the transfusion and transfixing may be performed in a single step. For example, for layer transfusion assembly 33, press plate 20 may engage build platform 18 to transfuse the heated layer 28 to the top surface of 3D part 22. Because press plate 20 may be heated to a temperature that is lower than the fusion temperature, the contact between press plate 20 and rear surface 14b of belt 14 cools down the interface between belt 14 and the transfused layer 28, increasing the adhesive force of the interdiffused polymers in the transfused layer 28 and 3D part 22 relative to the adhesive force of the transfused layer 28 to surface 14a of belt 14, thereby maintaining the transfused layer adhered to the 3D part in a fixed spatial position.

The transfused and transfixed layer may then be released from the transfer medium (step 822), such as by retracting press plate 20 and/or build platform 18, or by the separation of belts 114/333 from build platforms 118/318 by belts 114/318 winding around nip rollers 120/320. The transfixing step discussed above allows the transfused layer to cleanly release from the transfer medium and remain adhered to the 3D part.

Alternatively, such as for layer transfusion assemblies 233,433, 533, and 633, instead of a combined transfusion and transfixing step 820, method 510 may include a transfusion step 820a and transfixing step 820b, which are separate. For example, layer transfusion assembly 233 includes a heated fusion roller 220 (for transfusion step 820a) and release roller 268 (for release step 822), which are separated by air jets 274 (for a cooling or transfixing step 820b). Correspondingly, belts 514 and 614, which have high thermal conductivities and heat capacities, may be utilized instead of (or in addition to) air jets 274 for the cooling or transfixing step 820b.

This allows the layers to be heated to an optimal transfusion interface temperature at the heating steps 816 and/or 818, and during the transfusion step 820a, and then to be cooled to a temperature that fixes the layers (at transfixing step 820b) before release at release step 822. This substantially increases the extent to which the polymer molecules of the transfused layers interdiffuse to promote interfacial entanglement, while also maintaining dimensional accuracy of the 3D part.

Moreover, the release of the transfused layer from the transfer medium may be assisted during the release step 822. For example, release roller 268 may assist in releasing transfused layer 228 from belt 214 by increasing the angle of separation between belt 214 and build platform 218, which increases the ease at which transfused layer 228 delaminates from belt 214.

After release, the 3D part may then optionally (depending on the particular embodiment) undergo one or more post-fuse or heat-setting steps (step 824), such as discussed above for layer transfusion assembly 333 (shown in FIG. 7) and layer transfusion assembly 433 (shown in FIG. 8). At heat-setting step 824, the 3D part may be heated to at least the fusion temperature of the thermoplastic-based powder, such as with post-fuse heaters 382 and 482. This sufficiently melts the material of the transfused layer to a fusable state such that polymer molecules of the transfused layer further interdiffuse to promote interfacial entanglement with 3D part.

The 3D part may then be actively cooled (e.g., with air knives 42 and air jets 142, 242, 342, 442, or other convective and/or conductive cooling units, such as cooling unit 642) (step 826). As discussed above, because the imaging system (e.g., system 10) is capable of printing the layers at speeds that are much faster than the rate at which heat diffuses through the variable thermal resistance of the 3D parts, heat can accumulate in the 3D parts, which, if not accounted for, can exceed a deformation temperature of the 3D part, causing the bulk of the 3D part to soften enough reduces its structural integrity. Such a soft part may deform under a subsequently-applied transfusion pressure during a subsequent transfusion step.

To overcome this issue while maintaining fast printing rates, the 3D part may be actively cooled between each transfusion step 818 to maintain the 3D part at an average part temperature that is lower than the deformation temperature of the 3D part. In some embodiments, the active cooling step 826 may also be an optional step of method 810. For example, system 10 may instead operate at a lower printing speed to allow heat to diffuse from the 3D part. However, as discussed above, the active cooling step 826 is desirable for maintaining the structural integrity of the 3D part while printing at high speeds.

Steps 812-826 may then be repeated for each layer of the 3D part until the printing operation is completed (as indicated by arrow 830). By heating each layer to at least the fusion temperature of the thermoplastic-based powder, followed by transfusing, transfixing, and optional active cooling allows system 10 to print 3D parts with good part quality and strengths (e.g., z-strengths).

EXAMPLES

The present disclosure is more particularly described in the following examples that are intended as illustrations only, since numerous modifications and variations within the scope of the present disclosure will be apparent to those skilled in the art.

Example 1

For the printing operations of Example 1, 3D parts were printed with an additive manufacturing system corresponding to the system shown in FIGS. 1, 2, and 4A-4D, having a moveable press plate and a vertically-actuatable build platform, each of which were heated. The 3D parts were printed from an ABS part material, where each layer was developed with an electrophotography engine and transferred to a rotatable transfer belt looped around a service loop design. The developed layer was carried by the transfer belt to an infrared heater to heat the layer to a fusion temperature of ABS part material.

The heated layer was then transferred to and aligned over the build platform. The press plate was actuated downward to transfuse the heated layer against a previously-transfused layer of the 3D part (or to the build platform for the initial layer). The press plate was then retracted, which cleanly delaminated the layer from the transfer belt, allowing the layer to remain transfused to the 3D part.

Cooling air from an air knife was also directed to the top layers of the 3D part. This removed the additional heat from the transfused layer to provide an average part temperature of that maintained the structural integrity of the 3D part, where the 3D part did not slump or melt due to heat accumulation. This process was repeated for each layer of the 3D part. The air knife and the press plate successfully maintained the average part temperature below the deformation temperature of the 3D part during the entire printing operation. The resulting 3D parts exhibited good part resolution, dense fill, and good dimensional integrity.

Example 2

Figure 16:
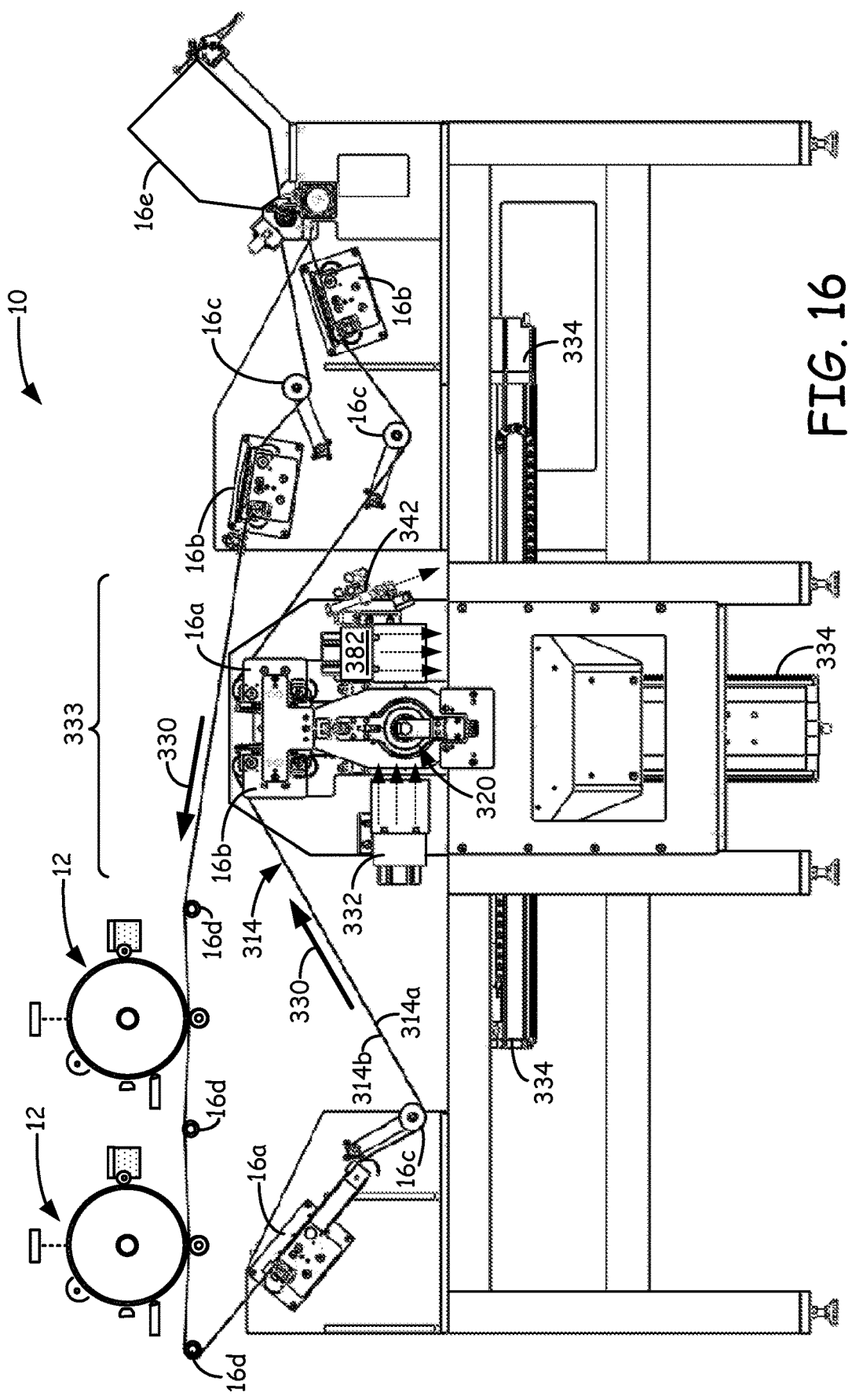
FIG. 16 is a front view of an example electrophotography-based additive manufacturing system of the present disclosure.

For the printing operations of Example 2, 3D parts were printed with an additive manufacturing system corresponding to system 10 having a layer transfusion assembly 333 as shown in FIG. 7 (without pre-heaters 370 or 372), and as further depicted in FIG. 16 (using the same reference numbers as for system 10 and layer transfusion assembly 333). As shown in FIG. 16, the system 10 included two EP engines 12, a belt 314, two belt drive mechanisms 16a, three belt drag mechanisms 16b, three loop limit sensors 16c, idler rollers 16d, belt cleaner 16e, and layer transfusion assembly 333.

Belt drive mechanisms 16a, belt drag mechanisms 16b, loop limit sensors 16c, idler rollers 16d, and belt cleaner 16e maintained tension on belt 314 while belt 314 rotated in the rotational direction of arrows 330. In particular, belt drive mechanisms 16a engaged and drove belt, and belt drag mechanisms 16b functioned as brakes to provide a service loop design for protecting belt 314 against tension stress, based on monitored readings via loop limit sensors 16c.

The 3D parts were printed from an ABS part material, where each layer was developed with an EP engine 12 and transferred to belt 314 looped in the service loop design. The developed layer was carried by belt 314 to an infrared heater 332 to heat the layer and belt 314 to a fusion temperature of the ABS part material.

The heated layer was then transferred to and aligned over the build platform 318 (not shown in FIG. 16). The build platform 315 was actuated upward by gantry 934 to transfuse the heated layer against a previously-transfused layer of the 3D part (or to the build platform 318 for the initial layer). In particular, actuating the build platform 318 upward pressed the heated layer and transfer belt between the build platform 318 (or against a previously-transfused layer of the 3D part) and the nip roller 320. The build platform 318 was then moved at a synchronized rate with belt 314, and then released at a downstream location. This cleanly delaminated the layer from the transfer belt, allowing the layer to remain transfused to the 3D part.

The 3D part was then re-heated with post-fuse infrared heater 382 to further increase adhesion of the transfused layers. Cooling air from air jets 342 was also directed to the top layers of the 3D part. This removed the additional heat from the transfused layers to provide an average part temperature of that maintained the structural integrity of the 3D part, where the 3D part did not slump or melt due to heat accumulation. The build platform 318 was then moved back to its starting position via gantry 934, and the process was repeated for each layer of the 3D part. In these Examples, the air jets 342 successfully maintained the average part temperature below the deformation temperature of the 3D part during the entire printing operation. The resulting 3D parts also exhibited good part resolution, dense fill, and good dimensional integrity.

Comparative Examples A and B

For the printing operations of Comparative Examples A and B, 3D parts were printed with the same additive manufacturing systems respectively used for Examples 1 and 2. However, for Comparative Examples A and B, the air knife or jet cooling was omitted. Otherwise, the processes were performed in the same manner as discussed above for Examples 1 and 2.

For the printing operations of Comparative Examples A and B, prior to the completion of each printed 3D part, the printed layers began to compress and flatten. As discussed above, this is believed to be due to heat accumulating in the printed layers, which was unable to diffuse sufficiently between each printed layer. The accumulated heat softened the bulk of the 3D part, causing it to compress during subsequent transfusion steps. This resulted in deformed 3D parts.

As such, the layer transfer technique of the present disclosure including the active cooling is beneficial for printing 3D parts at high rates using electrophotography. The active cooling was successfully implemented to remove the added heat from each fused layer prior to the transfusion of the next layer. This allowed the 3D parts printed with the systems in Examples 1 and 2 to be maintained at average part temperatures below their deformation temperatures, but high enough to promote good interlayer adhesion and reduced curl.

Although the present disclosure has been described with reference to preferred embodiments, workers skilled in the art will recognize that changes may be made in form and detail without departing from the spirit and scope of the disclosure.

The invention claimed is:

1. A method for printing a three-dimensional part with an additive manufacturing system, the method comprising:
imaging a new layer of the three-dimensional part;
rotating a belt at a belt speed, the belt having an average thermal inertia of at least about 400 joules/(meter$^2$–Kelvin–second$^{0.5}$);
transferring the new layer to the rotating belt, the rotating belt moving in a path about a roller such that the new layer is adhered to the rotating belt;
heating the rotating belt and the new layer while the new layer is adhered to the rotating belt;
moving a platform carrying a stack of one or more previously transferred layers to a location upstream of the roller;
after the step of heating, engaging the heated rotating belt with a nip roller, which presses the new layer to a top surface of the stack of one or more previously transferred layers to provide a stack including the new layer;
moving the stack including the new layer in a direction and at a rate that is synchronized with of the belt speed;
conducting thermal energy from the rotating belt to the stack including the new layer while moving the stack including the new layer in the synchronized direction and rate such that the new layer registers with the stack of one or more previously transferred layers and is transfused to the stack of one or more previously transferred layers utilizing heat and pressure in a nip between the belt and the stack of one or more previously transferred layers to provide a stack including the new layer;
after the step of engaging, releasing the new layer from the rotating belt such that the new layer defines a new top surface of the stack including the new layer; and
cooling the stack including the new layer to remove substantially all of an amount of heat imparted into the stack including the new layer from the step of heating the rotating belt and the new layer and the step of the new layer being transfused to the stack of one or more previously transferred layers utilizing heat and pressure.

2. The method of claim 1, wherein imaging the new layer comprises developing the new layer with an electrophotography engine.

3. The method of claim 1, wherein cooling the stack including the new layer comprises drawing thermal energy from the stack including the new layer by thermal conduction.

4. The method of claim 1, wherein heating the rotating belt and the new layer comprises heating the rotating belt and the new layer to a temperature ranging from about 180° C. to about 220° C.

5. A method of printing a structure including a part utilizing an electrophotography-based additive manufacturing system, the method comprising:
forming a new layer of particulate polymeric material with an electrophotographic engine;
transferring the new layer to a continuous belt which is moving in a path about a roller such that the new layer is adhered to the continuous belt;
moving a platform carrying a stack of one or more previously transferred layers to a location upstream of the roller;
heating a top surface of the stack of one or more previously transferred layers;
moving the platform beneath the roller such that the new layer registers with the stack of one or more previously transferred layers and is transfused to the stack of one or more previously transferred layers utilizing heat and pressure in a nip between the belt and the stack of one or more previously transferred layers to provide a stack including the new layer; and
cooling the stack including the new layer to remove substantially all of an amount of heat imparted into the stack including the new layer from the step of heating a top surface of the stack of one or more previously transferred layers and the step of the new layer being transfused to the stack of stack of one or more previously transferred layers utilizing heat and pressure.

6. The method of claim 5, further comprising heating the new layer while it is adhered to the continuous belt and prior to the step of moving the platform beneath the roller such that the new layer registers with the stack of one or more previously transferred layers.

7. The method of claim 6, wherein the step of heating the new layer while it is adhered to the continuous belt prior and to the step of moving the platform beneath the roller comprises heating the new layer to a temperature below a glass transition temperature of the particulate polymeric material.

8. The method of claim 5, further comprising heating the roller.

9. The method of claim 8, wherein the step of heating the roller comprises heating the roller to an average part temperature.

10. The method of claim 5, further comprising heating the platform.

11. The method of claim 5, further comprising heating the new layer after the new layer is transfused to the stack of one or more previously transferred layers and prior to the step of cooling.

12. The method of claim 5, wherein the new layer includes a particulate polymeric part material and a particulate polymeric support material, and forming the new layer comprises:
forming a part portion of the new layer from the particulate polymeric part material; and
forming a support structure portion of the new layer from the particulate polymeric support material to provide support to the part, wherein the particulate polymeric support material is a different material than the particulate polymeric part material.

13. The method of claim 5, further comprising the moving the platform in a reciprocating pattern, wherein the step of moving the platform in a reciprocating pattern includes the steps of moving the platform to a location upstream of the roller and moving the platform beneath the roller.

14. The method of claim 5, further comprising heating the new layer and the continuous belt proximate the roller.

15. The method of claim 5, wherein the step of heating the top surface of the stack of one or more previously transferred layers further comprises simultaneously heating the new layer and the top surface of the stack of one or more previously transferred layers with a single heater.

16. A method of printing a structure including a part utilizing an electrophotography-based additive manufacturing system, the method comprising:

forming a new layer of particulate polymeric material comprising particulate polymeric part material and particulate polymeric support material with an electrophotographic engine;

transferring the new layer to a continuous belt which is moving in a path about a roller such that the new layer is adhered to the continuous belt;

moving a platform carrying a stack of one or more previously transferred layers to a location upstream of the roller;

heating a top surface of the stack of one or more previously transferred layers;

moving the platform beneath the roller such that the new layer registers with the stack of one or more previously transferred layers and is transfused to the stack of one or more previously transferred layers utilizing heat and pressure in a nip between the belt and the stack of one or more previously transferred layers to provide a stack including the new layer; and cooling the stack including the new layer to remove substantially all of an amount of heat imparted into the stack including the new layer from the step of heating a top surface of the stack of one or more previously transferred layers and the step of the new layer being transfused to the stack of stack of one or more previously transferred layers utilizing heat and pressure.

17. The method of claim 16, further comprising heating the new layer while it is adhered to the continuous belt and prior to the step of moving the platform beneath the roller such that the new layer registers with the stack of one or more previously transferred layers.

18. The method of claim 16, further comprising heating the roller.

19. The method of claim 16, wherein the step of heating the top surface of the stack of one or more previously transferred layers further comprises simultaneously heating the new layer and the top surface of the stack of one or more previously transferred layers with a single heater.

* * * * *